(12) United States Patent
Mitsunaga et al.

(10) Patent No.: US 7,548,264 B2
(45) Date of Patent: Jun. 16, 2009

(54) IMAGE PROCESSING APPARATUS AND IMAGE PROCESSING METHOD, AND PROGRAM

(75) Inventors: Tomoo Mitsunaga, Kanagawa (JP); Yoshikuni Nomura, Tokyo (JP)

(73) Assignee: Sony Corporation, Tokyo (JP)

( * ) Notice: Subject to any disclaimer, the term of this patent is extended or adjusted under 35 U.S.C. 154(b) by 887 days.

(21) Appl. No.: 10/973,019

(22) Filed: Oct. 25, 2004

(65) Prior Publication Data

US 2005/0088550 A1    Apr. 28, 2005

(30) Foreign Application Priority Data

Oct. 23, 2003   (JP)   ............ P2003-363714

(51) Int. Cl.
H04N 5/335   (2006.01)
(52) U.S. Cl. ............................................ 348/272
(58) Field of Classification Search ......... 348/272, 348/273, 278, 340, 279, 234, 235, 236, 237, 348/238
See application file for complete search history.

(56) References Cited

U.S. PATENT DOCUMENTS

| | | | | |
|---|---|---|---|---|
| 5,253,046 | A * | 10/1993 | Shiraishi | 348/237 |
| 5,614,947 | A * | 3/1997 | Tanizoe et al. | 348/241 |
| 6,757,016 | B1 * | 6/2004 | Ueno et al. | 348/279 |
| 2002/0044209 | A1 * | 4/2002 | Saito | 348/280 |
| 2002/0163583 | A1 * | 11/2002 | Jones | 348/272 |
| 2002/0167602 | A1 * | 11/2002 | Nguyen | 348/280 |
| 2003/0160875 | A1 * | 8/2003 | Mitsunaga et al. | 348/222.1 |
| 2004/0086177 | A1 * | 5/2004 | Zhang et al. | 382/167 |

FOREIGN PATENT DOCUMENTS

| | | |
|---|---|---|
| JP | 07-236147 | 9/1995 |
| JP | 2002-271804 | 9/2002 |

OTHER PUBLICATIONS

Murata, H. et al. "Correlative Directional Interpolation for a Progreesive Scan CCD," The Journal of the Institute of Image Information and Television Engineers, vol. 55, No. 1, pp. 120-132 (2001).

* cited by examiner

Primary Examiner—Tuan V Ho
Assistant Examiner—Kent Wang
(74) Attorney, Agent, or Firm—K & L Gates LLP

(57) ABSTRACT

An image processing apparatus is provided which includes: an image obtaining unit for obtaining a mosaic image by an image sensor having at least four kinds of filters with different spectral sensitivities, one of the at least four kinds of filters being used for each pixel; and an image processing unit for generating a color image such that intensity information at a position of each pixel, the intensity information corresponding to a number of colors determined by the spectral sensitivities of the filters, is computed for all pixels, from the mosaic image obtained by the image obtaining unit. In a color filter arrangement of the image sensor of the image obtaining unit, filters possessed by pixels arranged in a checkered manner in half of all the pixels have at least some spectral characteristics having a strong correlation with the spectral characteristic of luminance. The image processing unit calculates estimated intensity values of colors possessed by the pixels arranged in the checkered manner at each pixel and calculates a luminance value of each pixel on a basis of the estimated intensity values.

29 Claims, 66 Drawing Sheets

FIG. 9

| COLOR OF PIXEL OF INTEREST | G INTENSITY ESTIMATING UNIT OUTPUT OF SWITCH 306 | E INTENSITY ESTIMATING UNIT OUTPUT OF SWITCH 306 |
|---|---|---|
| R | d | c |
| G | a | b |
| B | c | d |
| E | b | a |

FIG.11

|   | 1 | 2 | 3 | 4 | 5 | 6 | 7 | 8 | 9 |
|---|---|---|---|---|---|---|---|---|---|
| 1 | E | R | E | R | E | R | E | R | E |
| 2 | B | G | B | G | B | G | B | G | B |
| 3 | E | R | E | R | E | R | E | R | E |
| 4 | B | G | B | G | B | G | B | G | B |
| 5 | E | R | E | R | E | R | E | R | E |
| 6 | B | G | B | G | B | G | B | G | B |
| 7 | E | R | E | R | E | R | E | R | E |
| 8 | B | G | B | G | B | G | B | G | B |
| 9 | E | R | E | R | E | R | E | R | E |

FIG.12

|   | 1 | 2 | 3 | 4 | 5 | 6 | 7 | 8 | 9 |
|---|---|---|---|---|---|---|---|---|---|
| 1 | B | G | B | G | B | G | B | G | B |
| 2 | E | R | E | R | E | R | E | R | E |
| 3 | B | G | B | G | B | G | B | G | B |
| 4 | E | R | E | R | E | R | E | R | E |
| 5 | B | G | B | G | B | G | B | G | B |
| 6 | E | R | E | R | E | R | E | R | E |
| 7 | B | G | B | G | B | G | B | G | B |
| 8 | E | R | E | R | E | R | E | R | E |
| 9 | B | G | B | G | B | G | B | G | B |

FIG. 13

|   | 1 | 2 | 3 | 4 | 5 | 6 | 7 | 8 | 9 |
|---|---|---|---|---|---|---|---|---|---|
| 1 | R | E | R | E | R | E | R | E | R |
| 2 | G | B | G | B | G | B | G | B | G |
| 3 | R | E | R | E | R | E | R | E | R |
| 4 | G | B | G | B | G | B | G | B | G |
| 5 | R | E | R | E | R | E | R | E | R |
| 6 | G | B | G | B | G | B | G | B | G |
| 7 | R | E | R | E | R | E | R | E | R |
| 8 | G | B | G | B | G | B | G | B | G |
| 9 | R | E | R | E | R | E | R | E | R |

FIG. 14

|   | 1 | 2 | 3 | 4 | 5 | 6 | 7 | 8 | 9 |
|---|---|---|---|---|---|---|---|---|---|
| 1 | R | E | R | E | R | E | R | E | R |
| 2 | G | B | G | B | G | B | G | B | G |
| 3 | R | E | R | E | R | E | R | E | R |
| 4 | G | B | G | B | G | B | G | B | G |
| 5 | R | E | R | E | R | E | R | E | R |
| 6 | G | B | G | B | G | B | G | B | G |
| 7 | R | E | R | E | R | E | R | E | R |
| 8 | G | B | G | B | G | B | G | B | G |
| 9 | R | E | R | E | R | E | R | E | R |

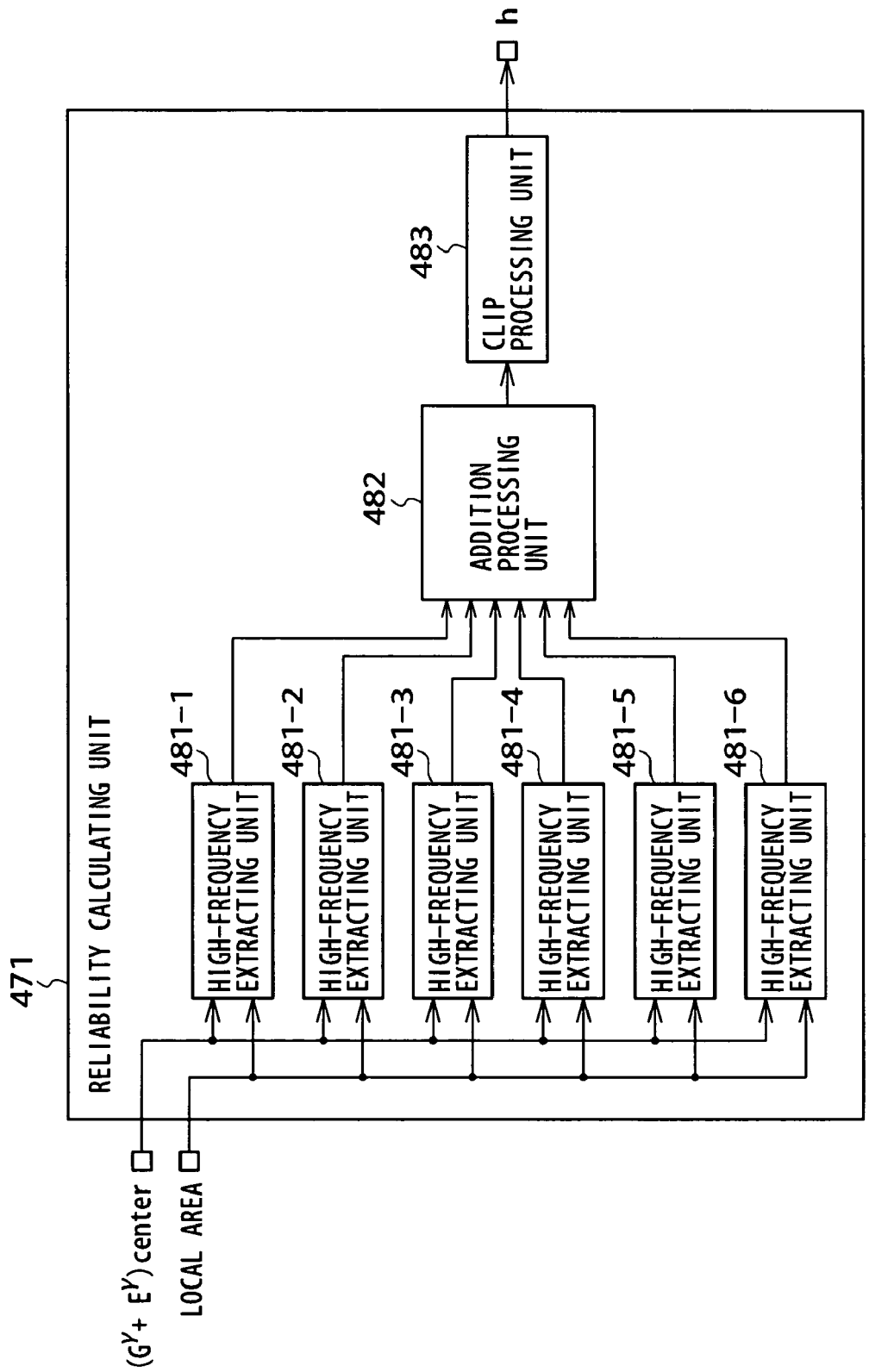

|   |   |   |   |   |   |   |   |   |
|---|---|---|---|---|---|---|---|---|
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 1 | 0 | 0 | 0 | 0 |
| 0 | 0 | 0 | 0 | 0 | 0 | 0 | 0 | 0 |
| 0 | 0 | 0 | 0 | 14| 0 | 0 | 0 | 0 |
| 0 | 0 | 0 | 0 | 0 | 0 | 0 | 0 | 0 |
| 0 | 0 | 0 | 0 | 1 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |

FIG. 34

|   |   |   |   |   |   |   |   |   |
|---|---|---|---|---|---|---|---|---|
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 2 | 0 | 2 | 0 | 0 | 0 |
| 0 | 0 | 2 | 0 | 4 | 0 | 2 | 0 | 0 |
| 0 | 0 | 0 | 4 | 0 | 4 | 0 | 0 | 0 |
| 0 | 0 | 2 | 0 | 4 | 0 | 2 | 0 | 0 |
| 0 | 0 | 0 | 2 | 0 | 2 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |

FIG. 47

| COLOR OF PIXEL OF INTEREST | OUTPUT OF SWITCH 562 |
|---|---|
| R | (c+d) |
| G | (a+b) |
| B | (c+d) |
| E | (a+b) |

| | | | | | | |
|---|---|---|---|---|---|---|
| 1 | 2 | 3 | 4 | 3 | 2 | 1 |
| 2 | 4 | 6 | 8 | 6 | 4 | 2 |
| 3 | 6 | 9 | 12 | 9 | 6 | 3 |
| 4 | 8 | 12 | 16 | 12 | 8 | 4 |
| 3 | 6 | 9 | 12 | 9 | 6 | 0 |
| 2 | 4 | 6 | 8 | 6 | 4 | 2 |
| 1 | 2 | 3 | 4 | 3 | 2 | 1 |

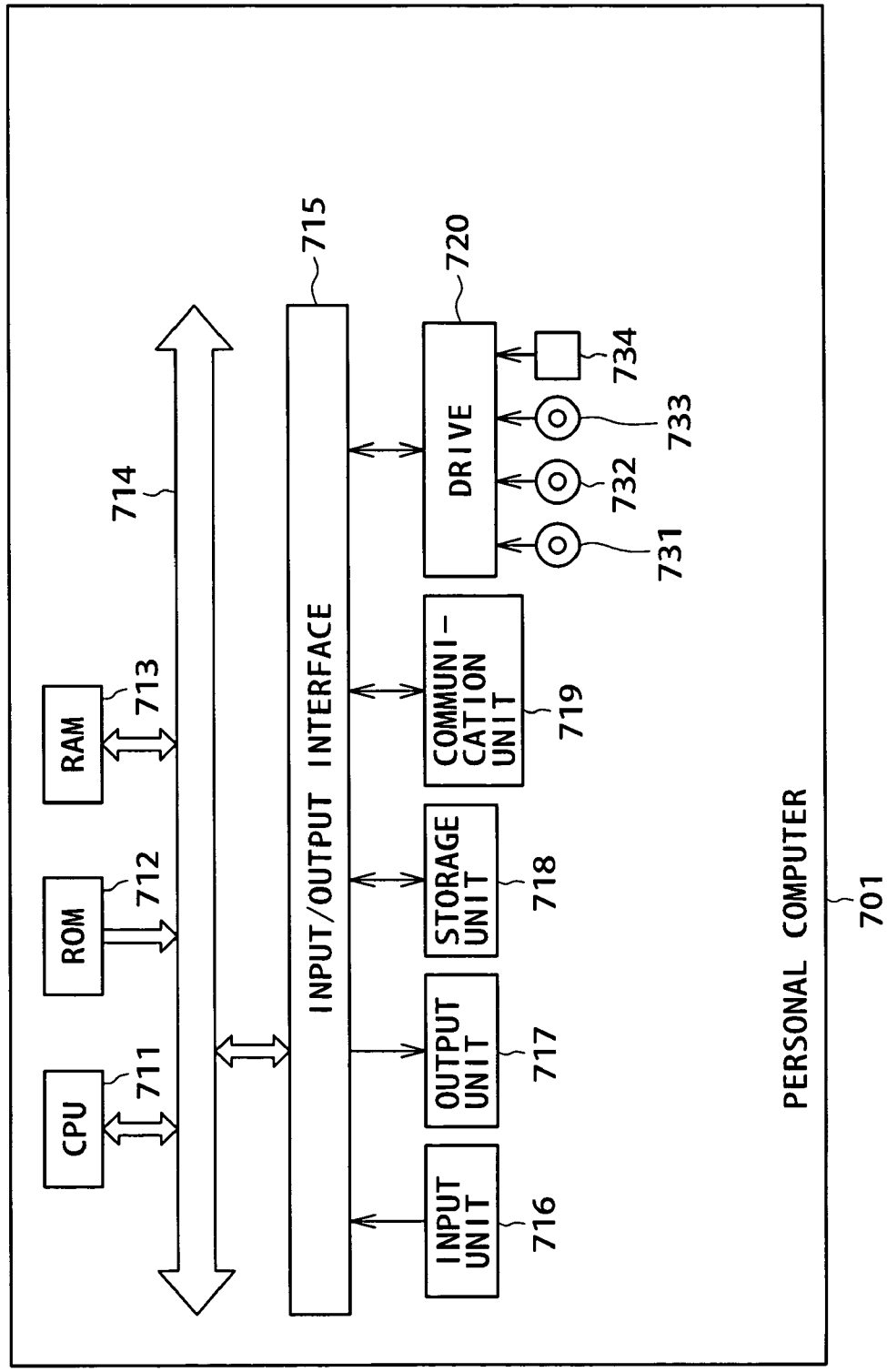

IMAGE PROCESSING APPARATUS AND IMAGE PROCESSING METHOD, AND PROGRAM

BACKGROUND OF THE INVENTION

The present invention relates to an image processing apparatus and an image processing method, and a program, and particularly to an image processing apparatus and an image processing method, and a program that are suitable for use in demosaic processing (color interpolation processing or synchronization processing) for obtaining a color image signal from a mosaic image signal obtained by using a color solid-state image pickup element by interpolating a number of colors in all pixels.

A solid-state image pickup element such as a CCD image sensor, a CMOS image sensor, or the like, generally has a structure in which light receiving elements are arranged in the form of a lattice and an amount of charge produced by photoelectric conversion of each of the light receiving elements can be read sequentially. In general, these light receiving elements have a single spectral characteristic, and, therefore, an image signal obtained from the solid-state image pickup element is one channel (monochrome) with respect to color. Thus, when a color image (an image of three channels such as RGB, for example) is desired to be obtained with a single solid-state image pickup element, a solid-state image pickup element having a filter with a different spectral characteristic (color) for each light receiving element is used. An image pickup device using such a single color solid-state image pickup element is generally referred to as a single chip color image pickup device.

Since an image signal obtained from the color solid-state image pickup element represents a one-channel image, each pixel provides only an intensity of a color of a filter of a corresponding light receiving element. That is, the image signal obtained from the color solid-state image pickup element represents a mosaic image in terms of color. In order to obtain a multi-channel image from the mosaic image as an output image of the color solid-state image pickup element of the single chip color image pickup device, it is necessary to interpolate color information of pixels of the mosaic image in pixel positions around the pixels by appropriate image processing. Such image processing is generally referred to as color interpolation processing, demosaic processing, synchronization processing, or the like. Thus, the demosaic processing is essential in single chip color image pickup devices using color solid-state image pickup elements. Conventionally, various techniques for the demosaic processing have been developed.

A problem in this demosaic processing is characteristics of reproduction of a high-frequency image signal. In the solid-state image pickup element, different on-chip color filters are stuck on light receiving elements arranged in the form of a two-dimensional lattice and, therefore, pixels having the same color (that is, the same spectral sensitivity) are arranged at a pitch larger than an original arranging pitch of the light receiving elements. Thus color solid-state image pickup element is more prone to aliasing of the picked-up image than a monochrome solid-state image pickup element without on-chip color filters. When aliasing occurs in a luminance component of an image, it is often observed as jaggginess at a contour portion of a subject. Suppression of jagginess is an important problem in the demosaic processing.

FIG. 1 shows a Bayer arrangement of a primary color system. The color arrangement now is most widely used. The Bayer arrangement uses color filters of three colors R, G, and B with G arranged in a checkered manner and with R and B arranged on a line-sequential basis (the Bayer arrangement of the primary color system hereinafter will be referred to simply as a Bayer arrangement). In the Bayer arrangement, since G is arranged in the checkered manner, a G signal is present in all horizontal and vertical phases, while since R and B are arranged on the line-sequential basis, a signal corresponding to each of R and B is present only in every other line in both a horizontal direction and a vertical direction.

Of R, G, and B in the Bayer arrangement, G, which has a spectral characteristic closest to a characteristic of visual sensitivity of a human, is most densely present. According to conventionally used techniques, a method of creating a luminance component from only G pixel information is mainstream. In this method, a limit of frequency of a luminance component reproduced, which limit is determined by G sampling frequency of the Bayer arrangement, is 0.5 cycle/pixel in the horizontal direction and the vertical direction, and $1/(2\times sqrt(2))$ cycle/pixel in an oblique 45-degree direction. While the limit is highest in the horizontal direction or the vertical direction in theory, G is present only in every other line in the horizontal direction or the vertical direction in practice. Therefore, in order to reproduce horizontal or vertical waves of 0.5 cycle/pixel, an optimum interpolation filter needs to be applied to each of the horizontal or vertical waves. In order to deal with this problem, there are techniques in which an optimum interpolation filter is provided for waves in the horizontal direction and the vertical direction, a wave direction in each local area on an image is determined, and a value obtained by synthesizing a result of the horizontal direction interpolation filter and a result of the vertical direction interpolation filter according to a result of the determination is set as an interpolated value (for example, Patent Document 1 and Non-Patent Document 1). By using these techniques, it is possible to reproduce high frequencies close to the theoretical limit of 0.5 cycle/pixel in the horizontal direction and the vertical direction using the G pixel information of the Bayer arrangement.

[Patent Document 1]

Japanese Patent Laid-open No. Hei 7-236147

[Non-Patent Document 1]

Murata, Mori, Maenaka, Okada, and Chihara, "Correlative Directional Interpolation for a Progressive Scan CCD," The Journal of the Institute of Image Information and Television Engineers, Vol. 55, No. 1, pp. 120-132, 2001

On the other hand, it is theoretically impossible to make the spectral characteristics of the on-chip color filters used in the color solid-state image pickup element coincide with color matching functions of human vision. Accordingly, there is, for example, a method that uses an image pickup device for obtaining intensities of four colors provided by adding another color to the three primary colors of the Bayer arrangement, and obtains intensity values of the three primary colors by applying a linear matrix to the intensities of the four colors obtained by such an image pickup device, thus improving color reproducibility of the image pickup device. There is, for example, a technique that can improve color reproducibility using a color solid-state image pickup element having a four-color arrangement obtained by adding a yellow on-chip filter to the three conventional primary colors to obtain intensities of the four colors (for example Patent Document 2).

[Patent Document 2]

Japanese Patent Laid-open No. 2002-271804

However, it is not specifically shown in the conventional technique using color filters in the four-color arrangement what kind of demosaic processing is to be performed to obtain four color intensities synchronized in each pixel from the four-color arrangement.

A four-color arrangement of a complementary color system (cyan, magenta, yellow, and green) is conventionally used in image pickup elements such as video cameras and the like. Color filters having the four-color arrangement of the primary color system, are similarly in practical use. Since the conventional four-color arrangement of the primary color system makes it impossible to assign G to half of all pixels as in the Bayer arrangement, the conventional technique for reproducing high frequencies of a luminance component using the checkered G arrangement cannot be used. Thus, the use of the conventional four-color arrangement of the primary color system improves color reproducibility, but results in noticeable jagginess appearing without a high-frequency luminance component being reproduced or results in a smoothed dull image.

SUMMARY OF THE INVENTION

The present invention has been made in view of the above, wherein accordingly, the present invention seeks to improve reproducibility of a high-frequency luminance component, reduce jagginess, and improve perceived resolution in a single chip color image pickup device using an arrangement composed of four or more colors of a primary color system.

According to the present invention, there is provided an image processing apparatus including: an image obtaining unit for obtaining a mosaic image by an image sensor having at least four kinds of filters with different spectral sensitivities, one of the at least four kinds of filters being used for each pixel; and an image processing unit for generating a color image such that intensity information at a position of each pixel, the intensity information corresponding to a number of colors determined by the spectral sensitivities of the filters, is computed for all pixels, from the mosaic image obtained by the image obtaining unit. In a color filter arrangement of the image sensor of the image obtaining unit, filters possessed by pixels arranged in a checkered manner in half of all the pixels have some sorts of spectral characteristics having a strong correlation with the spectral characteristic (for example the relative luminosity curve) of luminance, and the image processing unit calculates estimated intensity values of colors possessed by the pixels arranged in the checkered manner at each pixel and calculates a luminance value of each pixel on a basis of the estimated intensity values.

According to the present invention, there also is provided an image processing method including: an obtaining step for obtaining a mosaic image by an image sensor having at least four kinds of filters with different spectral sensitivities, one of the at least four kinds of filters being used for each pixel; and an image processing step for generating a color image such that intensity information at a position of each pixel, the intensity information corresponding to a number of colors determined by the spectral sensitivities of the filters, is computed for all pixels, from the mosaic image obtained by a process of the obtaining step. In the process of the obtaining step, the mosaic image is obtained which has a color arrangement such that filters possessed by pixels arranged in a checkered manner in half of all the pixels have some sorts of spectral characteristics having a strong correlation with the spectral characteristic (for example, the relative luminosity curve) of luminance. The image processing step includes a calculating step for calculating estimated intensity values of colors possessed by the pixels arranged in the checkered manner at each pixel and calculating a luminance value of each pixel on a basis of the estimated intensity values.

According to the present invention, there also is provided a program for making a computer perform a process including: an obtaining step for obtaining a mosaic image by an image sensor having at least four kinds of filters with different spectral sensitivities, one of the at least four kinds of filters being used for each pixel; and an image processing step for generating a color image such that intensity information at a position of each pixel, the intensity information corresponding to a number of colors determined by the spectral sensitivities of the filters, is computed for all pixels, from the mosaic image obtained by a process of the obtaining step. In the process of the obtaining step, the mosaic image is obtained which has a color arrangement such that filters possessed by pixels arranged in a checkered manner in half of all the pixels have some sorts of spectral characteristics having a strong correlation with the spectral characteristic (for example, the relative luminosity curve) of luminance. The image processing step includes a calculating step for calculating estimated intensity values of colors possessed by the pixels arranged in the checkered manner at each pixel and calculating a luminance value of each pixel on a basis of the estimated intensity values.

The image processing apparatus and the image processing method, and the program according to the present invention obtain a mosaic image by an image sensor having at least four kinds of filters with different spectral sensitivities, one of the at least four kinds of filters being used for each pixel, calculate, from the obtained mosaic image, estimated intensity values of a filter color arranged in a checkered manner in the mosaic image and having a strong correlation with a spectral characteristic (for example, the relative luminosity curve) of luminance, calculate a luminance value of each pixel on a basis of the estimated intensity values, and further generate a color image such that intensity information at a position of each pixel, the intensity information corresponding to a number of colors determined by the spectral sensitivities of the filters, is computed for all pixels by operations based on the luminance value.

According to the present invention, a mosaic image is obtained and processed to generate a color image. In particular, estimated intensity values of a filter color arranged in a checkered manner in the mosaic image and having a strong correlation with a spectral characteristic (for example, the relative luminosity curve) of luminance are calculated from the obtained mosaic image. A luminance value of each pixel is calculated on a basis of the estimated intensity values. Further, a color image is generated by operations based on the luminance value such that intensity information at a position of each pixel, the intensity information corresponding to a number of colors determined by the spectral sensitivities of filters, is computed for all pixels. It is, thus, possible to improve reproducibility of a high-frequency luminance component, reduce jagginess, and improve perceived resolution in a single chip color image pickup device using an arrangement composed of four or more colors of a primary color system.

Additional features and advantages of the present invention are described in, and will be apparent from, the following Detailed Description of the Invention and the Figures.

BRIEF DESCRIPTION OF THE FIGURES

FIG. 9 is a diagram of assistance in explaining processing of a switch in FIG. 8.

FIG. 11 is a diagram of assistance in explaining a first color and a second color selected by a rough interpolation processing unit in FIG. 10.

FIG. 12 is a diagram of assistance in explaining a first color and a second color selected by a rough interpolation processing unit in FIG. 10.

FIG. 13 is a diagram of assistance in explaining a first color and a second color selected by a rough interpolation processing unit in FIG. 10.

FIG. 14 is a diagram of assistance in explaining a first color and a second color selected by a rough interpolation processing unit in FIG. 10.

FIG. 18 is a block diagram showing a configuration of a reliability calculating unit in FIG. 17.

FIGS. 19A and 19B are diagrams of assistance in explaining positions where pixel intensities are extracted in the reliability calculating unit.

Figures 31, 32:
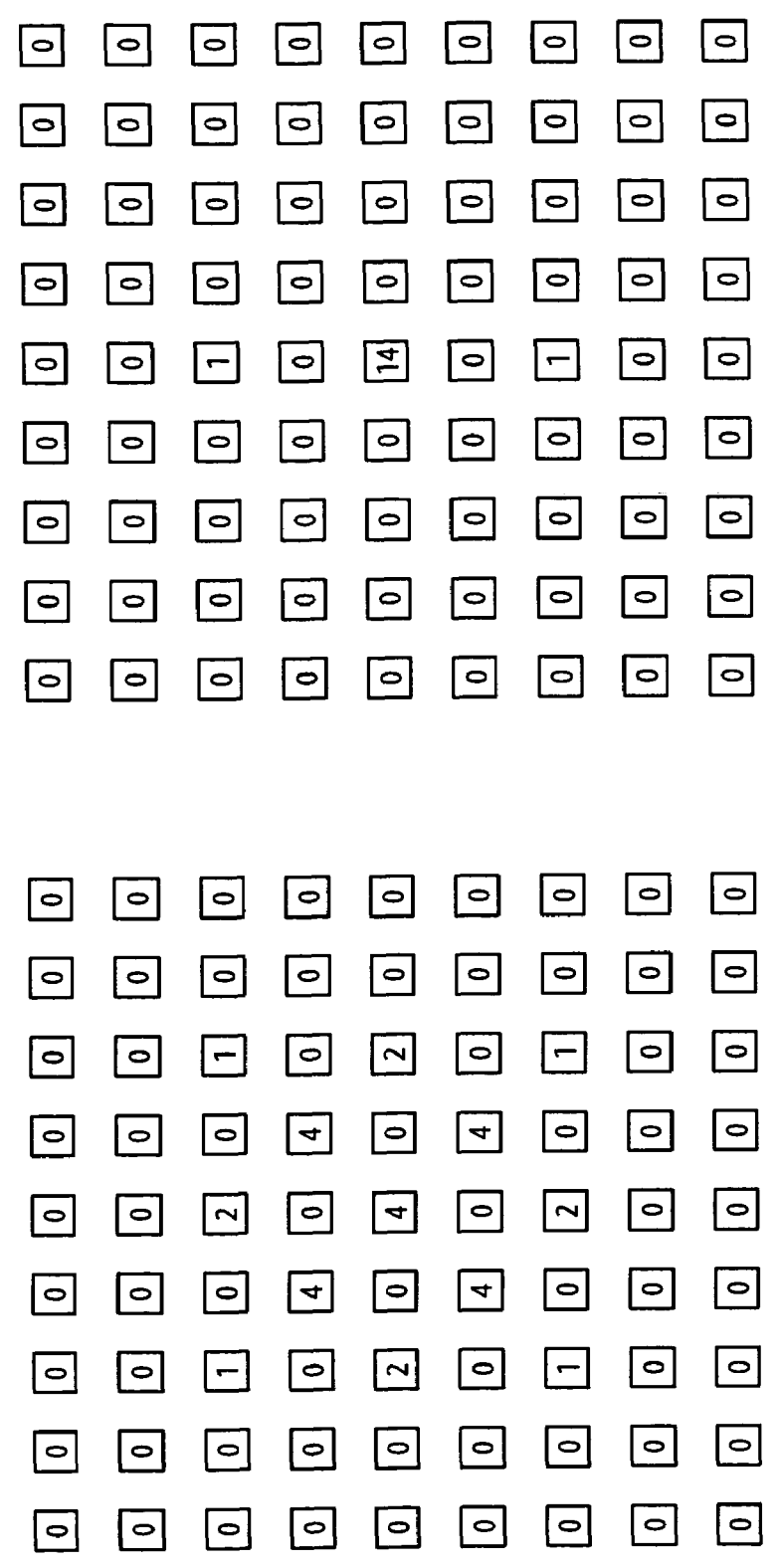

FIG. 31 is a diagram of assistance in explaining weighting values.

FIG. 32 is a diagram of assistance in explaining weighting values.

FIG. 33 is a diagram of assistance in explaining weighting values.

FIG. 34 is a diagram of assistance in explaining weighting values.

FIG. 47 is a diagram of assistance in explaining processing of a switch in FIG. 46.

FIG. 58 is a diagram of assistance in explaining a first color and a second color selected by a rough interpolation processing unit in FIG. 57.

FIG. 59 is a diagram of assistance in explaining a first color and a second color selected by a rough interpolation processing unit in FIG. 57.

FIG. 60 is a diagram of assistance in explaining weighting values.

FIG. 69 is a block diagram showing a configuration of a personal computer.

DETAILED DESCRIPTION OF THE INVENTION

Figure 1:
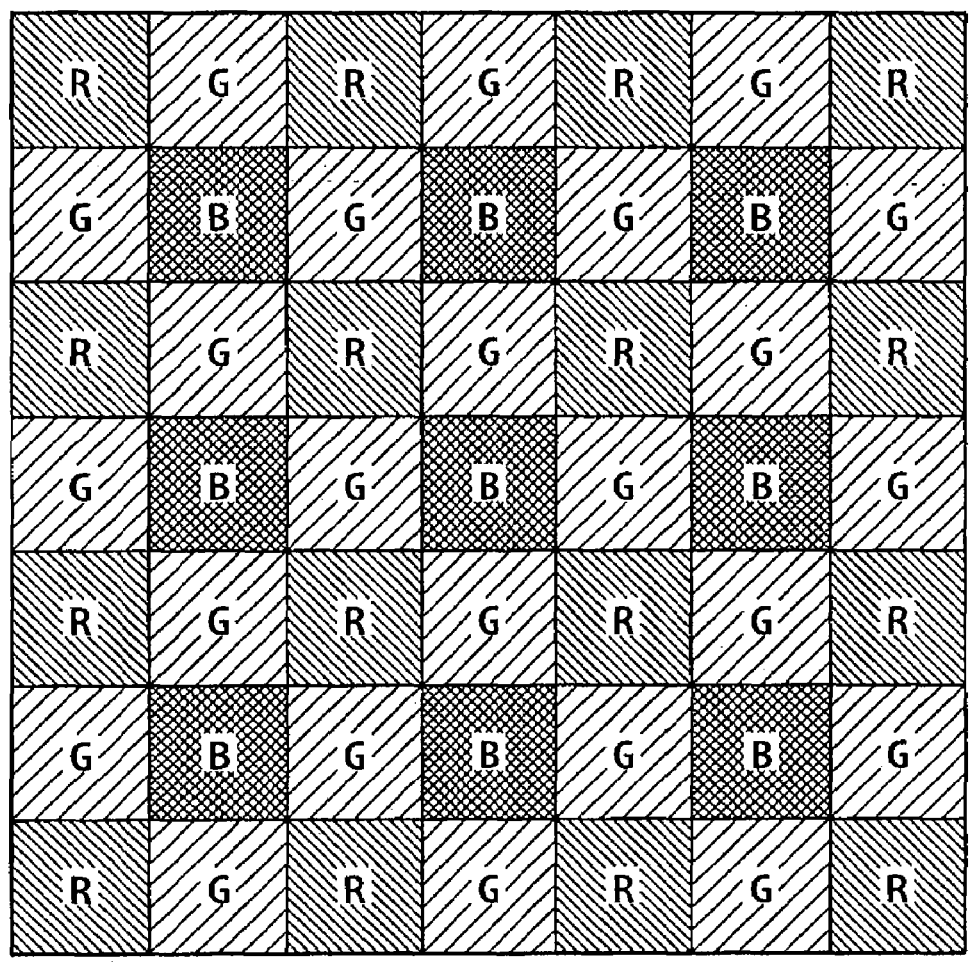
FIG. 1 is a diagram of assistance in explaining a Bayer arrangement.

The present invention provides for an information processing apparatus. The information processing apparatus (for example, a digital still camera 201 of FIG. 2) includes an image obtaining unit (for example, a CCD image sensor 213 in FIG. 2) and an image processing unit (for example, a demosaic processing unit 253 in FIG. 5). The image obtaining unit obtains a mosaic image by an image sensor having at least four kinds of filters (for example, color filters corresponding to RGBE colors) with different spectral sensitivities. One of the at least four kinds of filters is used for each pixel. The image processing unit generates a color image such that intensity information, which corresponds to a number of colors determined by the spectral sensitivities of the filters, at a position of each pixel is computed for all pixels from the mosaic image obtained by the image obtaining unit. The color filters of the image sensor of the image obtaining unit are arranged such that filters possessed by pixels arranged in a checkered manner in half of all the pixels have some sorts of spectral characteristics having a strong correlation with the spectral characteristic (for example, the relative luminosity curve) of luminance, and the image processing unit calculates estimated intensity values of colors possessed by the pixels arranged in the checkered manner at each pixel and calculates a luminance value of each pixel on a basis of the estimated intensity value. By using the luminance information, it is possible to generate a color image such that intensity information, which corresponds to the number of colors determined by the spectral sensitivities of the filters, at a position of each pixel is arranged for all the pixels.

The color filters of the image sensor of the image obtaining unit are arranged as follows. Of the at least four kinds of filters, first filters corresponding to a first color (for example, G) having a spectral characteristic having a strong correlation with the spectral characteristic of luminance (for example, the relative luminosity curve) are arranged horizontally and vertically in every other line. A second filter corresponding to a second color (for example, E) different from the first color and having a spectral characteristic having a strong correlation with the spectral characteristic of luminance (for example, the relative luminosity curve) is arranged horizontally and vertically in every other line and in lines different from lines of the first filter. The image processing unit can include a first calculating unit (for example, a G intensity estimating unit 291 in FIG. 7), a second calculating unit (for example, an E intensity estimating unit 292 in FIG. 7), and a synthesizing unit (for example, an addition processing unit 293 in FIG. 7). The first calculating unit calculates a first estimated intensity value as an estimated intensity value of the first color at a position of a pixel of interest in the mosaic image. The second calculating unit calculates a second estimated intensity value as an estimated intensity value of the second color at the position of the pixel of interest. The synthesizing unit synthesizes the first estimated intensity value calculated by the first calculating unit with the second estimated intensity value calculated by the second calculating unit.

Figure 8:
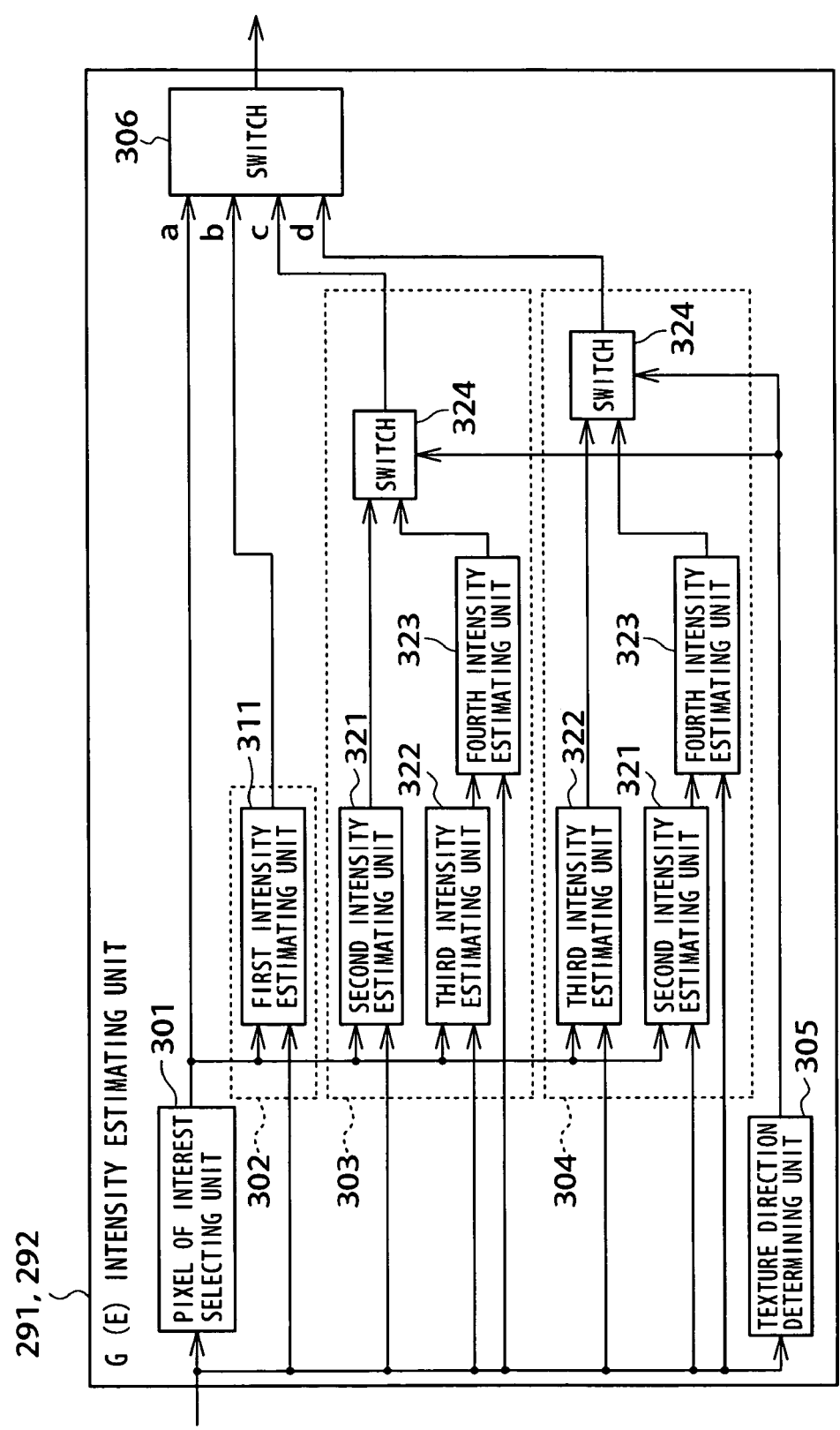
FIG. 8 is a block diagram showing a configuration of a G intensity estimating unit and an E intensity estimating unit in FIG. 7.

The first calculating unit can include a third calculating unit (for example, a first intensity estimating unit 311, a second intensity estimating unit 321, or a third intensity estimating unit 322 in FIG. 8). The third calculating unit calculates an estimated intensity value corresponding to a target color at the position of the pixel of interest on a basis of an intensity value corresponding to a known color already obtained at the position of the pixel of interest and a correlation between the known color and the target color desired to be estimated. The correlation is calculated from pixels in proximity to the pixel of interest. When the pixel of interest is not of the first color, the third calculating unit can calculate the first estimated intensity value with the color of the filter at the position of the pixel of interest as the known color and the first color as the target color.

Figure 16:
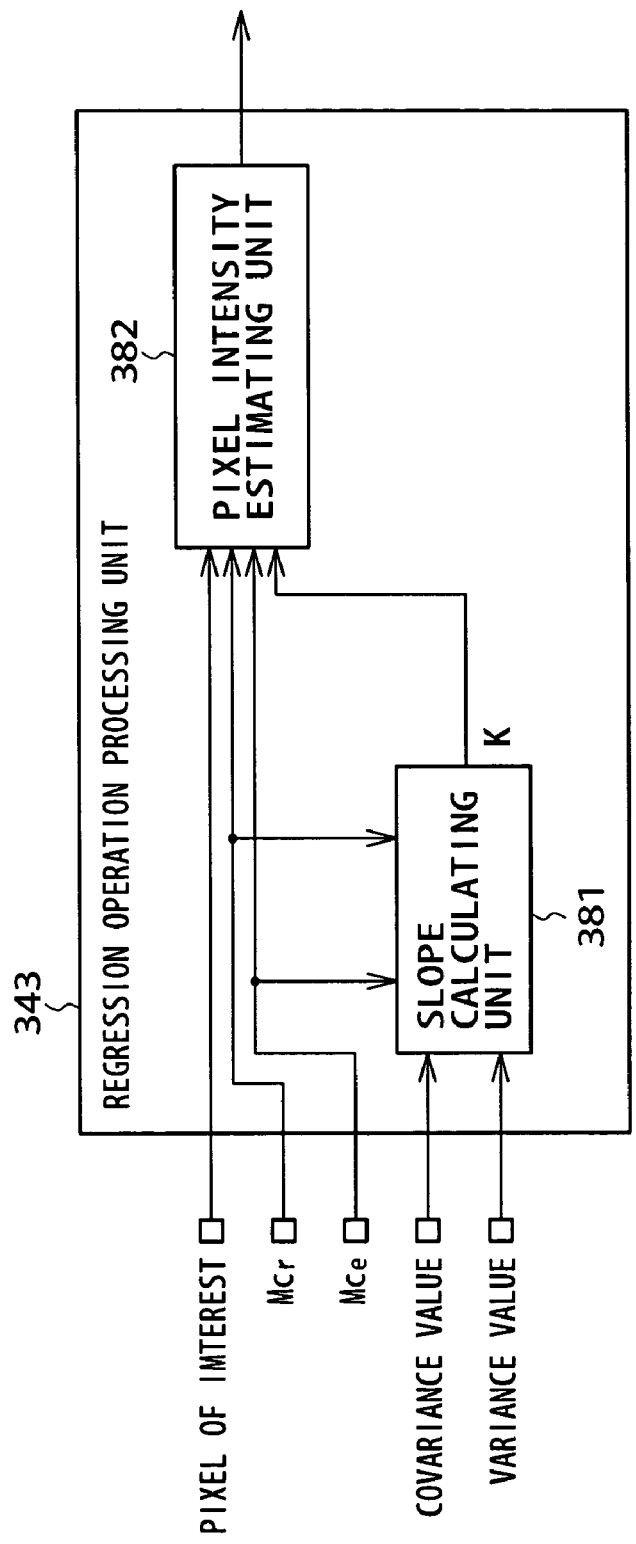
FIG. 16 is a block diagram showing a configuration of a regression operation processing unit in FIG. 10.

The third calculating unit can include a generating unit (for example, a rough interpolation processing unit 341 in FIG. 10), a fourth calculating unit (for example, a statistic calculating unit 342 in FIG. 10 and a slope calculating unit 381 in FIG. 16), and a fifth calculating unit (for example, a pixel intensity estimating unit 382 in FIG. 16). The generating means generates a number of sets of pixel intensities of pixels corresponding to the known color and pixel intensities of the pixels corresponding to the target color in proximity to the pixel of interest. The fourth calculating unit calculates a center of gravity and a slope of a color distribution between the known color and the target color from the number of sets of the pixel intensities of the pixels corresponding to the known color and the pixel intensities of the pixels corresponding to the target color. The number of sets is generated by the generating unit. The fifth calculating unit calculates the estimated intensity value corresponding to the target color at the position of the pixel of interest on a basis of the center of gravity and the slope of the color distribution calculated by the fourth calculating unit and the intensity value corresponding to the known color at the position of the pixel of interest.

The fifth calculating unit can calculate the estimated intensity value corresponding to the target color at the position of the pixel of interest using a regression operation (for example, an operation by Equation (10), Equation (11), or Equation (12)).

The second calculating unit can include a third calculating unit (for example, a first intensity estimating unit 311, a second intensity estimating unit 321, or a third intensity estimating unit 322 in FIG. 8). The second calculating unit calculates an estimated intensity value corresponding to a target color at the position of the pixel of interest on a basis of an intensity value corresponding to a known color already obtained at the position of the pixel of interest and a correlation between the known color and the target color desired to be estimated. The correlation is calculated from pixels in proximity to the pixel of interest. When the pixel of interest is not of the second color, the third calculating unit can calculate the second estimated intensity value with the color of the filter at the position of the pixel of interest as the known color and the second color as the target color.

The third calculating unit can include a generating unit (for example, a rough interpolation processing unit 341 in FIG.

10), a fourth calculating unit (for example, a statistic calculating unit 342 in FIG. 10 and a slope calculating unit 381 in FIG. 16), and a fifth calculating unit (for example, a pixel intensity estimating unit 382 in FIG. 16). The generating unit generates a number of sets of pixel intensities of pixels corresponding to the known color and pixel intensities of the pixels corresponding to the target color in proximity to the pixel of interest. The fourth calculating unit calculates a center of gravity and a slope of a color distribution between the known color and the target color from the number of sets of the pixel intensities of the pixels corresponding to the known color and the pixel intensities of the pixels corresponding to the target color. The number of sets is generated by the generating unit. The fifth calculating unit calculates the estimated intensity value corresponding to the target color at the position of the pixel of interest on a basis of the center of gravity and the slope of the color distribution calculated by the fourth calculating unit and the intensity value corresponding to the known color at the position of the pixel of interest.

The fifth calculating unit can calculate the estimated intensity value corresponding to the target color at the position of the pixel of interest using a regression operation (for example, an operation by Equation (10), Equation (11), or Equation (12)).

The first calculating unit can include more than one third calculating unit. The third calculating unit calculates an estimated intensity value corresponding to a target color at the position of the pixel of interest on a basis of an intensity value corresponding to a known color already obtained at the position of the pixel of interest and a correlation between the known color and the target color desired to be estimated. The correlation is calculated from pixels in proximity to the pixel of interest. When the pixel of interest is not of the first color, a first third calculating unit (for example, a second intensity estimating unit 321 or a third intensity estimating unit 322 in FIG. 8) can calculate an intensity value corresponding to the second color at the position of the pixel of interest with the color of the filter at the position of the pixel of interest as the known color and the second color as the target color. A second third calculating unit (for example, a fourth intensity estimating unit 323 in FIG. 8) can calculate the first estimated intensity value with the second color as the known color and the first color as the target color.

The third calculating unit can include a generating unit (for example, a rough interpolation processing unit 341 in FIG. 10), a fourth calculating unit (for example, a statistic calculating unit 342 in FIG. 10 and a slope calculating unit 381 in FIG. 16), and a fifth calculating unit (for example a pixel intensity estimating unit 382 in FIG. 16). The generating unit generates a number of sets of pixel intensities of pixels corresponding to the known color and pixel intensities of the pixels corresponding to the target color. The fourth calculating unit calculates a center of gravity and a slope of a color distribution between the known color and the target color from the number of sets of the pixel intensities of the pixels corresponding to the known color and the pixel intensities of the pixels corresponding to the target color. The number of sets is generated by the generating unit. The fifth calculating unit calculates the estimated intensity value corresponding to the target color at the position of the pixel of interest on a basis of the center of gravity and the slope of the color distribution calculated by the fourth calculating unit and the intensity value corresponding to the known color at the position of the pixel of interest.

The fifth calculating unit can calculate the estimated intensity value corresponding to the target color at the position of the pixel of interest using a regression operation (for example, an operation by Equation (10), Equation (11), or Equation (12)).

The second calculating unit can include more than one third calculating unit. The third calculating unit calculates an estimated intensity value corresponding to a target color at the position of the pixel of interest on a basis of an intensity value corresponding to a known color already obtained at the position of the pixel of interest and a correlation between the known color and the target color desired to be estimated. The correlation is calculated from pixels in proximity to the pixel of interest. When the pixel of interest is not of the second color, first a third calculating unit (for example, a second intensity estimating unit 321 or a third intensity estimating unit 322 in FIG. 8) can calculate an intensity value corresponding to the first color at the position of the pixel of interest with the color of the filter at the position of the pixel of interest as the known color and the first color as the target color. A second third calculating unit (for example, a fourth intensity estimating unit 323 in FIG. 8) can calculate the second estimated intensity value with the first color as the known color and the second color as the target color.

The third calculating unit can include a generating unit (for example, a rough interpolation processing unit 341 in FIG. 10), a fourth calculating unit (for example, a statistic calculating unit 342 in FIG. 10 and a slope calculating unit 381 in FIG. 16), and a fifth calculating unit (for example, a pixel intensity estimating unit 382 in FIG. 16). The generating unit generates a number of sets of pixel intensities of pixels corresponding to the known color and pixel intensities of the pixels corresponding to the target color. The fourth calculating unit calculates a center of gravity and a slope of a color distribution between the known color and the target color from the number of sets of the pixel intensities of the pixels corresponding to the known color and the pixel intensities of the pixels corresponding to the target color. The number of sets is generated by the generating unit. The fifth calculating unit calculates the estimated intensity value corresponding to the target color at the position of the pixel of interest on a basis of the center of gravity and the slope of the color distribution calculated by the fourth calculating unit and the intensity value corresponding to the known color at the position of the pixel of interest.

The fifth calculating unit can calculate the estimated intensity value corresponding to the target color at the position of the pixel of interest using a regression operation (for example, an operation by Equation (10), Equation (11), or Equation (12)).

The first calculating unit can include a first intensity estimating unit (for example, a second intensity estimating unit 321 in a second processing block 303 or a third intensity estimating unit 322 in a third processing block 304 in FIG. 8), a second intensity estimating unit (for example, a third intensity estimating unit 322 and a fourth intensity estimating unit 323 in the second processing block 303 or a second intensity estimating unit 321 and a fourth intensity estimating unit 323 in the third processing block 304 in FIG. 8), a determining unit (for example, a texture direction determining unit 305 in FIG. 8), and a selecting unit (for example, a switch 324 in FIG. 8). The first intensity estimating unit calculates a first estimated value for the first estimated intensity value. The second intensity estimating unit calculates a second estimated value for the first estimated intensity value. The determining unit determines a texture direction in proximity of the pixel of interest. The selecting unit selects a suitable estimated value from the first estimated value estimated by the first intensity estimating unit and the second estimated value estimated by the second intensity estimating unit on a basis of a result of determination by the determining unit. The first intensity estimating unit can include a third calculating unit (for example, the second intensity estimating unit 321 or the third intensity estimating unit 322 in FIG. 8). The third calculating unit calculates an estimated intensity value corresponding to a target color at the position of the pixel of interest on a basis of an intensity value corresponding to a known color already obtained at the position of the pixel of interest and a correlation between the known color and the target color desired to be estimated. The correlation is calculated from pixels in proximity to the pixel of interest. When the pixel of interest is not of the first color, the third calculating unit can calculate the first estimated value for the first estimated intensity value with the color of the filter at the position of the pixel of interest as the known color and the first color as the target color. The second intensity estimating unit can include more than one third calculating unit. When the pixel of interest is not of the first color, the third calculating unit (for example, the second intensity estimating unit 321 or the third intensity estimating unit 322 in FIG. 8) can calculate an intensity value corresponding to the second color at the position of the pixel of interest with the color of the filter at the position of the pixel of interest as the known color and the second color as the target color. A second third calculating unit (for example, the fourth intensity estimating unit 323 in FIG. 8) can calculate the second estimated value for the first estimated intensity value with the second color as the known color and the first color as the target color. The selecting unit can select the suitable estimated value from the first estimated value estimated by the first intensity estimating unit and the second estimated value estimated by the second intensity estimating unit on a basis of the result of determination by the determining unit and whether filters corresponding to the first color are situated in a horizontal direction or situated in a vertical direction with respect to the position of the pixel of interest.

The second calculating unit can include a first intensity estimating unit (for example, a second intensity estimating unit 321 in a second processing block 303 or a third intensity estimating unit 322 in a third processing block 304 in FIG. 8), a second intensity estimating unit (for example, a third intensity estimating unit 322 and a fourth intensity estimating unit 323 in the second processing block 303 or a second intensity estimating unit 321 and a fourth intensity estimating unit 323 in the third processing block 304 in FIG. 8), a determining unit (for example, a texture direction determining unit 305 in FIG. 8), and a selecting unit (for example, a switch 324 in FIG. 8). The first intensity estimating unit calculates a first estimated value for the second estimated intensity value. The second intensity estimating unit calculates a second estimated value for the second estimated intensity value. The determining unit determines a texture direction in proximity of the pixel of interest. The selecting unit selects a suitable estimated value from the first estimated value estimated by the first intensity estimating unit and the second estimated value estimated by the second intensity estimating unit on a basis of a result of determination by the determining unit. The first intensity estimating unit can include third calculating unit (for example, the second intensity estimating unit 321 or the third intensity estimating unit 322 in FIG. 8). The third calculating unit calculates an estimated intensity value corresponding to a target color at the position of the pixel of interest on a basis of an intensity value corresponding to a known color already obtained at the position of the pixel of interest and a correlation between the known color and the target color desired to be estimated. The correlation is calculated from pixels in proximity to the pixel of interest. When the pixel of interest is not of the second color, the third calculating unit can calculate the first estimated value for the second estimated intensity value with the color of the filter at the position of the pixel of interest as the known color and the second color as the target color. The second intensity estimating unit can include more than one third calculating unit. When the pixel of interest is not of the second color, a first third calculating unit (for example, the second intensity estimating unit 321 or the third intensity estimating unit 322 in FIG. 8) can calculate an intensity value corresponding to the first color at the position of the pixel of interest with the color of the filter at the position of the pixel of interest as the known color and the first color as the target color. A second third calculating unit (for example, the fourth intensity estimating unit 323 in FIG. 8) can calculate the second estimated value for the second estimated intensity value with the first color as the known color and the second color as the target color. The selecting unit can select the suitable estimated value from the first estimated value estimated by the first intensity estimating unit and the second estimated value estimated by the second intensity estimating unit on a basis of the result of determination by the determining unit and whether filters corresponding to the second color are situated in a horizontal direction or situated in a vertical direction with respect to the position of the pixel of interest.

The at least four kinds of filters of the image sensor of the image obtaining unit can be arranged as follows. Filters of a third color (for example R) different from any of the first color and the second color of the filters are arranged horizontally and vertically in every other line and in horizontal lines different from horizontal lines of the first filter. Filters of a fourth color (for example B) different from any of the first color, the second color, and the third color of the filters are arranged horizontally and vertically in every other line and in horizontal lines different from horizontal lines of the second filter.

The at least four kinds of filters of the image sensor of the image obtaining unit can be arranged as follows. Filters of a third color (for example, R1 in FIG. 53) and a fourth color (for example, R2 in FIG. 53) different from any of the first color and the second color of the filters are alternately arranged horizontally and vertically in every other line and in horizontal lines different from horizontal lines of the first filter. Filters of a fifth color (for example, B1 in FIG. 53) and a sixth color (for example, B2 in FIG. 53) different from any of the first color, the second color, the third color, and the fourth color of the filters are alternately arranged horizontally and vertically in every other line and in horizontal lines different from horizontal lines of the second filter.

The third color and the fourth color can have spectral characteristics having a high correlation with each other, and the fifth color and the sixth color can have spectral characteristics having a high correlation with each other.

The third color and the fourth color can be an identical color.

The fifth color and the sixth color can be an identical color.

The color filters of the image sensor of the image obtaining unit are arranged as follows. Of the at least four kinds of filters, first filters corresponding to a first color (for example, G) having a spectral characteristic having a strong correlation with a spectral characteristic (for example, the relative luminosity curve) of luminance are arranged in a checkered manner. The image processing unit includes a first calculating unit (for example, a first intensity estimating unit 621 or a second intensity estimating unit 622 in FIG. 56). The first calculating unit can calculate a first estimated intensity value with the color of the filter at a position of a pixel of interest as a known color and the first color as a target color.

The first calculating unit can include a generating unit (for example, a rough interpolation processing unit 631 in FIG. 57), a second calculating unit (for example, a statistic calculating unit 342 in FIG. 57 and a slope calculating unit 381 in FIG. 16), and a third calculating unit (for example, a pixel intensity estimating unit 382 in FIG. 16). The generating unit generates a number of sets of pixel intensities of pixels corresponding to the known color and pixel intensities of the pixels corresponding to the target color. The second calculating unit calculates a center of gravity and a slope of a color distribution between the known color and the target color from the number of sets of the pixel intensities of the pixels corresponding to the known color and the pixel intensities of the pixels corresponding to the target color. The number of sets is generated by the generating unit. The third calculating unit calculates an estimated intensity value corresponding to the target color at the position of the pixel of interest on a basis of the center of gravity and the slope of the color distribution calculated by the second calculating unit and an intensity value corresponding to the known color at the position of the pixel of interest.

The second calculating unit can calculate the estimated intensity value corresponding to the target color at the position of the pixel of interest using a regression operation (for example, an operation by Equation (10), Equation (11), or Equation (12)).

The at least four kinds of filters of the image sensor of the image obtaining unit can be arranged as follows. Filters of a second color (for example, R) different from the first color of the filters are arranged horizontally and vertically in every other line. At filter positions where the filters of the first color and the second color are not arranged, filters of a third color (for example, B) and a fourth color (for example, E) different from any of the first color and the second color of the filters are arranged so as to form an oblique lattice in every other pixel in an oblique direction.

The second color can be a filter color having a spectral characteristic having sensitivity on a side of a longer wavelength than a wavelength of the first color. At least one of the third color and the fourth color can be a filter color having a spectral characteristic having sensitivity on a side of a shorter wavelength than the wavelength of the first color.

The at least four kinds of filters of the image sensor of the image obtaining unit can be arranged as follows. Of the filters, filters of a second color (for example, R1 in FIG. 68), a third color (for example, R2 in FIG. 68), a fourth color (for example, B1 in FIG. 68), and a fifth color (for example, B2 in FIG. 68) different from the first color are each arranged horizontally and vertically in every fourth line and so as to form an oblique lattice in every other pixel in an oblique direction. The second color and the third color, and the fourth color and the fifth color are positioned on horizontal lines and vertical lines different from each other.

The second color and the third color can have spectral characteristics having a high correlation with each other, and the fourth color and the fifth color can have spectral characteristics having a high correlation with each other.

The second color and the third color can be an identical color.

The fourth color and the fifth color can be an identical color.

Further, the present invention provides an information processing method. The information processing method includes an obtaining step (for example, a process in step S1 in FIG. 23) and an image processing step (for example, a process in step S4 in FIG. 23). The obtaining step obtains a mosaic image by an image sensor having at least four kinds of filters (for example color filters corresponding to RGBE colors) with different spectral sensitivities. One of the at least four kinds of filters is used for each pixel. The image processing step generates a color image such that intensity information at a position of each pixel is computed for all pixels from the mosaic image obtained by a process of the obtaining step. The intensity information corresponds to a number of colors determined by the spectral sensitivities of the filters. In the process of the obtaining step, the mosaic image is obtained which has a color arrangement such that filters possessed by pixels arranged in a checkered manner in half of all the pixels have some sorts of spectral characteristics having a strong correlation with the spectral characteristic (for example, the relative luminosity curve) of luminance. The image processing step includes a calculating step (for example, a process in step S23 in FIG. 24 or in step S453 in FIG. 62). The calculating step calculates estimated intensity values of colors possessed by the pixels arranged in the checkered manner at each pixel and calculates a luminance value of each pixel on a basis of the estimated intensity value.

Further, the present invention provides a program. The program makes a computer perform a process including an obtaining step (for example, a process in step S1 in FIG. 23) and an image processing step (for example, a process in step S4 in FIG. 23). The obtaining step obtains a mosaic image by an image sensor having at least four kinds of filters (for example, color filters corresponding to RGBE colors) with different spectral sensitivities. One of the at least four kinds of filters is used for each pixel. The image processing step generates a color image such that intensity information at a position of each pixel is computed for all pixels from the mosaic image obtained by a process of the obtaining step. The intensity information corresponds to a number of colors determined by the spectral sensitivities of the filters. In the process of the obtaining step, the mosaic image is obtained which has a color arrangement such that filters possessed by pixels arranged in a checkered manner in half of all the pixels have some sorts of spectral characteristics having a strong correlation with the spectral characteristic (for example, the relative luminosity curve) of luminance. The image processing step includes a calculating step (for example, a process in step S23 in FIG. 24 or in step S453 in FIG. 62). The image processing step calculates estimated intensity values of colors possessed by the pixels arranged in the checkered manner at each pixel and calculates a luminance value of each pixel on a basis of the estimated intensity value.

Figure 2:
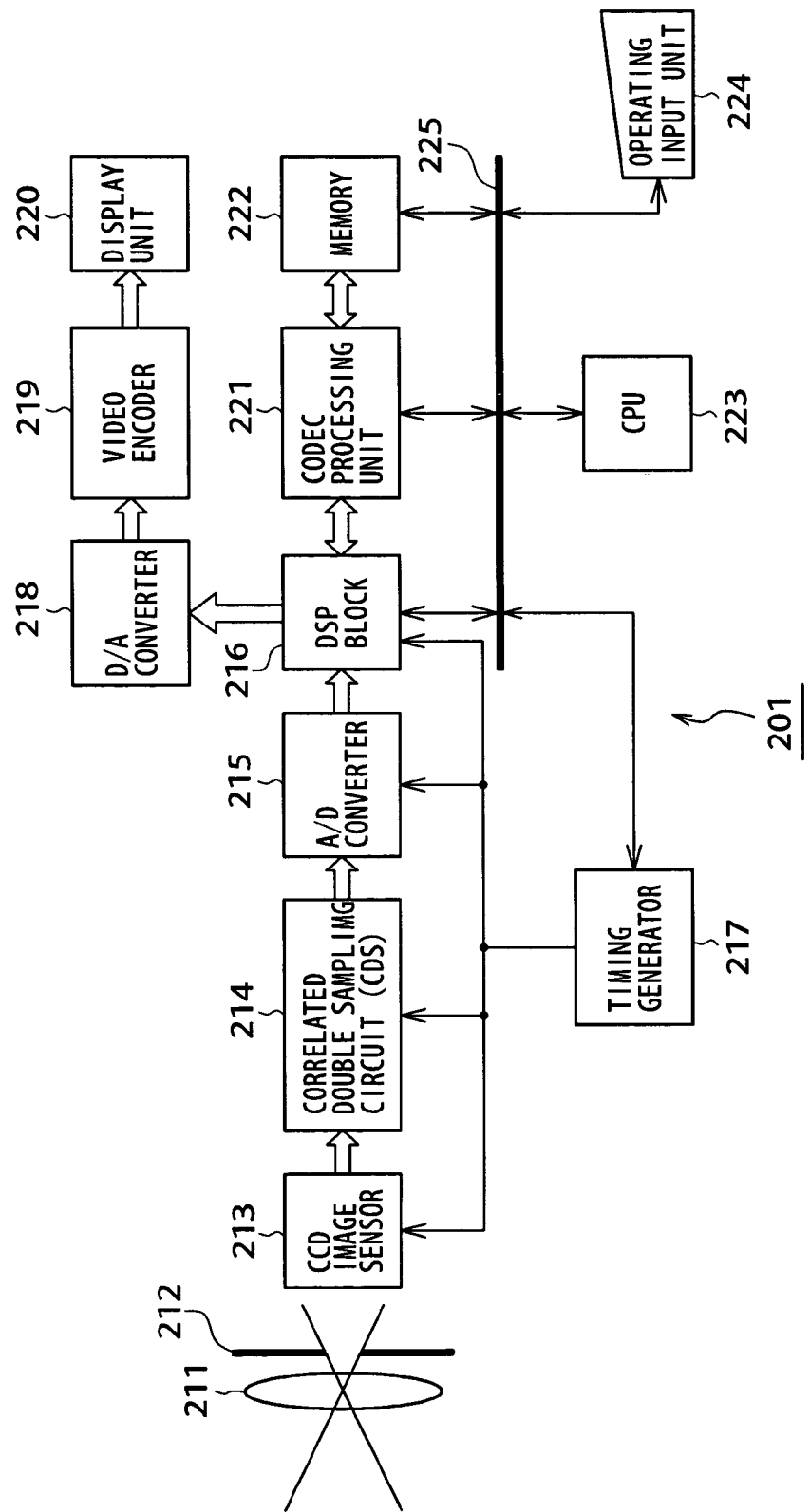
FIG. 2 is a block diagram showing a configuration of a digital still camera to which the present invention is applied.

FIG. 2 is a block diagram showing a configuration of a digital still camera 201 that performs operation processing to which the present invention is applied.

As shown in FIG. 2, the digital still camera 201 includes a lens 211, an iris 212, a CCD (Charge Coupled Devices) image sensor 213, a CDS (Correlated Double Sampling) circuit 214, an A/D converter 215, a DSP (Digital Signal Processor) block 216, a timing generator 217, a D/A converter 218, a video encoder 219, a display unit 220, a CODEC (COmpression/DECompression) processing unit 221, a memory 222, a CPU 223, and an operating input unit 224.

The CCD is a semiconductor device that converts light information into an electric signal (photoelectric conversion). The CCD image sensor 213 has a number of light receiving elements (pixels) arranged therein for converting light into electricity, and independently converts a change in the light at each pixel into an electric signal. The correlated double sampling circuit 214 removes reset noise, which is a main component of noise included in an output signal of the CCD image sensor 213, by subtracting a signal obtained by sampling in a video signal period from a signal obtained by sampling in a reference period among pixel signals of output. The A/D converter 215 converts the analog signal supplied thereto after the noise is removed into a digital signal.

The DSP block 216 has a processor for signal processing and a RAM for images. The signal processor subjects image data stored in the image RAM to preprogrammed image processing or image processing configured as operation processing by hardware. The timing generator 217 is a logic circuit for generating various horizontal and vertical driving pulses necessary for driving the CCD and pulses used in analog front processing in synchronism with a reference clock. The reference clock generated by the timing generator 217 is also supplied to the codec processing unit 221, the memory 222, and the CPU 223 via a bus 225.

The D/A converter 218 converts a digital signal supplied thereto into an analog signal, and then outputs the analog signal. The video encoder 219 encodes the analog signal supplied thereto into video data in a format displayable on the display unit 220. The display unit 220 includes an LCD (Liquid Crystal Display), for example. The display unit 220 displays the video signal supplied from the video encoder 219.

The codec processing unit 221 performs processing by an algorithm for compressing or decompressing digital image data, such as JPEG (Joint Picture Experts Group). The memory 222 includes a semiconductor memory, a magnetic disk, a magneto-optical disk, or an optical disk. The memory 222 stores data supplied thereto, or outputs data stored therein under control of the CPU 223. Incidentally, the memory 222 may be detachable from the digital still camera 201.

The CPU 223 controls various parts of the digital still camera 201 via the bus 225 on the basis of a user operation input supplied from the operating input unit 224. The operating input unit 224 includes a jog dial, keys, levers, buttons, or a touch panel, for example, including a button for giving an instruction for recording. The operating input unit 224 receives operation inputs by a user.

Light inputted via the lens 211 and the iris 212 enters the CCD image sensor 213, is converted into an electric signal by photoelectric conversion at the light receiving elements, and is then supplied to the correlated double sampling circuit 214. The correlated double sampling circuit 214 removes noise by subtracting a signal obtained by sampling in a video signal period from a signal obtained by sampling in a reference period among pixel signals of output of the CCD image sensor 213. The correlated double sampling circuit 214 then supplies the result to the A/D converter 215. The A/D converter 215 converts the analog signal supplied thereto after the noise is removed into a digital signal. Then the A/D converter 215 temporarily stores the digital signal in the image RAM of the DSP block 216.

The timing generator 217 controls the CCD image sensor 213, the correlated double sampling circuit 214, the A/D converter 215, and the DSP block 216 so as to maintain image capture at a fixed frame rate during image pickup.

The DSP block 216 is supplied with pixel stream data at the fixed rate. The DSP block 216 temporarily stores the image data in the image RAM, and subjects the temporarily stored image data to image processing to be described later at the signal processor. After completion of the image processing, under control of the CPU 223, the DSP block 216 supplies the image data to the D/A converter 218 when the image data is to be displayed on the display unit 220, and supplies the image data to the codec processing unit 221 when the image data is to be stored in the memory 222.

The D/A converter 218 converts the digital image data supplied from the DSP block 216 into an analog signal, and then supplies the analog signal to the video encoder 219. The video encoder 219 converts the analog image signal supplied thereto into a video signal. The video encoder 219 outputs the video signal to the display unit 220 for display thereon. That is, the display unit 220 plays a role of a camera finder in the digital still camera 201. The codec processing unit 221 encodes the image data supplied from the DSP block 216 by a predetermined system. The codec processing unit 221 then supplies the encoded image data to the memory 222 to store the encoded image data in the memory 222.

Also, under control of the CPU 223 receiving a user operation input from the operating input unit 224, the codec processing unit 221 reads data specified by the user from the data stored in the memory 222, decodes the data by a predetermined decoding method, and then outputs the decoded signal to the DSP block 216. Thereby, the decoded signal is supplied to the D/A converter 218 via the DSP block 216 to be converted into an analog signal. Thereafter the analog signal is encoded by the video encoder 219 and then displayed on the display unit 220.

Figure 3:
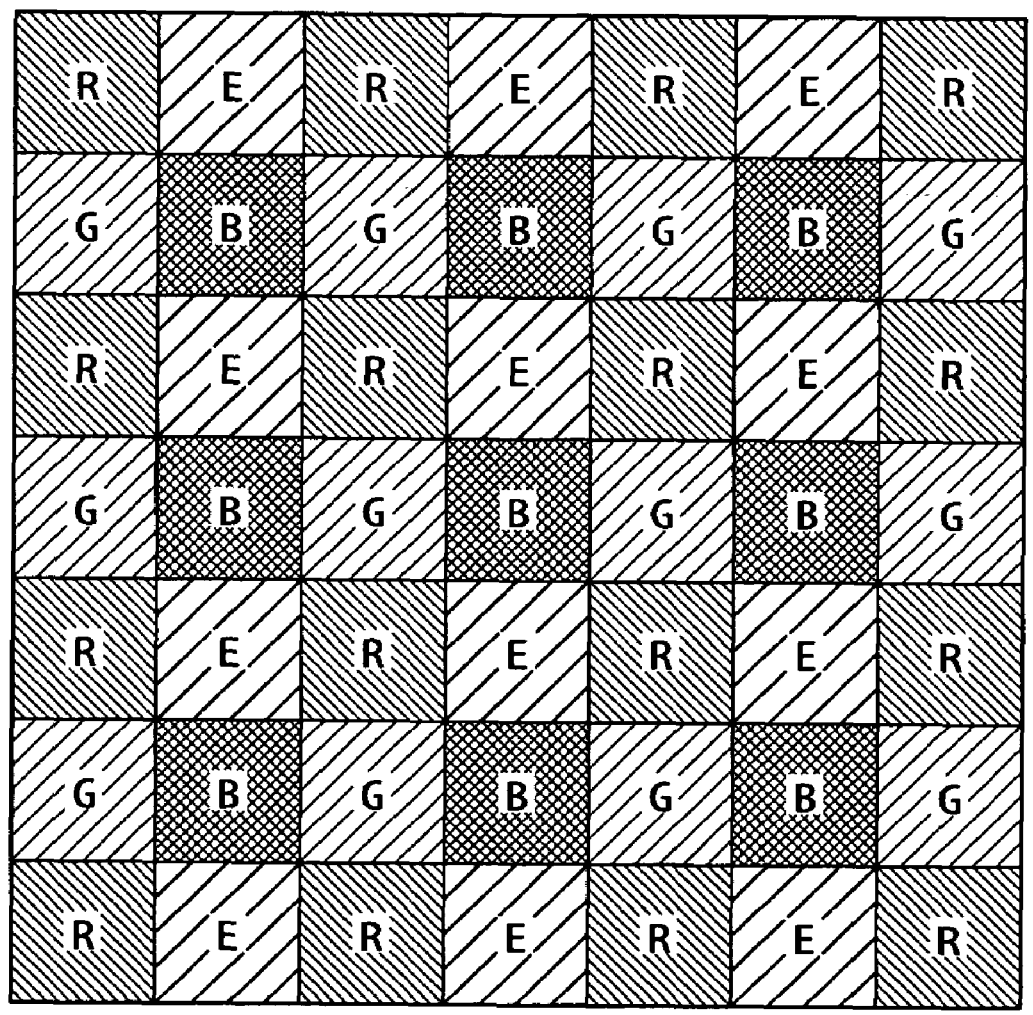
FIG. 3 is a diagram of assistance in explaining color filters used in a CCD image sensor in FIG. 2.

On-chip color filters of the CCD image sensor 213 in FIG. 2 generally use three or four kinds of color. These on-chip color filters are arranged in a mosaic manner so that the light receiving elements have alternately different colors. FIG. 3 shows an example arrangement of four primary colors, which are three RGB (Red, Green, and Blue) colors plus a fourth color (hereinafter, referred to as E), for example.

The arrangement shown in FIG. 3 has a total of four filters as a minimum unit; that is, a filter that transmits only E light in place of one of G filters that transmit only green (G) light in the Bayer arrangement, one filter that transmits only red (R) light, and one filter that transmits only blue (B) light. Of the RGB colors, G has a spectral characteristic closest to a human luminosity characteristic. G and E in the arrangement shown in FIG. 3 have spectral characteristics having a strong correlation with the spectral characteristic (for example, the relative luminosity curve) of luminance.

Figure 4:
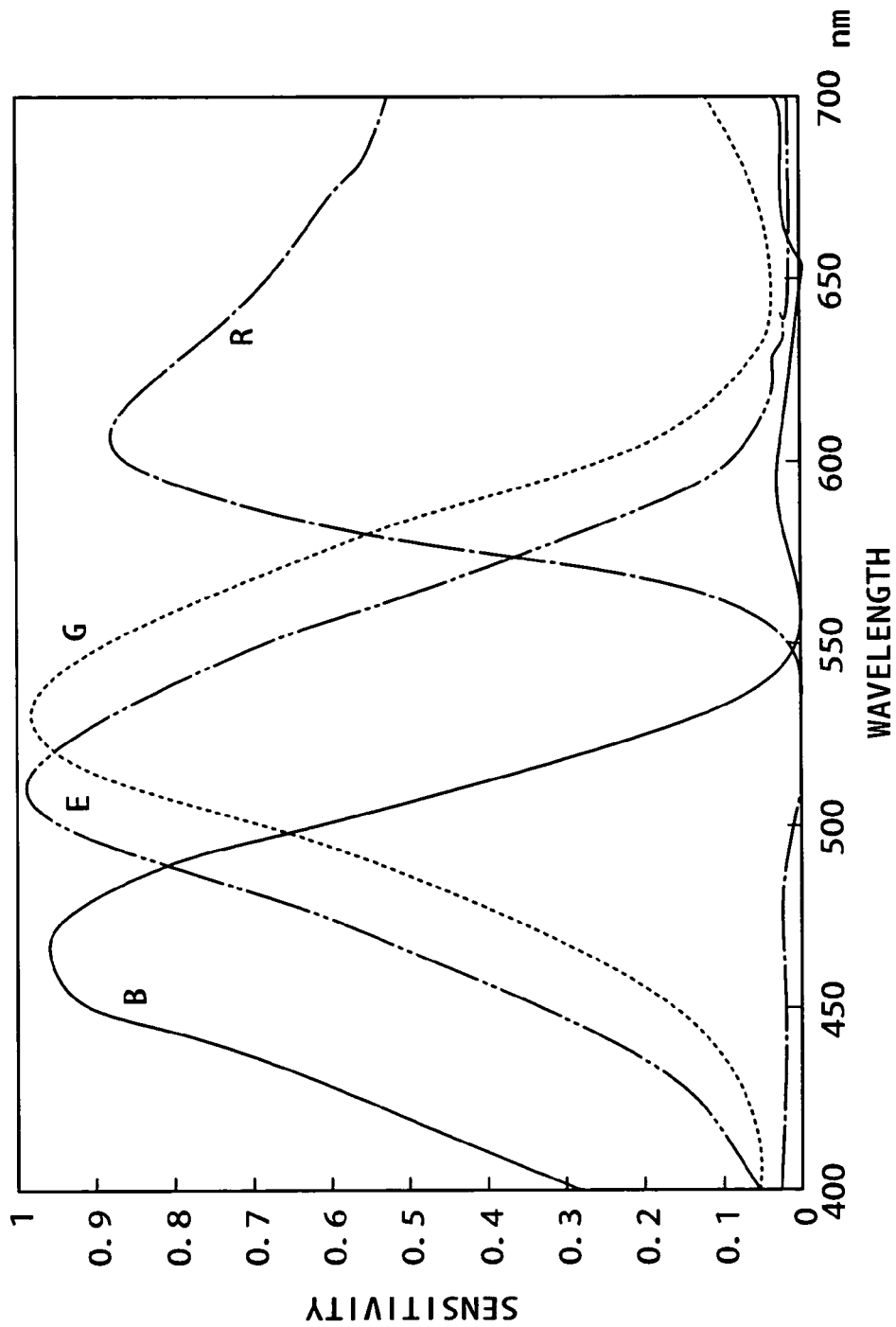
FIG. 4 is a diagram showing an example of spectral characteristics of the color filters of FIG. 3.

The four-color arrangement of the on-chip color filters of the CCD image sensor 213 will be further described. Intensity of each pixel of a mosaic image obtained by the on-chip color filters of the CCD image sensor 213 is proportional to a product of a spectral characteristic of a corresponding on-chip filter and a spectral characteristic of incident light. FIG. 4 shows an example of spectral characteristics of the colors in the four-color arrangement of a primary color system shown in FIG. 3. The spectral characteristics of the filters need to be designed carefully in consideration of spectral characteristics and noise characteristics of the sensor itself, coefficients of a linear matrix to be described later, physical limitations of material used for the filters, and the like. When the present invention is applied, effects of the present invention are not particularly affected by characteristics of spectral sensitivity of these filters and, therefore, it suffices to design the spectral sensitivity in consideration of the color reproducibility and noise characteristics as described above. For example, while in the example of FIG. 4, the spectral characteristic of the fourth color E has a peak on a side of a shorter wavelength than a wavelength of G, E may have a spectral characteristic having a peak on a side of a longer wavelength than the wavelength of G (E appears to be a color on a yellow side).

Thus, when the color filters in the color arrangement shown in FIG. 3 are used as the on-chip color filters of the CCD image sensor 213, an image temporarily stored in the image RAM of the DSP block 216 has only one color of R, G, B, and E at each pixel. Accordingly, the signal processor of the DSP block 216 processes the image by a preincorporated image processing program or hardware, thereby generating image data having data of all colors at all pixels.

Figure 5:
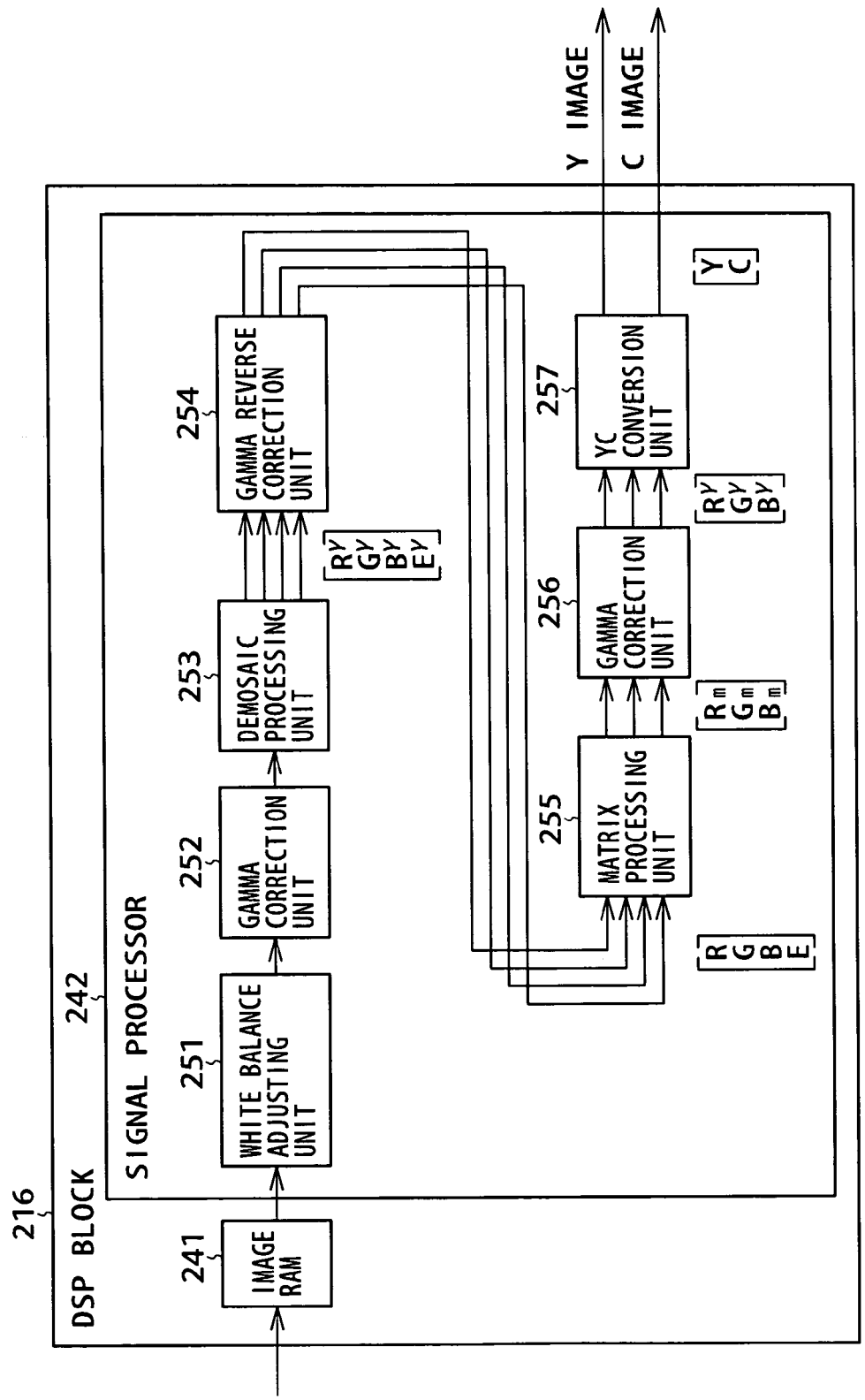
FIG. 5 is a block diagram showing a configuration of a DSP block in FIG. 2.

FIG. 5 is a block diagram showing a more detailed configuration of the DSP block 216 in FIG. 2.

As described above, the DSP block 216 includes the image RAM 241 and the signal processor 242. The signal processor 242 includes a white balance adjusting unit 251, a gamma correction unit 252, a demosaic processing unit 253, a gamma reverse correction unit 254, a matrix processing unit 255, a gamma correction unit 256, and a YC conversion unit 257.

A mosaic image converted into a digital signal by the A/D converter 215 is temporarily stored in the image RAM 241. The mosaic image includes an intensity signal corresponding to one of the colors R, G, B, and E at each pixel; that is, intensity signals from a periodic pattern of the arrangement (for example, the four-primary-color arrangement described with reference to FIG. 3) defined by the color filters used in the CCD image sensor 213.

The white balance adjusting unit 251 performs processing (white balance adjusting processing) of multiplying the mosaic image by an appropriate coefficient in accordance with a color possessed by each pixel intensity so as to make a color balance of an achromatic subject area achromatic. The gamma correction unit 252 performs gamma correction on each pixel intensity of the mosaic image whose white balance is adjusted. A numerical value of "gamma" (γ) is used to represent response characteristics of image gradation. The gamma correction is correction processing for correctly displaying brightness and color saturation of the image displayed on the display unit 220. The brightness and color of the image are reproduced by adding a specific voltage for each pixel of the signal outputted to the display unit 220. As for the brightness and color of an actually displayed image, however, because of a characteristic (gamma value) possessed by the display unit 220, doubling an input voltage does not result in double brightness of the cathode-ray tube (having nonlinearity). Therefore the gamma correction unit 252 performs correction processing for correctly displaying the brightness and color saturation of the image displayed on the display unit 220.

The demosaic processing unit 253 performs demosaic processing for providing all intensities (intensity information) of R, G, B, and E at each pixel position of the gamma-corrected mosaic image by statistically calculating a shape of color distribution. Thus, output signals from the demosaic processing unit 253 are four image signals corresponding to the four colors R, G, B, and E. The gamma reverse correction unit 254 restores the image signals to linear characteristics by applying a reverse of a gamma characteristic applied to the four-channel image after the demosaic processing so that matrix processing is performed at the matrix processing unit 255 in a succeeding stage.

The matrix processing unit 255 converts pixels (R, G, B, E) supplied thereto into three primary-color intensity values (Rm, Gm, Bm) by applying a linear matrix of three rows and four columns of preset coefficients to the pixels (R, G, B, E). This matrix processing needs to be applied to image intensities having linear characteristics. The coefficients of the linear matrix are an important design item for optimum color reproduction. However, since the matrix processing is performed after the demosaic processing, concrete values of the linear matrix coefficients can be designed regardless of the demosaic processing. Outputs of the matrix processing unit 255 are three color-corrected images corresponding to the three colors Rm, Gm, and Bm.

After the matrix processing, the gamma correction unit 256 performs gamma correction again on the color-corrected three-channel image. The YC conversion unit 257 subjects the three-channel image of R, G, and B to matrix processing and chroma component band limitation, thereby generating a Y image and a C image (YCbCr image signal), and then outputs the Y image and the C image.

In the signal processor 242 of the DSP block 216, the gamma correction unit 252 performs gamma correction before demosaic processing by the demosaic processing unit 253. This is because reliability of demosaic processing of the demosaic processing unit 253 can be enhanced by performing demosaic operations in a gamma-corrected nonlinear pixel intensity space.

For example, when an input image represents a high-contrast contour area, its color distribution spreads over a very bright intensity region and a very dark intensity region. Light reflected from an object is physically a product of variation on a surface of the object and intensity of incident light from an illumination. Thus, in a linear pixel intensity space proportional to intensity of light incident on the camera, object color distribution in a bright intensity region tends to spread sparsely, whereas object color distribution in a dark pixel intensity region tends to be shrunk into a compact shape without spreading very much.

The demosaic processing unit 253 performs demosaic processing by statistically calculating a shape of color distribution. However, in a high-contrast contour area, scattering of pixel intensity in a bright region and scattering of pixel intensity in a dark region differ greatly, thus making application of statistical linear regression difficult. Accordingly, prior to demosaic processing at the demosaic processing unit 253, input data is subjected to nonlinear pixel intensity conversion such as gamma correction to raise the dark pixel intensity region (bring the dark pixel intensity region closer to the bright pixel intensity region), thus suppressing the scattering of pixel intensity to some extent, whereby reliability of linear regression processing performed at the demosaic processing unit 253 can be enhanced.

While exponentiation conversion with an exponent smaller than unity as in gamma correction is desirable as nonlinear conversion applied for such a purpose, the nonlinear conversion may be a conversion using a combination of an exponentiation part and a linear part as in the case of an sRGB gamma normally used in a color profile or the like, or any other nonlinear conversion as long as the conversion can be considered to be the same as a simple exponentiation function. Additionally, it is needless to say that even when the nonlinear conversion is omitted, nonlinear conversion processing such as gamma correction or the like may be performed after demosaic processing.

Further, gamma characteristics of the gamma correction unit 252 applied before demosaic processing and gamma characteristics of the gamma correction unit 256 applied before YC conversion do not need to be the same. Further, gamma correction before demosaic processing is not essential in the application of the present invention, of course.

Figure 6:
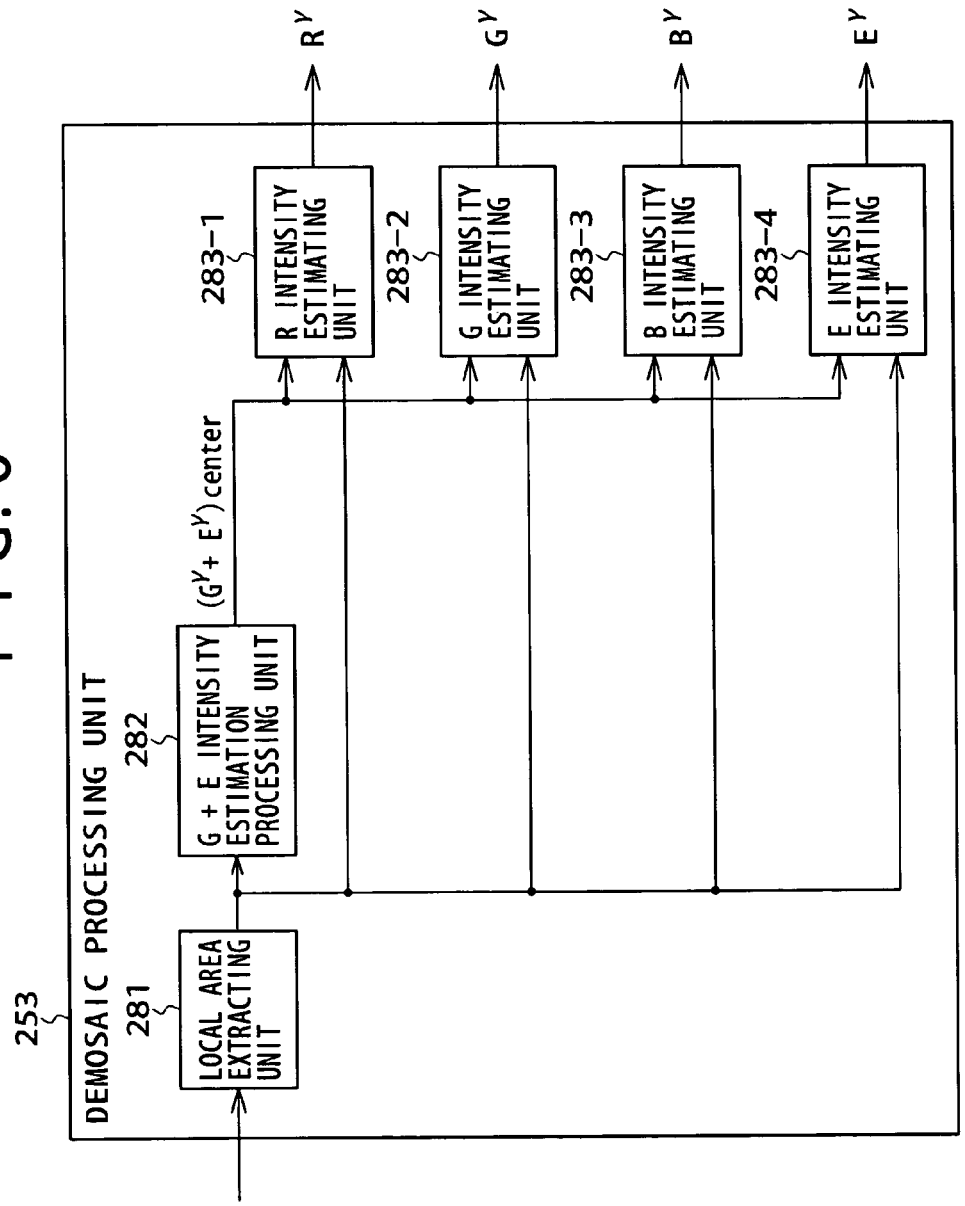
FIG. 6 is a block diagram showing a configuration of a demosaic processing unit in FIG. 5.

FIG. 6 is a block diagram of a more detailed configuration of the demosaic processing unit 253 in FIG. 5. The unit performs demosaic processing for sequentially interpolating or estimating intensities of colors that are not present at each pixel position so that all the colors R, G, B, and E are present at all pixel positions.

The demosaic processing unit 253 includes a local area extracting unit 281, a G+E intensity estimation processing unit 282, an R intensity estimating unit 283-1, a G intensity estimating unit 283-2, a B intensity estimating unit 283-3, and an E intensity estimating unit 283-4.

The local area extracting unit 281 cuts out pixels of a local area of a predetermined size around a position of a pixel of interest from the gamma-corrected mosaic image. In this case, the cut-out local area is a rectangular area of 9×9 pixels with the position of the pixel of interest as a center. The G+E intensity estimation processing unit 282 calculates a G+E intensity at the position of the pixel of interest using pixels present within the local area. The R intensity estimating unit 283-1, the G intensity estimating unit 283-2, the B intensity estimating unit 283-3, and the E intensity estimating unit 283-4 calculate an estimated value of intensity of each of R, G, B, and E using pixels present within the local area and the G+E intensity at the position of the pixel of interest. The intensity is calculated by the G+E intensity estimation processing unit 282. The R intensity estimating unit 283-1, the G intensity estimating unit 283-2, the B intensity estimating unit 283-3, and the E intensity estimating unit 283-4 basically have the same configuration. Therefore, when the R intensity estimating unit 283-1, the G intensity estimating unit 283-2, the B intensity estimating unit 283-3, and the E intensity estimating unit 283-4 do not need to be individually distinguished from each other, the R intensity estimating unit 283-1, the G intensity estimating unit 283-2, the B intensity estimating unit 283-3, and the E intensity estimating unit 283-4 will be referred to as an R (G, B, or E) intensity estimating unit 283, or all of the R intensity estimating unit 283-1, the G intensity estimating unit 283-2, the B intensity estimating unit 283-3, and the E intensity estimating unit 283-4 will be referred to as an RGBE intensity estimating unit 283.

Figure 7:
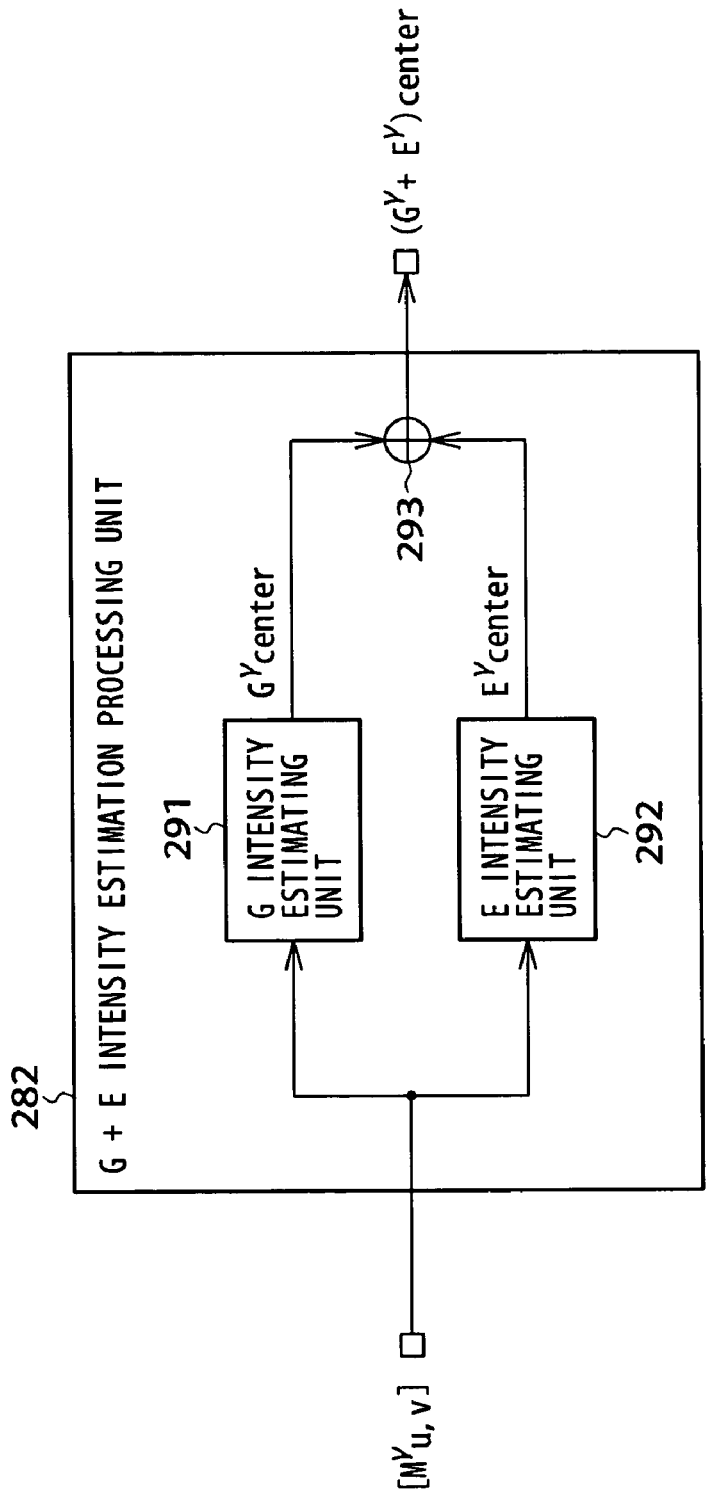
FIG. 7 is a block diagram showing a configuration of a G+E intensity estimation processing unit in FIG. 6.

FIG. 7 is a block diagram showing a configuration of the G+E intensity estimation processing unit 282 in FIG. 6.

The G+E intensity estimation processing unit 282 includes a G intensity estimating unit 291, an E intensity estimating unit 292, and an addition processing unit 293.

The G intensity estimating unit 291 calculates an estimated value of G intensity at the position of the pixel of interest using the pixels of the local area. The E intensity estimating unit 292 calculates an estimated value of E intensity at the position of the pixel of interest using the pixels of the local area. The addition processing unit 293 calculates a (G+E) intensity estimated value at the position of the pixel of interest by adding the calculated G intensity estimated value and the calculated E intensity estimated value. In a mosaic image obtained by the color filters of the four-primary-color arrangement described with reference to FIG. 3, both a G signal and an E signal are present only at every other pixel. Therefore, interpolation processing with only G or only E cannot reproduce a high-frequency image signal and, thus, tends to cause jagginess and zipper noise. However, by utilizing the fact that G and E are arranged at positions displaced from each other by one pixel horizontally and vertically, and reproducing such a signal as is obtained by adding a G signal and an E signal at all pixel positions, it is possible to reproduce a image signal of higher frequency than is limited by each of the G signal and the E signal, thus suppressing jagginess and noise of an output image.

FIG. 8 is a block diagram showing a configuration of the G intensity estimating unit 291 and the E intensity estimating unit 292. Description first will be made of commonalities between the G intensity estimating unit 291 and the E intensity estimating unit 292. Thereafter, description will be made of differences between the G intensity estimating unit 291 and the E intensity estimating unit 292.

Each of the G intensity estimating unit 291 and the E intensity estimating unit 292 includes a pixel of interest selecting unit 301, a first processing block 302, a second processing block 303, a third processing block 304, a texture direction determining unit 305, and a switch 306. The first processing block 302 includes a first intensity estimating unit 311. The second processing block 303 and the third processing block 304 each include a second intensity estimating unit 321, a third intensity estimating unit 322, a fourth intensity estimating unit 323, and a switch 324.

The pixel of interest selecting unit 301 selects a position of a pixel of interest (that is, a central pixel from a local area of 9×9 pixels), and outputs its pixel intensity. The texture direction determining unit 305 examines a texture of an image in the local area, and outputs a result of determination of whether the texture primarily has vertical stripes or horizontal stripes. The first intensity estimating unit 311, the second intensity estimating unit 321, the third intensity estimating unit 322, and the fourth intensity estimating unit 323 calculate intensity of a color to be estimated on the basis of estimated intensity values of predetermined colors at pixels of the local area and the position of the pixel of interest. The color to be estimated is G for the G intensity estimating unit 291, and E for the E intensity estimating unit 292. There are four kinds of intensity estimating units because the color at the position of a given pixel of interest is one of the four colors and there are four kinds of processing depending on color arrangement of the local area. The switch 324 selects which of two input estimated intensity values to use on the basis of a result of determination of a texture direction outputted by the texture direction determining unit 305, and then outputs the selected estimated intensity value. The switch 306 selects which of four input estimated intensity values to use on the basis of the color at the position of the pixel of interest in the original mosaic image, and then outputs the selected estimated intensity value. The output of the switch 306 is the output of the G intensity estimating unit 291 and the E intensity estimating unit 292.

As described above, operation of the G intensity estimating unit 291 and the E intensity estimating unit 292 must be changed depending on the original color at the position of the pixel of interest. For four types of operations based on the color of the pixel of interest in the configuration shown in FIG. 8, the selected pixel of interest is outputted as it is or, alternatively, the first processing block 302, the second processing block 303, and the third processing block 304 calculate an estimated value, and the switch 306 finally selects one of the values for output and outputs the value.

The four types of operations will be described. First, when the color at the position of the pixel of interest in the mosaic image is the very color to be interpolated, no special estimation processing is required, and it suffices to output the intensity of the pixel of interest in the mosaic image. The pixel is selected by the pixel of interest selecting unit 301 as it is. Thus, the output of the pixel of interest selecting unit 301 is outputted from the switch 306 (an input "a" in FIG. 8 is outputted). Second, when the color at the position of the pixel of interest in the mosaic image is either G or E but is not the color to be interpolated, an estimated intensity value calculated by the first intensity estimating unit 311 of the first processing block 302 on the basis of G and E pixel information of the local area is outputted from the switch 306 (an input "b" in FIG. 8 is outputted).

Third, when the position of the pixel of interest in the mosaic image is horizontally displaced by one pixel from a pixel of the color to be interpolated (that is, in cases where the color at the position of the pixel of interest in the mosaic image is B when the color to be interpolated is G and where the color at the position of the pixel of interest in the mosaic image is R when the color to be interpolated is E), an estimated intensity value calculated by processing of the second intensity estimating unit 321, the third intensity estimating unit 322, the fourth intensity estimating unit 323, and the switch 324 of the second processing block 303 is outputted from the switch 306 (an input "c" in FIG. 8 is outputted). Fourth, when the position of the pixel of interest in the mosaic image is vertically displaced by one pixel from a pixel of the color to be interpolated (that is, in cases where the color at the position of the pixel of interest in the mosaic image is R when the color to be interpolated is G and where the color at the position of the pixel of interest in the mosaic image is B when the color to be interpolated is E), an estimated intensity value calculated by the third intensity estimating unit 322, the second intensity estimating unit 321, the fourth intensity estimating unit 323, and the switch 324 of the third processing block 304 is outputted from the switch 306 (an input "d" in FIG. 8 is outputted).

The operation of the second processing block 303 will be described in the following. The second intensity estimating unit 321 calculates an estimated intensity value of the color to be interpolated using color intensity at the position of the pixel of interest and pixel information of the local area. The third intensity estimating unit 322 calculates an estimated intensity value of a color opposite to the color to be interpolated, which is G or E, using the color intensity at the position of the pixel of interest and the pixel information of the local area. Then, on the basis of the estimated intensity value calculated by the third intensity estimating unit 322, the fourth intensity estimating unit 323 calculates an estimated intensity value of the color to be interpolated. The switch 324 selects and outputs one of the two estimated intensity values thus calculated on the basis of a texture direction determined by the texture direction determining unit 305.

As described above, the output of the second processing block 303 is selected by the switch 306 when the position of the, pixel of interest in the mosaic image is horizontally displaced by one pixel from a pixel of the color to be interpolated. In this case, when the image has a texture with a high correlation in the horizontal direction, such as horizontal stripes, the color at the position of the pixel of interest can be expected to have a strong correlation with the color to be interpolated. On the other hand, when the image has a texture with a high correlation in the vertical direction, such as vertical stripes, the color at the position of the pixel of interest cannot be expected to have a strong correlation with the color to be interpolated. Thus, when the texture is close to horizontal stripes, the second intensity estimating unit 321 directly estimates the intensity of the color to be interpolated from the color at the position of the pixel of interest. On the other hand, when the texture is close to vertical stripes, the third intensity estimating unit 322 estimates the intensity of the color (E for G or G for E) different from the color to be interpolated from the color at the position of the pixel of interest. Then, the estimated intensity value of the color to be interpolated, which is calculated by the fourth intensity estimating unit 323, is selected.

The operation of the third processing block 304 now will be described. The third intensity estimating unit 322 calculates an estimated intensity value of the color to be interpolated using the color intensity at the position of the pixel of interest and the pixel information of the local area. The second intensity estimating unit 321 calculates an estimated intensity value of a color opposite to the color to be interpolated, which is G or E, using the color intensity at the position of the pixel of interest and the pixel information of the local area. Then, on the basis of the estimated intensity value calculated by the second intensity estimating unit 321, the fourth intensity estimating unit 323 calculates an estimated intensity value of the color to be interpolated. The switch 324 selects and outputs one of the two estimated intensity values thus calculated on the basis of the texture direction determined by the texture direction determining unit 305.

As described above, the output of the third processing block 304 is selected by the switch 306 when the position of the pixel of interest in the mosaic image is vertically displaced by one pixel from a pixel of the color to be interpolated. In this case, when the image has a texture with a high correlation in the vertical direction, such as vertical stripes, the color at the position of the pixel of interest can be expected to have a strong correlation with the color to be interpolated. On the other hand, when the image has a texture with a high correlation in the horizontal direction, such as horizontal stripes, the color at the position of the pixel of interest cannot be expected to have a strong correlation with the color to be interpolated. Thus, when the texture is close to vertical stripes, the third intensity estimating unit 322 directly estimates the intensity of the color to be interpolated from the color at the position of the pixel of interest. On the other hand, when the texture is close to horizontal stripes, the second intensity estimating unit 321 estimates the intensity of the color (E for G or G for E) different from the color to be interpolated from the color at the position of the pixel of interest. Then, the estimated intensity value of the color to be interpolated, which is calculated by the fourth intensity estimating unit 323, is selected.

Thus, it is possible to improve reproducibility of an image signal having a large high-frequency component of a fine stripe pattern or the like.

Commonalities in operation between the G intensity estimating unit 291 and the E intensity estimating unit 292 have been described above. The G intensity estimating unit 291 and the E intensity estimating unit 292 are different from each other only in that the color to be interpolated is G or E, a color horizontally adjacent to the color to be interpolated and a color vertically adjacent to the color to be interpolated are each correspondingly R or B, and the switch 306 accordingly behaves in a different manner. The output, corresponding to the color of the pixel of interest, of the switch 306 of each of the G intensity estimating unit 291 and the E intensity estimating unit 292 which output will be described with reference to FIG. 9.

As shown in FIG. 9, when the pixel of interest is R, the switch 306 of the G intensity estimating unit 291 outputs the estimated intensity value calculated by the third processing block 304 from the switch 306 (outputs the input "d" in FIG. 9). When the pixel of interest is G, the switch 306 of the G intensity estimating unit 291 outputs the output of the pixel of interest selecting unit 301 from the switch 306 (outputs the input "a" in FIG. 9. When the pixel of interest is B, the switch 306 of the G intensity estimating unit 291 outputs the estimated intensity value calculated by the second processing block 303 from the switch 306 (outputs the input "c" in FIG. 9). When the pixel of interest is E, the switch 306 of the G intensity estimating unit 291 outputs the estimated intensity value calculated by the first processing block 302 from the switch 306 (outputs the input "b" in FIG. 9). As shown in FIG. 9, when the pixel of interest is R, the switch 306 of the E intensity estimating unit 292 outputs the estimated intensity value calculated by the second processing block 303 from the switch 306 (outputs the input "c" in FIG. 9). When the pixel of interest is G, the switch 306 of the E intensity estimating unit 292 outputs the estimated intensity value calculated by the first processing block 302 from the switch 306 (outputs the input "b" in FIG. 9). When the pixel of interest is B, the switch 306 of the E intensity estimating unit 292 outputs the estimated intensity value calculated by the third processing block 304 from the switch 306 (outputs the input "d" in FIG.

9). When the pixel of interest is E, the switch 306 of the E intensity estimating unit 292 outputs the output of the pixel of interest selecting unit 301 from the switch 306 (outputs the input "a" in FIG. 9).

Figure 10:
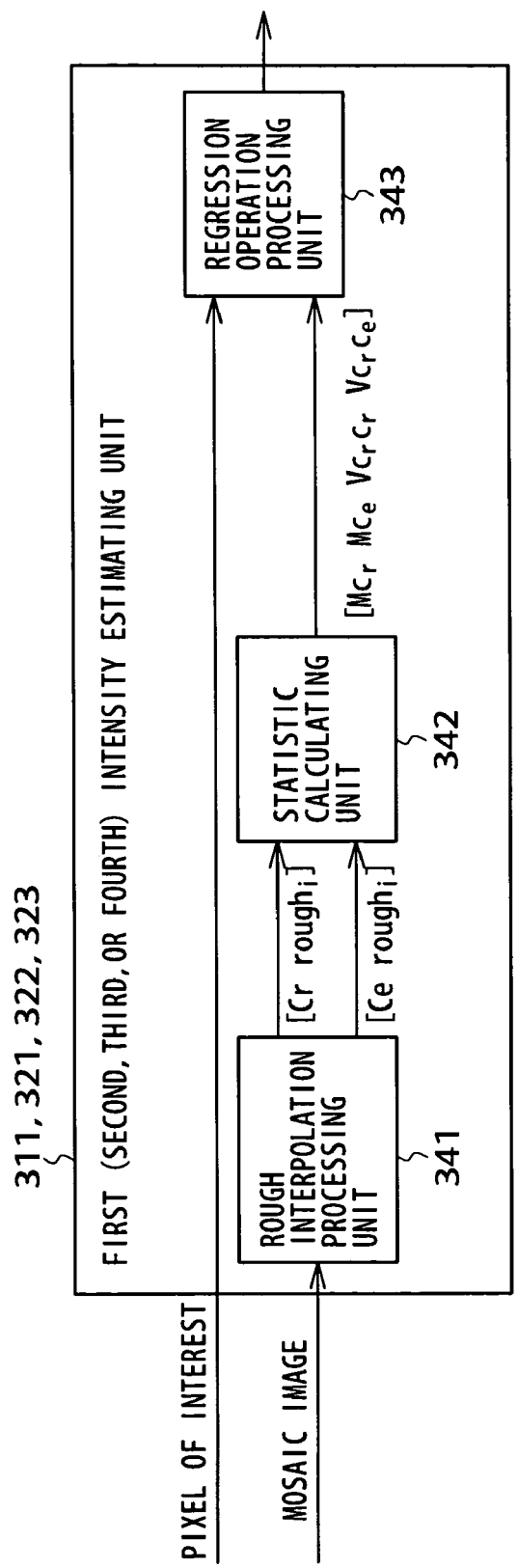
FIG. 10 is a block diagram showing a configuration of a first to a fourth intensity estimating unit in FIG. 8.

FIG. 10 is a block diagram showing a configuration of the first intensity estimating unit 311, the second intensity estimating unit 321, the third intensity estimating unit 322, or the fourth intensity estimating unit 323 in FIG. 8. The first intensity estimating unit 311, the second intensity estimating unit 321, the third intensity estimating unit 322, and the fourth intensity estimating unit 323 in FIG. 8 have basically the same configuration except that a method of selecting a second color obtained when a rough interpolation processing unit 341 performs rough interpolation differs.

A rough interpolation processing unit 341 calculates estimated values (hereinafter, referred to as rough estimated values) of pixel intensity of a first color Cr and a second color Ce by a simple operation using an interpolation method to be described later so as to generate a set of intensities of the first color and the second color at a number of pixel positions within a local area using a pixel at a predetermined pixel position and eight pixels on the periphery thereof. In the present invention, secondary statistics or values corresponding thereto need to be calculated in order to estimate the shape of color distribution. Therefore, intensities of the different colors at the same pixel position need to be obtained as a set. In order to generate this set of intensities, the rough interpolation processing unit 341 calculates rough estimated values of the first color and the second color at a number of pixels within a local area ((n−2)×(n−2) pixels with a pixel of interest as a center in a local area of n×n pixels in this case).

A statistic calculating unit 342 calculates statistics between the first color and the second color using the set of intensities of the first color and the second color at each pixel within the local area. The set is calculated by the rough interpolation processing unit 341. Specifically, the statistic calculating unit 342 calculates and outputs an average value of the first color, an average value of the second color, a variance value of the first color, and a covariance value of the first color and the second color.

A regression operation processing unit 343 performs linear regression calculation of the shape of color distribution on the basis of the pixel intensity of the pixel of interest and the statistics calculated by the statistic calculating unit 342. The regression operation processing unit 343 thereby calculates an estimated intensity value at the position of the pixel of interest.

As described above, the first intensity estimating unit 311, the second intensity estimating unit 321, the third intensity estimating unit 322, and the fourth intensity estimating unit 323 in FIG. 8 calculate the estimated intensity value of the second color from the estimated intensity value of the first color on the basis of the statistical relations between the two colors. A difference between the four types of intensity estimating units lies in how to select the two colors, or in a method of the rough interpolation processing unit 341 for selecting two colors as the first color Cr and the second color Ce. Processing of the statistic calculating unit 342 and the regression operation processing unit 343 is common to the four types of intensity estimating units. Processing of the rough interpolation processing unit 341 of each of the first intensity estimating unit 311, the second intensity estimating unit 321, the third intensity estimating unit 322, and the fourth intensity estimating unit 323 will be described with reference to FIGS. 11 to 14.

The rough interpolation processing unit 341 of the first intensity estimating unit 311 selects a color at the position of the pixel of interest and a color obliquely adjacent thereto as the two colors. FIG. 11 shows a local area when the pixel of interest is E. When the pixel of interest is E, G is present at an oblique position. The rough interpolation processing unit 341 of the first intensity estimating unit 311 therefore obtains pairs of interpolated values of G and E.

The rough interpolation processing unit 341 of the second intensity estimating unit 321 selects the color at the position of the pixel of interest and a color horizontally adjacent thereto as the two colors. FIG. 12 shows a local area when the pixel of interest is B. When the pixel of interest is B, G is present on the right and left of the pixel of interest. The rough interpolation processing unit 341 of the second intensity estimating unit 321 therefore obtains pairs of interpolated values of G and B.

The rough interpolation processing unit 341 of the third intensity estimating unit 322 selects the color at the position of the pixel of interest and a color vertically adjacent thereto as the two colors. FIG. 13 shows a local area when the pixel of interest is R. When the pixel of interest is R, G is present on the upper and lower sides of the pixel of interest. The rough interpolation processing unit 341 of the third intensity estimating unit 322 therefore obtains pairs of interpolated values of G and R.

The rough interpolation processing unit 341 of the fourth intensity estimating unit 323 selects the color horizontally adjacent to the position of the pixel of interest and the color vertically adjacent to the position of the pixel of interest as the two colors. FIG. 14 shows a local area when the pixel of interest is R. When the pixel of interest is R, G and E are present on the right and left and the upper and lower sides of the pixel of interest. The rough interpolation processing unit 341 of the fourth intensity estimating unit 323 therefore obtains pairs of interpolated values of G and E.

Figure 15:
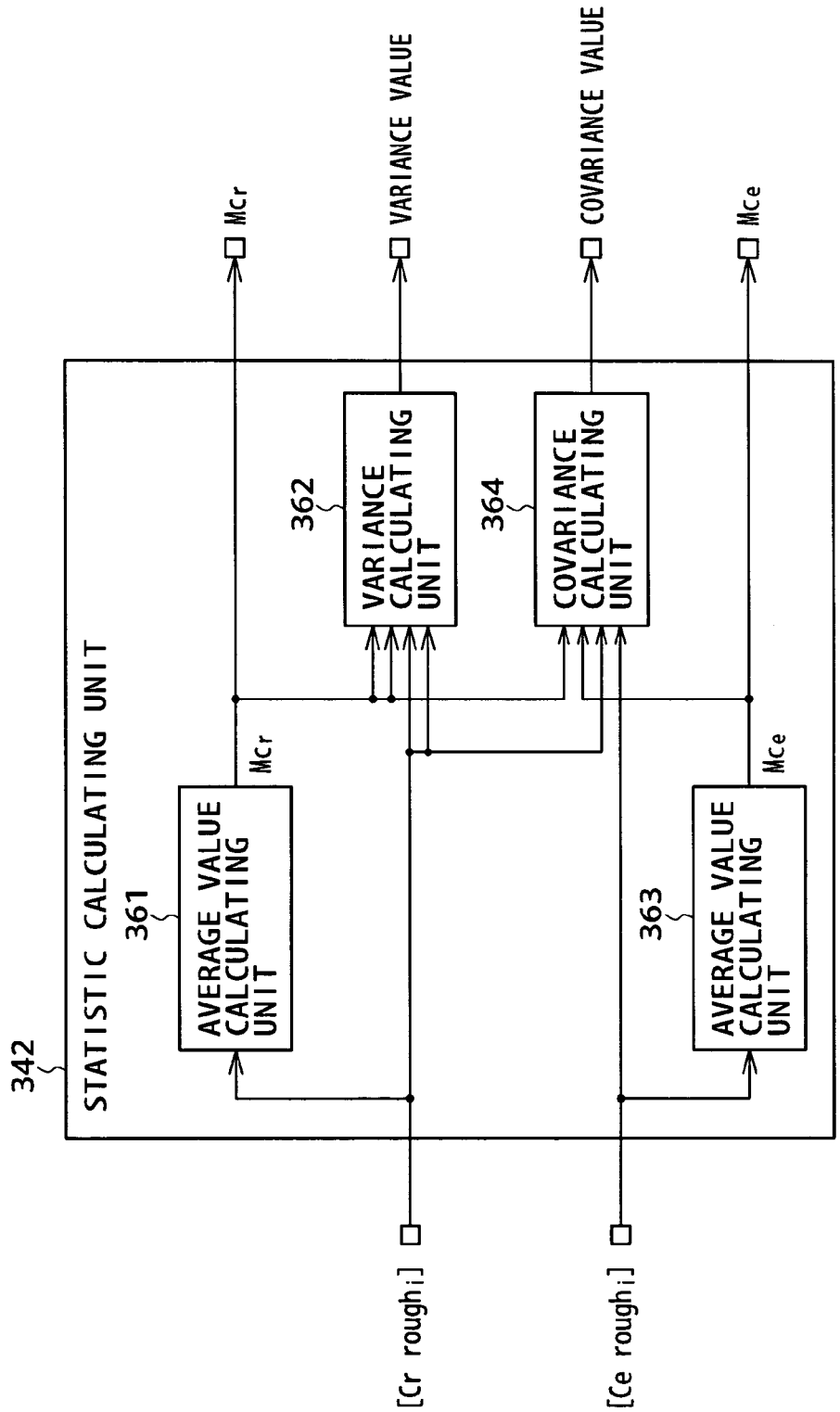
FIG. 15 is a block diagram showing a configuration of a statistic calculating unit in FIG. 10.

FIG. 15 is a block diagram showing a configuration of the statistic calculating unit 342 in FIG. 10.

The statistic calculating unit 342 includes an average value calculating unit 361, an average value calculating unit 363, a variance calculating unit 362, and a covariance calculating unit 364. The average value calculating unit 361 calculates an average value of the values of the first color among the rough interpolated values of the two colors in the local area. The values are calculated by the rough interpolation processing unit 341. Similarly, the average value calculating unit 363 calculates an average value of the values of the second color among the rough interpolated values of the two colors in the local area. The values are calculated by the rough interpolation processing unit 341. The variance calculating unit 362 calculates a variance value of the first color from the average value of the first color and the rough interpolated values of the first color in the local area. The average value of the first color value is calculated by the average value calculating unit 361. The covariance calculating unit 364 calculates a covariance value of the first color and the second color from the average value of the first color and the rough interpolated values of the first color and the average value of the second color and the rough interpolated values of the second color. The average value of the first color is calculated by the average value calculating unit 361. The average value of the second color is calculated by the average value calculating unit 363.

The average value calculating unit 361 and the average value calculating unit 363 calculate the average value Mc using the following Equation (1), for example.

$$M_C = \frac{\sum_{i=1}^{N} w_i \cdot C_{rough_i}}{\sum_{i=1}^{N} w_i} \qquad \text{[Equation 1]}$$

In Equation (1), $C_{rough i}$ denotes ith (i=1 to N) data of the rough interpolated intensity values of the supplied color C (R, G, B, or E). The color C is G in the average value calculating unit 361, and is R in the average value calculating unit 363. Further, wi denotes a weight value (weighting coefficient) for the ith data.

The weight value wi is preset using for example a distance from a position of the ith data to the position of the pixel of interest as an index. It is desirable that the weight value wi be set to increase as the distance to the position of the pixel of interest is decreased.

The variance calculating unit 362 calculates the first color intensity variance value $V_{C_1 C_1}$ by a calculating equation represented by the following Equation (2), for example.

$$V_{C_1 C_1} = \frac{\sum_{i=1}^{N} [w_i \cdot (C_{1rough_i} - M_{C_1})^2]}{\sum_{i=1}^{N} w_i} \qquad \text{[Equation 2]}$$

In this equation, $C_{1rough i}$ denotes ith data of the rough interpolated intensity values of the color C1, $M_{C_1}$ is the average value of the color C1, and wi is a weight value for the ith data. The variance calculating unit 362 may use the same weight value wi as that used by the average value calculating unit 361 and the average value calculating unit 363.

The covariance calculating unit 364 calculates the covariance value $V_{C_1 C_2}$ of a first signal (G in this case) and a second signal (R in this case) by a calculating equation represented by the following Equation (3), for example.

In this equation, $C_{2rough i}$ denotes ith data of the rough interpolated intensity values of the color C2 (R in this case), and $M_{C_2}$ is the average value of the color C2.

$$V_{C_1 C_2} = \frac{\sum_{i=1}^{N} [w_i \cdot (C_{1rough_i} - M_{C_1})(C_{2rough_i} - M_{C_2})]}{\sum_{i=1}^{N} w_i} \qquad \text{[Equation 3]}$$

When the calculation of the variance value as described using Equation (2) and the calculation of the covariance value as described using Equation (3) are performed, accurate statistics are obtained as defined. However, many multiplications occurring in carrying out the calculation of Equation (2) and Equation (3) lengthens calculation time, and increases a circuit scale when the operations are by hardware. Thus, the variance and the covariance may be calculated by simpler calculations.

For example, the following Equation (4) may be used for the operation of the covariance.

$$V_{C_1 C_2} = \frac{\sum_{i=1}^{N} [w_i \cdot \text{sgn}(C_{1rough_i} - M_{C_1}, C_{2rough_i} - M_{C_2}) \cdot \{(|C_{1rough_i} - M_{C_1}| + |C_{2rough_i} - M_{C_2}|)/2\}]}{\sum_{i=1}^{N} w_i} \qquad \text{[Equation 4]}$$

$$\text{sgn}(a, b) = \begin{cases} 1 & ((a > 0) \land (b > 0)) \lor ((a < 0) \land (b < 0)) \\ 0 & (a = 0) \lor (b = 0) \\ -1 & ((a > 0) \land (b < 0)) \lor ((a > 0) \land (b < 0)) \end{cases}$$

A function sgn (a, b) is to determine coincidence of signs of two variables a and b. Since an output of sgn (a, b) is one of 1, 0, and −1, the operation of sgn (a, b) actually does not require multiplication. The calculation of Equation (4) replaces an ith multiplication of deviations of G and R in the calculation of Equation (3) with an addition of absolute deviations of G and R. Even when the multiplication is replaced with the addition using Equation (4), an approximate value having sufficient accuracy to estimate the shape of color distribution in the local area as an object of the present invention can be obtained.

Further, for example, the following Equation (5) may be used for the operation of the covariance.

$$V_{C_1 C_2} = \frac{\sum_{i=1}^{N} [w_i \cdot \text{sgn}(C_{1rough_i} - M_{C_1}, C_{2rough_i} - M_{C_2}) \cdot \min(|C_{1rough_i} - M_{C_1}|, |C_{2rough_i} - M_{C_2}|)]}{\sum_{i=1}^{N} w_i} \qquad \text{[Equation 5]}$$

$$\text{sgn}(a, b) = \begin{cases} 1 & ((a > 0) \land (b > 0)) \lor ((a < 0) \land (b < 0)) \\ 0 & (a = 0) \lor (b = 0) \\ -1 & ((a > 0) \land (b < 0)) \lor ((a > 0) \land (b < 0)) \end{cases}$$

The calculation of Equation (5) replaces the ith multiplication of deviations of G and R in the calculation of Equation (3) with a process of selecting a minimum value of G and R. Incidentally, the calculation of Equation (5) has better accuracy in approximation to the covariance operation of Equation (3) than the calculation of Equation (4).

As described above using Equation (4) or Equation (5), an operation approximate to the operation of the covariance in Equation (3) is possible. Since the variance operation described using Equation (2) is equal to the covariance operation when two inputs are the same, it is needless to say that the variance operation described using Equation (2) similarly can be replaced with the approximate operation using Equation (4) or Equation (5). Specifically, in the case of the approximate variance operation using either of Equation (4) and Equation (5), an approximation of $(C_{1rough i} - M_{C_1})^2$ is $(C_{1rough i} - M_{C_1})$.

FIG. 16 is a block diagram showing a configuration of the regression operation processing unit 343. The regression operation processing unit 343 obtains a regression line represented by the following Equation (6), and thereby estimates a required pixel intensity.

$$C_e = K(C_r - M_{Cr}) + M_{Ce} \qquad \text{[Equation 6]}$$

The regression operation processing unit 343 includes a slope calculating unit 381 and a pixel intensity estimating unit 382.

The slope calculating unit 381 calculates a slope Km of a G-R color distribution based on an average value $M_R$ of R and an average value $M_G$ of G. Specifically, the regression operation processing unit 343 calculates a ratio between the two average values as shown by Equation (7). In this case, C1 is G, and C2 is R.

$$K_m = \begin{cases} \dfrac{M_{C_2}}{M_{threshold}} & M_{C_1} > M_{threshold} \\ \dfrac{M_{C_2}}{M_{C_1}} & \text{otherwise} \end{cases} \quad [\text{Equation 7}]$$

$M_{threshold}$ is a constant for avoiding divergence of the value by division by zero, and a sufficiently small positive value is preset as $M_{threshold}$.

Alternatively, the slope calculating unit 381 calculates a slope Ks of a C1-C2 color distribution based on the covariance value $V_{C1, C2}$ of C1 and C2 and the variance value $V_{C1, C1}$ of C1. In this case, C1 is G, and C2 is R. Specifically, the slope calculating unit 381 calculates a ratio between the variance value and the covariance value as shown by Equation (8).

$$K_S = \begin{cases} \dfrac{V_{C_1 C_2}}{V_{threshold}} & V_{C_1 C_1} > V_{threshold} \\ \dfrac{V_{C_1 C_2}}{V_{C_1 C_1}} & \text{otherwise} \end{cases} \quad [\text{Equation 8}]$$

$V_{threshold}$ is a constant for avoiding divergence of the value by division by zero, and a sufficiently small positive value is preset as $V_{threshold}$. By clipping the variance of C1 as a denominator using $V_{threshold}$ in Equation (8), it is possible to avoid division by zero. The clipping using $V_{threshold}$ can also be utilized to reduce noise in a flat portion of an image.

Specifically, the variance of C1 as the denominator is a value reflecting variations in brightness in the local area. A small variance value is synonymous with a flat local area. Noise of a solid-state image pickup element becomes more noticeable when the image is flat. Therefore, a process of noise reduction in only a flat portion of an image is suitable because noticeable noise can be effectively reduced without degradation in quality of the image as a whole. Further, by clipping the denominator of the slope Ks of the color distribution and, thus, preventing the denominator from becoming still smaller, it is possible to reduce an absolute value of Ks to a value smaller than an original value. The reduced absolute value of the slope Ks decreases a rate of change of C2 with respect to C1. Consequently the amplitude of C2 in the local area can be suppressed.

As described above, the process of clipping the denominator of the slope Ks has effects of noise reduction as in a case where both processes of determining whether the image is flat and suppressing the output amplitude are performed. Thus, the color estimation method of the present invention can suppress noticeable noise in a flat portion of an image without addition of a separate noise reduction process.

The slope calculating unit 381 supplies one of Ks and Km as the slope K of the regression line to the pixel intensity estimating unit 382. While Km is calculated more easily than Ks, when a strong correlation cannot be expected between the first color and the second color, Ks is used to provide a more accurate estimated value. On the other hand, when a strong correlation may be expected between the first color and the second color, Km can be used to provide a sufficiently accurate estimated value. Specifically, as described with reference to FIG. 4, when there is a strong correlation between spectral characteristics of G and E, a strong correlation also may be expected between the G and E image signals obtained. Therefore, the first intensity estimating unit 311 and the fourth intensity estimating unit 323 using G and E as the first color and the second color can estimate intensity by a simpler calculation using Km as the slope K. On the other hand, for the second intensity estimating unit 321 and the third intensity estimating unit 322 that always use either R or B, it is better to use Ks as the slope K.

Figure 17:
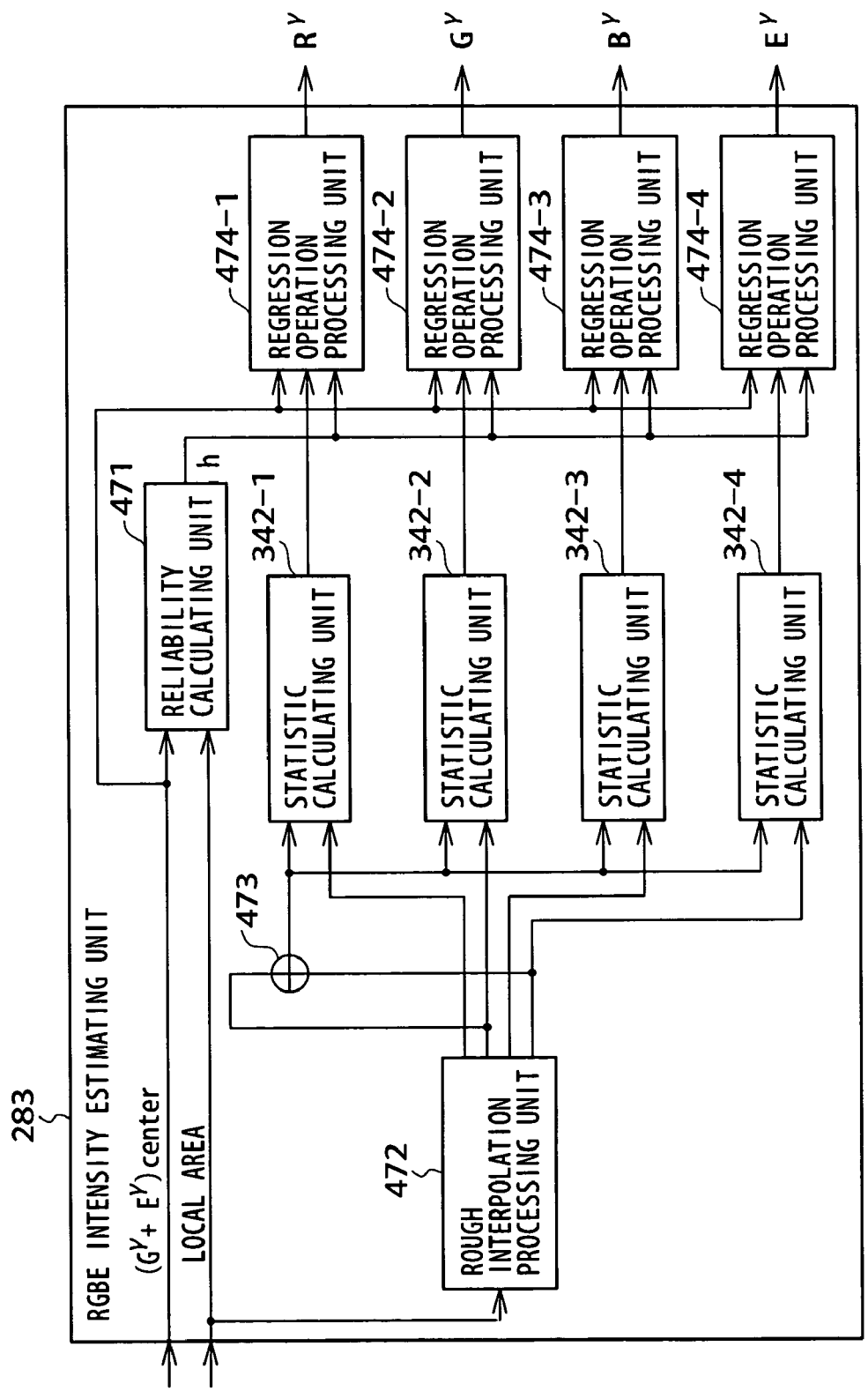
FIG. 17 is a block diagram showing a configuration of an RGBE intensity estimating unit in FIG. 6.

FIG. 17 is a block diagram showing a configuration of the R intensity estimating unit 283-1 to the E intensity estimating unit 283-4 in FIG. 6. While FIG. 17 shows one reliability calculating unit 471, one rough interpolation processing unit 472, and one synthesis processing unit 473 in the RGBE intensity estimating unit 283, it is needless to say that a reliability calculating unit 471, a rough interpolation processing unit 472, and a synthesis processing unit 473 may be provided in each of the R intensity estimating unit 283-1 to the E intensity estimating unit 283-4.

The reliability calculating unit 471 calculates reliability of estimation of the shape of color distribution at the position of the pixel of interest. The reliability calculating unit 471 uses the pixels in the rectangular local area of n×n (for example, 9×9) pixels extracted by the local area extracting unit 281 and the G+E intensity at the position of the pixel of interest. The intensity is calculated by the G+E intensity estimation processing unit 282. The estimation of the shape of color distribution in demosaic processing to which the present invention is applied assumes that there are regions of two different kinds of colors within the extracted local area. Since this assumption often applies to a normal object contour region, contour color reproduction can be performed sufficiently accurately on the assumption. However, the assumption does not apply to some images that have three different colors within a local area. A typical case is a texture in the form of a fine stripe pattern. Such a texture tends to have many colors within a local area. Accordingly, the reliability calculating unit 471 detects such a texture in the form of a fine stripe pattern, and outputs a reliability value that is a value for projecting accuracy of estimation of the shape of color distribution in the local area on the basis of intensity of the texture. The calculation of reliability will be described later.

The rough interpolation processing unit 472 calculates estimated values (hereinafter, referred to as rough estimated values) of pixel intensity of R, G, B, and E by a simple operation using an interpolation method to be described later so as to generate a set of intensities of R, G, B, and E at a number of pixel positions within a local area. In the present invention, secondary statistics or values corresponding thereto need to be calculated in order to estimate the shape of color distribution. Therefore, intensities of the different colors at the same pixel position need to be obtained as a set. In order to generate this set of intensities, the rough interpolation processing unit 472 calculates rough estimated values of R, G, B, and E at a number of pixels within a local area ((n−2)× (n−2) pixels with a pixel of interest as a center in a local area of n×n pixels in this case).

The synthesis processing unit 473 synthesizes the rough estimated values of G and E among the rough estimated values of R, G, B, and E thereby calculates a GE synthesized rough estimated value. The rough estimated values are calculated by the rough interpolation processing unit 472.

Statistic calculating units 342-1 to 342-4 have basically the same configuration as the statistic calculating unit 342 described with reference to FIG. 15. The statistic calculating unit 342-1 calculates a statistic on the basis of the GE synthesized rough estimated value supplied from the synthesis processing unit 473 and the rough estimated value of R calculated by the rough interpolation processing unit 472, and then supplies the statistic to a regression operation processing unit 474-1. The statistic calculating unit 342-2 calculates a statistic on the basis of the GE synthesized rough estimated value supplied from the synthesis processing unit 473 and the rough estimated value of G calculated by the rough interpolation processing unit 472, and then supplies the statistic to a regression operation processing unit 474-2. The statistic calculating unit 342-3 calculates a statistic on the basis of the GE synthesized rough estimated value supplied from the synthesis processing unit 473 and the rough estimated value of B calculated by the rough interpolation processing unit 472, and then supplies the statistic to a regression operation processing unit 474-3. The statistic calculating unit 342-4 calculates a statistic on the basis of the GE synthesized rough estimated value supplied from the synthesis processing unit 473 and the rough estimated value of E calculated by the rough interpolation processing unit 472, and then supplies the statistic to a regression operation processing unit 474-4.

The regression operation processing units 474-1 to 474-4 perform a regression operation on the basis of the G+E intensity at the position of the pixel of interest calculated by the G+E intensity estimation processing unit 282, the reliability information calculated by the reliability calculating unit 471, and the statistic calculated by a corresponding one of the statistic calculating units 342-1 to 342-4. The regression operation processing unit 474-1 calculates and outputs an estimated value of R; the regression operation processing unit 474-2 calculates and outputs an estimated value of G; the regression operation processing unit 474-3 calculates and outputs an estimated value of B; and the regression operation processing unit 474-4 calculates and outputs an estimated value of E.

FIG. 18 is a block diagram showing a configuration of the reliability calculating unit 471. Specifically, in order to detect a texture in the form of a fine stripe pattern, the reliability calculating unit 471 calculates low-frequency filters in different directions for (G+E) intensities around the position of the pixel of interest. The reliability calculating unit 471 extracts high frequencies by performing difference operation processing with the (G+E) intensity at the position of the pixel of interest. When there is change in luminance such as "bright-dark-bright" or "dark-bright-dark" around the position of the pixel of interest, the reliability calculating unit 471 detects this change in the different directions. The reliability calculating unit 471 integrates results of detection in the different directions, and thereby calculates reliability. The reliability calculating unit 471 includes high-frequency extracting units 481-1 to 481-6, an addition processing unit 482, and a clip processing unit 483. The six high-frequency extracting units 481-1 to 481-6 extract high frequencies in the six different directions with the pixel of interest as a center, and output the intensities.

Figures 19A, 19B:
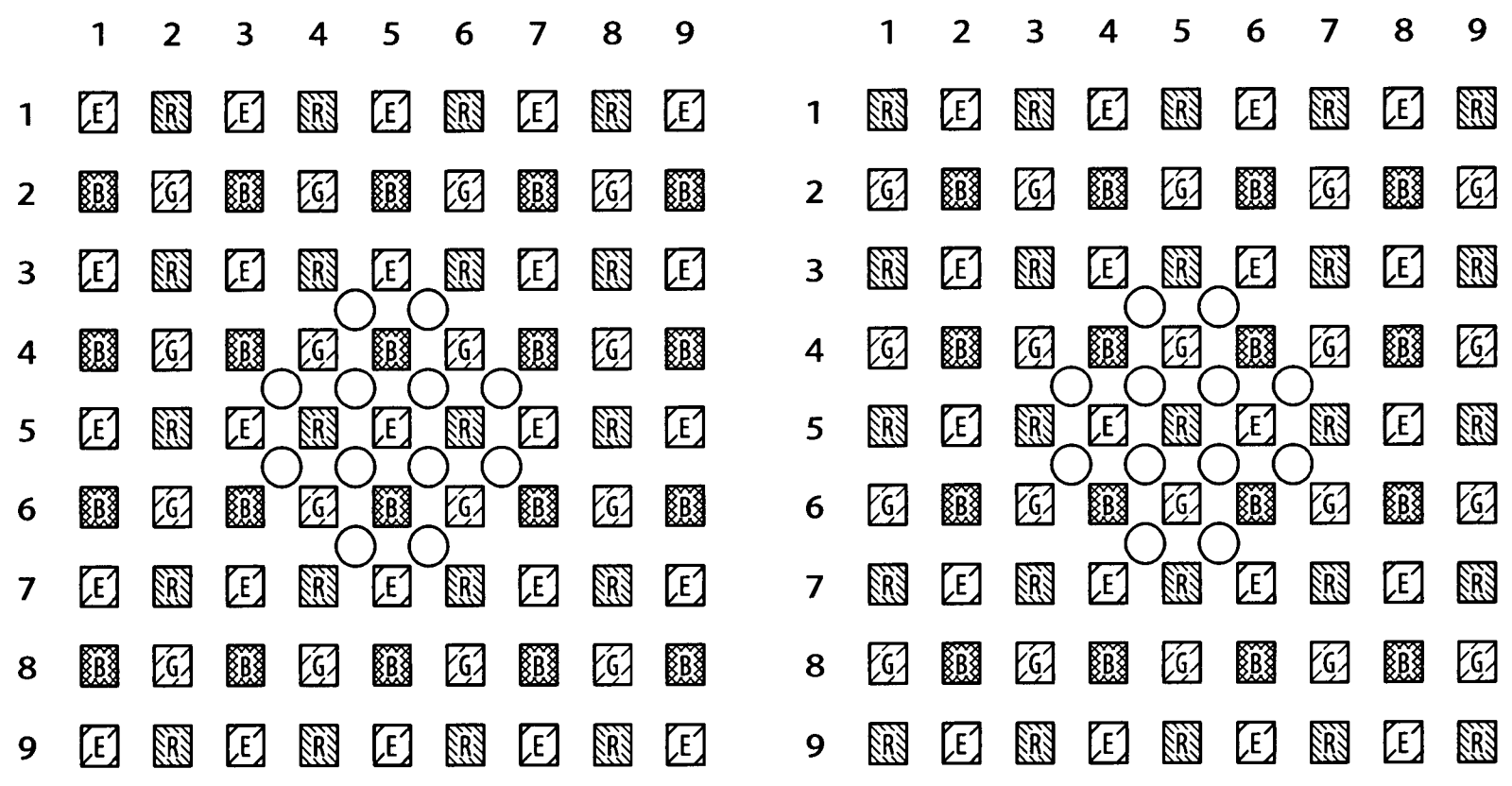

A concrete example of extracting high frequencies in the different directions by the high-frequency extracting units 481-1 to 481-6 in the reliability calculating unit 471 will be described with reference to FIGS. 19A and 19B. FIGS. 19A and 19B show a local area of 9×9 pixels extracted by the local area extracting unit 281. For description, pixel rows and columns in FIGS. 19A and 19B are assigned numbers 1 to 9. FIG. 19A shows a case where the pixel of interest (pixel at a position of a fifth row and a fifth column in FIG. 19A) is E. FIG. 19B shows a case where the pixel of interest is R. It is to be noted that since only G and E pixels are used for the calculation of reliability, the same processing as in the case where the pixel of interest is E is performed when the pixel of interest is G, and the same processing as in the case where the pixel of interest is R is performed when the pixel of interest is B.

First, (G+E) intensities at positions horizontally and vertically displaced from pixels by exactly ½ of a pixel pitch (that is, positions each surrounded by four pixels), and 12 positions nearest to the pixel of interest (positions represented by circles in FIGS. 19A and 19B) are calculated. Specifically, since a G pixel and an E pixel are obliquely adjacent to each other at all the 12 positions shown in FIGS. 19A and 19B, an average value of intensities of the two pixels is used to represent the (G+E) intensity at each of the 12 positions. A direction of an adjacent G differs between the case where the pixel of interest is G or E and the case where the pixel of interest is R or B. However, in both cases, a direction in which G and E are present at each position can be determined on the basis of whether the pixel of interest is G or E or whether the pixel of interest is R or B.

Figure 20:
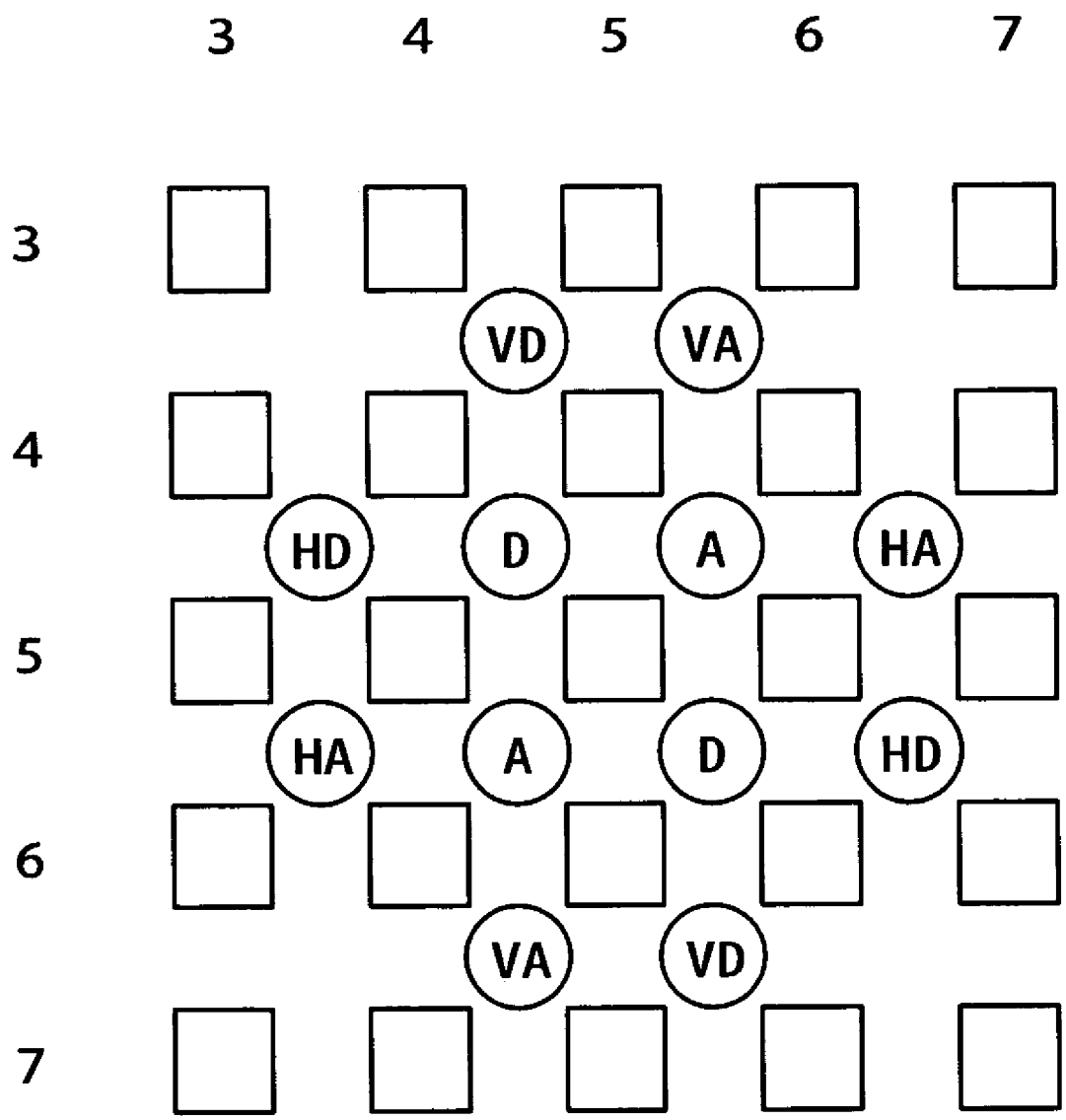
FIG. 20 is a diagram of assistance in explaining sets of pixel intensities for extracting high-frequency components in the reliability calculating unit.

After the (G+E) intensities at the 12 positions are thus calculated, the low-frequency filters in the six directions are calculated using the (G+E) intensities at the 12 positions. The filter directions will be described with reference to FIG. 20. FIG. 20 shows only 5×5 pixels, in particular, in the vicinity of a pixel of interest within a local area.

The 12 (G+E) intensity calculating positions are symmetrical with respect to a position of the pixel of interest (a third row and a third column in FIG. 20) as a center point. A total of six pairs of (G+E) intensities at positions symmetrical to each other are generated: a pair of (G+E) intensities denoted by A in FIG. 20, a pair of (G+E) intensities denoted by D in FIG. 20, a pair of (G+E) intensities denoted by VA in FIG. 20, a pair of (G+E) intensities denoted by VD in FIG. 20, a pair of (G+E) intensities denoted by HA in FIG. 20, and a pair of (G+E) intensities denoted by HD in FIG. 20. The low-frequency filters in the six directions are calculated when such a filter as calculates an average value of each of the six pairs of (G+E) intensities is used. Then, by obtaining differences between outputs of the low-frequency filters and the (G+E) intensity at the position of the pixel of interest, high frequencies in the different directions can be extracted.

Then, the addition processing unit 482 outputs a value obtained by adding together six results of the high frequency extraction with an appropriate balance. The clip processing unit 483 clips a result of addition processing by the addition processing unit 482, and then outputs the clipped addition value of the high frequency extraction as a reliability value.

The calculated reliability value becomes larger as intensity of the texture in the form of a fine stripe pattern is increased. Hence, as the reliability value becomes smaller, a possibility that the estimation of the shape of color distribution on the basis of statistics is accurate is increased.

Next, the rough interpolation processing unit 472 calculates estimated values (rough estimated values) of R, G, B, and E by a simple calculation method using interpolation so as to generate a set of intensities of R, G, B, and E at a number of pixel positions within a local area. Rough interpolation processing by the rough interpolation processing unit 472 will be described with reference to FIG. 21.

Figure 21:
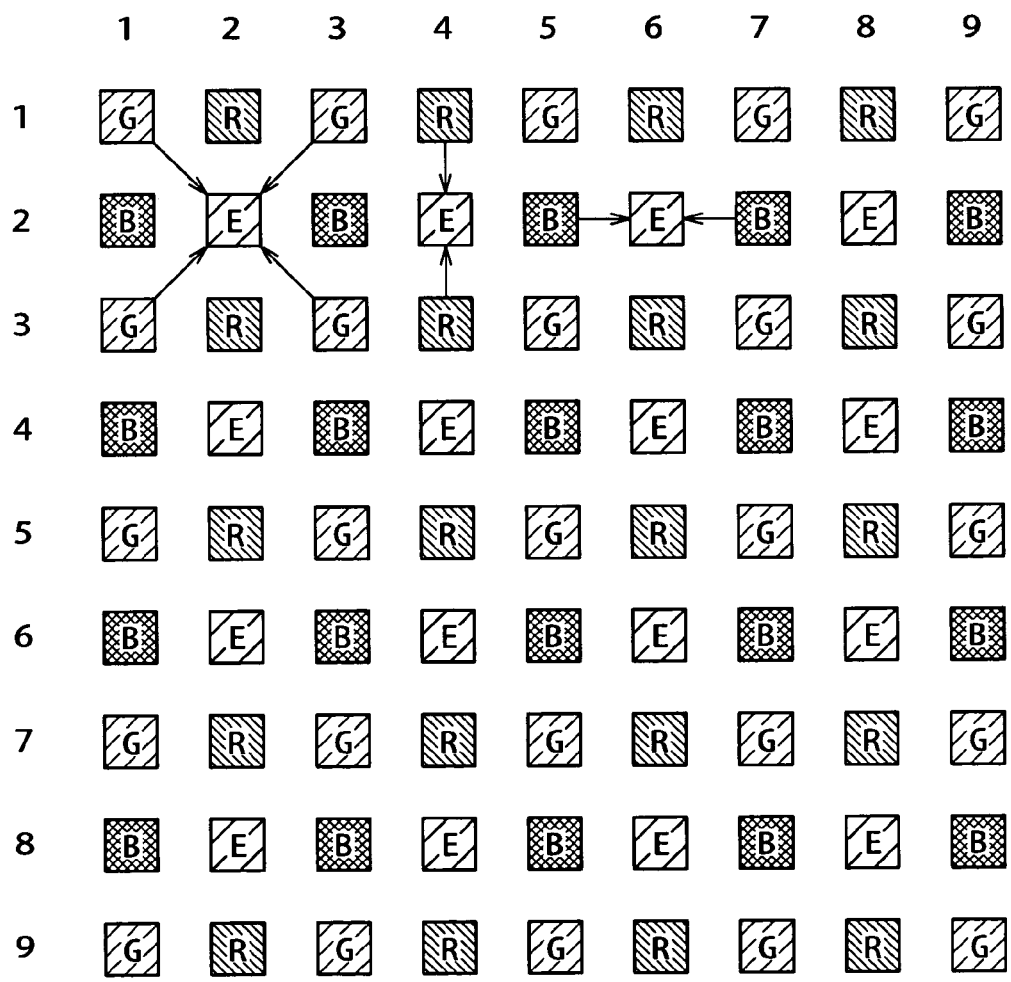
FIG. 21 is a diagram of assistance in explaining processing of a rough interpolation processing unit in FIG. 17.

FIG. 21 shows pixels in a local area of 9×9 pixels extracted by the local area extracting unit 281. The rough interpolation processing unit 472 uses rough interpolation to obtain intensities of R, G, B, and E at positions of 7×7 pixels from a second row to an eighth row and from a second column to an eighth column in the local area of 9×9 pixels. Directing attention to E, for example, the rough interpolation processing unit 472 can calculate an interpolated value of G from peripheral pixels in four oblique directions, as shown at a pixel at the second row and the second column in FIG. 21, calculate an interpolated value of R from two pixels on an upper and a lower side, as shown at a pixel at the second row and the fourth column in FIG. 21, and calculate an interpolated value of B from two pixels on a right and a left, as shown at a pixel at the second row and the sixth column in FIG. 21. When the color arrangement of the color filters is the Bayer arrangement, such interpolations from four pixels in oblique directions, two pixels on an upper and a lower side, and two pixels on a right and a left are possible at any pixel position. Including a pixel value of a pixel itself, an interpolated value of each of R, G, B, and E is obtained. That is, including the color of a signal at each pixel position (color before correction), one interpolated value of R, one interpolated value of G, one interpolated value of B, and one interpolated value of E are surely obtained at each pixel. Thus, the rough interpolation processing unit 472 can calculate rough estimated values of R, G, B, and E at each pixel position.

The estimated values of R, G, B, and E obtained by the rough interpolation processing unit 472 need only to be a set of estimated values of R, G, B, and E at the same position and, therefore, the estimated values of R, G, B, and E do not necessarily need to be a set of estimated values of R, G, B, and E at an original pixel position of the sensor.

Figure 22:
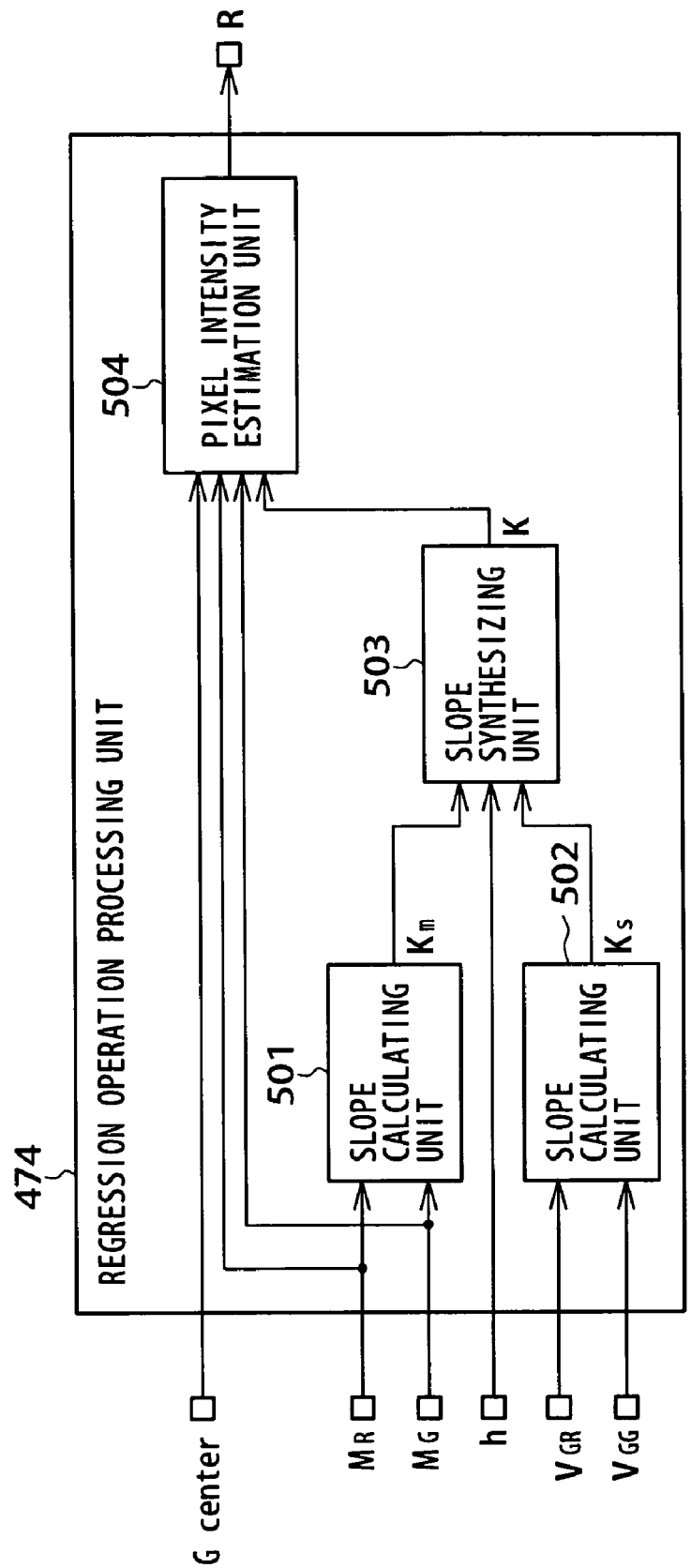
FIG. 22 is a block diagram showing a configuration of a regression operation processing unit in FIG. 17.

FIG. 22 is a block diagram showing a configuration of the regression operation processing unit 474. While the regression operation processing unit 474 for R (that is, the regression operation processing unit 474-1) is shown in FIG. 22, in operation for G, B, or E, it suffices only to replace R with G, B, or E and basically the same processing is performed.

The regression operation processing unit 474 includes a slope calculating unit 501, a slope calculating unit 502, a slope synthesizing unit 503, and a pixel intensity estimating unit 504.

The slope calculating unit 501 calculates a slope Km of a G-R color distribution based on an average value $M_R$ of R and an average value $M_G$ of G. Specifically, the regression operation processing unit 474 calculates a ratio between the two average values using the above-described Equation (7). In this case, C1 is G, and C2 is R.

$M_{threshold}$ is a constant for avoiding divergence of the value by division by zero, and a sufficiently small positive value is preset as $M_{threshold}$.

The slope calculating unit 502 calculates a slope Ks of a C1-C2 color distribution based on a covariance value $V_{C1, C2}$ of C1 and C2 and a variance value $V_{C1, C1}$ of C1. In this case, C1 is G, and C2 is R. Specifically, the slope calculating unit 502 calculates a ratio between the variance value and the covariance value using the above-described Equation (8).

$V_{threshold}$ is a constant for avoiding divergence of the value by division by zero, and a sufficiently small positive value is preset as $V_{threshold}$. By clipping the variance of C1 as a denominator using $V_{threshold}$ in Equation (8), it is possible to avoid division by zero. The clipping using $V_{threshold}$ also can be utilized to reduce noise in a flat portion of an image.

Specifically, the variance of C1 as the denominator is a value reflecting variations in brightness in the local area. A small variance value is synonymous with a flat local area. Noise of a solid-state image pickup element becomes more noticeable when the image is flat. Therefore, a process of noise reduction in only a flat portion of an image is suitable because noticeable noise can be effectively reduced without degradation in quality of the image as a whole. Further, by clipping the denominator of the slope Ks of the color distribution and, thus, preventing the denominator from becoming still smaller, it is possible to reduce an absolute value of Ks to a value smaller than an original value. The reduced absolute value of the slope Ks decreases a rate of change of C2 with respect to C1. Consequently the amplitude of C2 in the local area can be suppressed.

As described above, the process of clipping the denominator of the slope Ks has the effect of noise reduction as in a case where both processes of determining whether the image is flat and suppressing the output amplitude are performed. Thus, the color estimation method of the present invention can suppress noticeable noise in a flat portion of an image without addition of a separate noise reduction process.

The slope synthesizing unit 503 synthesizes the two estimated slope values Km and Ks on the basis of reliability h, and thereby calculates an estimated slope value K. As described above, the estimated slope value Ks based on the variance and the covariance is not necessarily estimated accurately in an area with a texture in the form of a fine stripe pattern. Accordingly, the slope synthesizing unit 503 synthesizes the estimated slope value Ks with the estimated slope value Km based on the average values using the reliability h reflecting the intensity of the texture in the form of a fine stripe pattern (for example, using Equation (9)), and thereby calculates the estimated slope value K.

$$K = hK_m + (1-h)K_s \quad \text{[Equation 9]}$$
$$= h\frac{M_{C_2}}{M_{C_1}} + (1-h)\frac{V_{C_1 C_2}}{V_{C_1 C_1}}$$

Then, the pixel intensity estimating unit 504 calculates an estimated value of R intensity at the position of the pixel of interest by assigning the obtained estimated slope value K, the two average values $M_G$ and $M_R$, and G intensity at the position of the pixel of interest to the following linear regression equation (10).

$$C_{2center} = K(C_{1center} - M_{C_1}) + M_{C_2} \quad \text{[Equation 10]}$$

where $C_{1center}$ and $C_{2center}$ are respectively the intensity of the color C1 (that is, G) corresponding to a first signal at the position of the pixel of interest and the estimated value of intensity of the color C2 (that is, R) corresponding to a second signal at the position of the pixel of interest.

The pixel intensity estimating unit 504 may calculate the estimated intensity value using a regression equation different from Equation (10). For example, the pixel intensity estimating unit 504 may perform a linear regression calculation with the estimated slope value K multiplied by an appropriate constant u, as shown by Equation (11).

$$C_{2center} = u \cdot K(C_{1center} - M_{C_1}) + M_{C_2} \quad \text{[Equation 11]}$$

In Equation (11), a first term can be considered to be a high-frequency component of intensity of the color C2 (that is, R) corresponding to the second signal, and a second term can be considered to be a low-frequency component of intensity of the color C2 (that is, R) corresponding to the second signal. By somewhat boosting the high-frequency component by the appropriate constant u in Equation (11), the same effects as in appropriate high-frequency correction for R can be obtained. Thus, it is thus possible to obtain an image with corrected high frequencies without addition of a separate high frequency correction process.

Description has been made of a case where the regression operation processing unit 474 calculates the slope K of the regression line on the basis of the average values, the variance value, and the covariance value calculated by the statistic calculating unit 342. However, the slope of the regression line may be calculated by using a different method.

For example, a defining equation for calculating the slope of the regression line using standard deviations and a correlation coefficient is represented by the following Equation (12):

$$K = R_{xy}\frac{S_y}{S_x} = \frac{\sum_{i=1}^{N}(x_i - M_x)(y_i - M_y)}{\sqrt{\sum_{i=1}^{N}(x_i - M_x)^2 \sum_{i=1}^{N}(y_i - M_x)^2}} \frac{\sqrt{\frac{1}{N}\sum_{i=1}^{N}(x_i - M_y)^2}}{\sqrt{\frac{1}{N}\sum_{i=1}^{N}(y_i - M_x)^2}}$$

[Equation 12]

The standard deviations Sx and Sy are statistics that indicate width of distribution of data values around an average, and are considered to be values close to dx and dy that represent variations in xy directions of two variables. This Equation (12) may be used to obtain the regression line.

When data is distributed on a line having a positive slope and Rxy is one, in particular, Sx and Sy are equivalent to dx and dy. That is, when there are other statistics indicating width of data distribution and requiring simpler operations, it can be expected that even when the standard deviations Sx and Sy requiring complex calculation are replaced with the other statistics indicating the width of data distribution, the slope of the regression line behaves in an approximate manner.

Accordingly, as another statistic indicating the width of data distribution, a mean deviation, which is used to indicate the width of data distribution besides the standard deviation, is substituted. A definition of a mean deviation Ax of x is represented by the following Equation (13):

$$A_x = \frac{1}{N}\sum_{i=1}^{N}|x_i - M_x|$$

[Equation 13]

Similarly, a mean deviation Ay of y is represented by the following Equation (14):

$$A_y = \frac{1}{N}\sum_{i=1}^{N}|y_i - M_y|$$

[Equation 14]

When Rxy is rewritten using the mean deviations Ax and Ay, the following Equation (15) is obtained.

$$R_{xy} = \frac{V_{xy}}{S_x S_y} \cong \frac{V_{xy}}{A_x A_y}$$

[Equation 15]

As compared with the operation using the standard deviations requiring a square root and multiplication, the calculation of the mean deviations requires a smaller amount of calculation. Further, an approximation of Rxy can be calculated at high speed by using approximate operations of multiplication used in calculation of Vxy and multiplication of Ax and Ay.

Thus, instead of the process in which the regression operation processing unit 474 calculates the slope K of the regression line on the basis of the average values, the variance value, and the covariance value calculated by the statistic calculating unit 342, the regression operation processing unit 474 may calculate the slope of the regression line in the two-dimensional distribution of data of two systems using the standard deviations and the correlation function, or calculate the slope of the regression line in the two-dimensional distribution of the data of the two systems after approximate operations for the deviations and the correlation.

Figure 23:
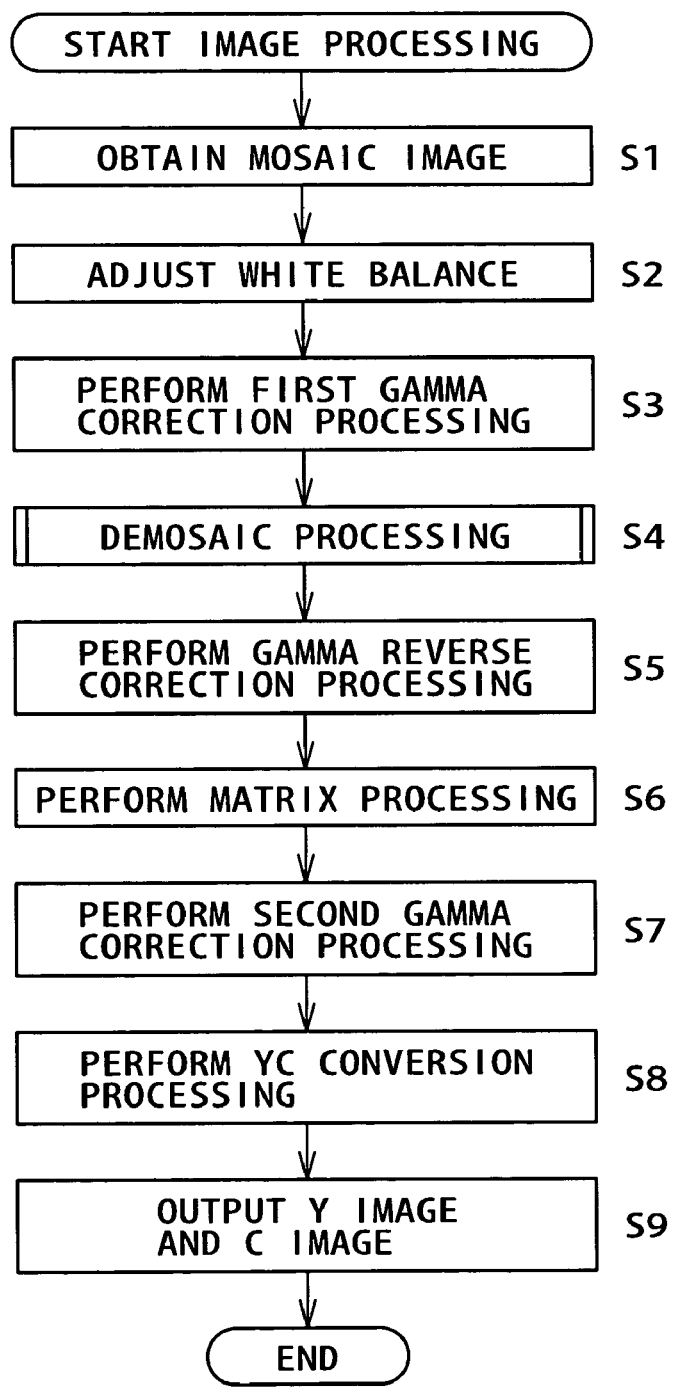
FIG. 23 is a flowchart of assistance in explaining image processing performed by the DSP block of FIG. 5.

Description now will be made of processing of the DSP block 216 in FIG. 5 with reference to a flowchart of FIG. 23.

In step S1, the image RAM 241 obtains and temporarily stores a mosaic image including intensity signals from a periodic pattern of the arrangement (for example, the four-color arrangement described with reference to FIG. 3) defined by the color filters used in the CCD image sensor 213.

In step S2, the white balance adjusting unit 251 in the signal processor 242 performs white balance adjusting processing, which is processing of multiplying the mosaic image by an appropriate coefficient in accordance with a color of each pixel intensity so as to make a color balance of an achromatic subject area achromatic.

In step S3, the gamma correction unit 252 performs a first gamma correction on each pixel intensity of the mosaic image having the adjusted white balance so that brightness and color saturation of the image displayed on the display unit 220 are correctly displayed.

Figure 24:
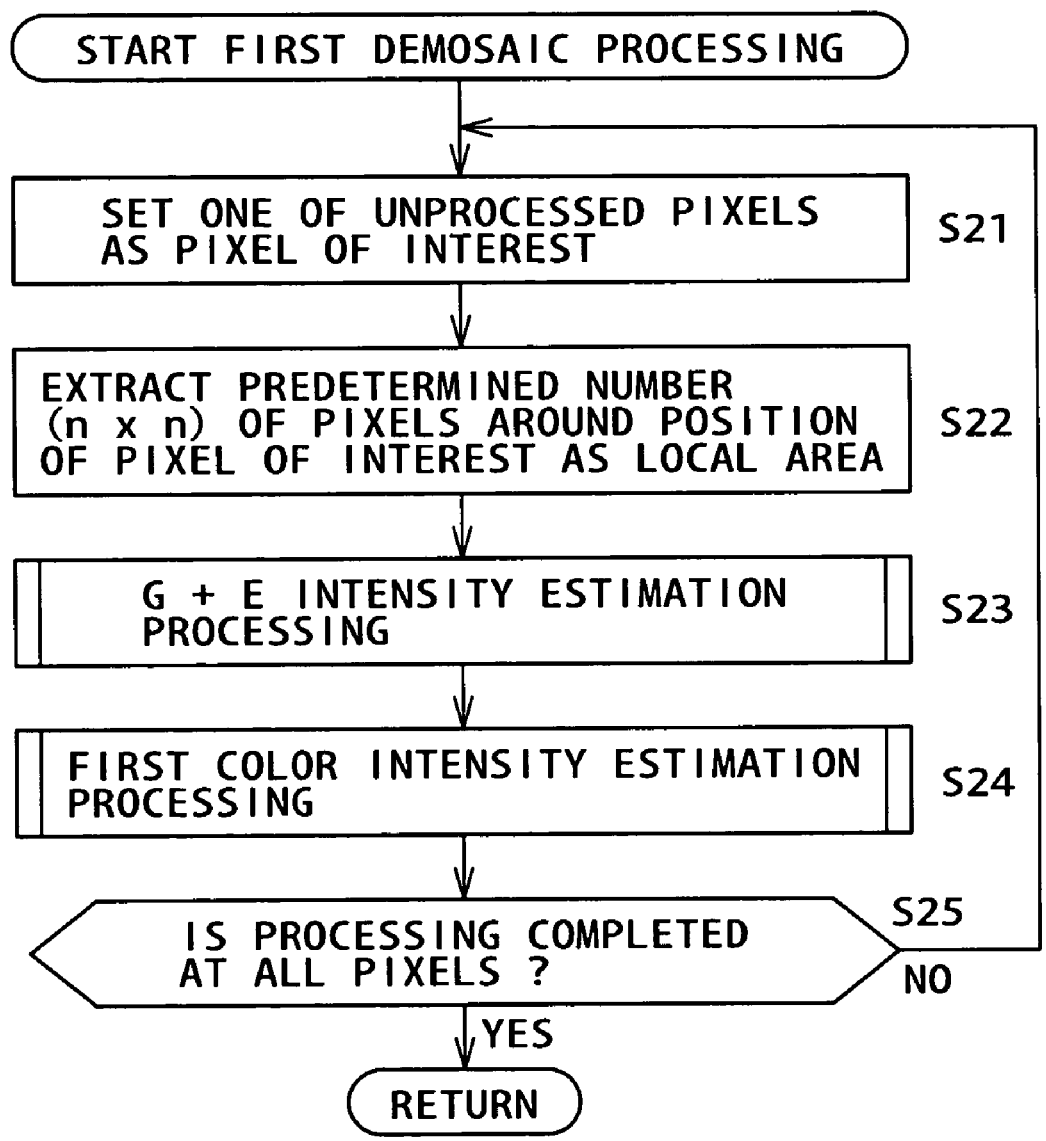
FIG. 24 is a flowchart of assistance in explaining first demosaic processing.

In step S4, the demosaic processing unit 253 performs demosaic processing to be described later with reference to FIG. 24.

In step S5, the gamma reverse correction unit 254 performs gamma reverse correction processing by applying a reverse of a gamma characteristic applied to the four-channel image of $R^\gamma$, $G^\gamma$, $B^\gamma$, and $E^\gamma$ as an output from the demosaic processing unit 253, and thereby restores the gamma characteristic to a linear characteristic.

In step S6, the matrix processing unit 255 converts the four-channel image of R, G, B, and E supplied thereto from the gamma reverse correction unit 254 into three primary-color intensity values [Rm, Gm, Bm] by applying a linear matrix of three rows and four columns of preset coefficients to the four-channel image of R, G, B, and E. This matrix processing needs to be applied to image intensities having linear characteristics. Therefore, the gamma reverse correction needs to be made by the gamma reverse correction unit 254 in a stage preceding the matrix processing. The coefficients of the linear matrix are an important design item for optimum color reproduction. Since the matrix processing is applied after the demosaic processing, the linear matrix coefficients used by the matrix processing unit 255 may be designed as appropriate. Outputs of the matrix processing unit 255 are three color-corrected images corresponding to the three colors Rm, Gm, and Bm.

In step S7, the gamma correction unit 256 performs a second gamma correction on the color-corrected three-channel image.

In step S8, the YC conversion unit 257 performs YC conversion by subjecting the three-channel image of R, G, and B supplied from the gamma correction unit 256 to YC matrix processing and chroma component band limitation, and thereby generates a Y image and a C image. The YC conversion unit 257 then outputs the generated Y image and C image in step S9, whereby the processing is ended.

By such processing, the DSP block 216 subjects the mosaic image signal supplied thereto to various processes, and generates the Y image and the C image. Under control of the CPU 223, the DSP block 216 supplies the image data to the D/A converter 218 when the image data is to be displayed on the display unit 220, and supplies the image data to the codec processing unit 221 when the image data is to be stored in the memory 222.

The first demosaic processing performed in step S4 in FIG. 23 now will be described with reference to a flowchart of FIG. 24.

In step S21, the local area extracting unit 281 sets one of unprocessed pixels as a pixel of interest. In step S22, the local area extracting unit 281 extracts a predetermined number (n×n) of pixels around the position of the pixel of interest as a local area, and then supplies the local area to the G+E intensity estimation processing unit 282 and the RGBE intensity estimating unit 283.

Figure 25:
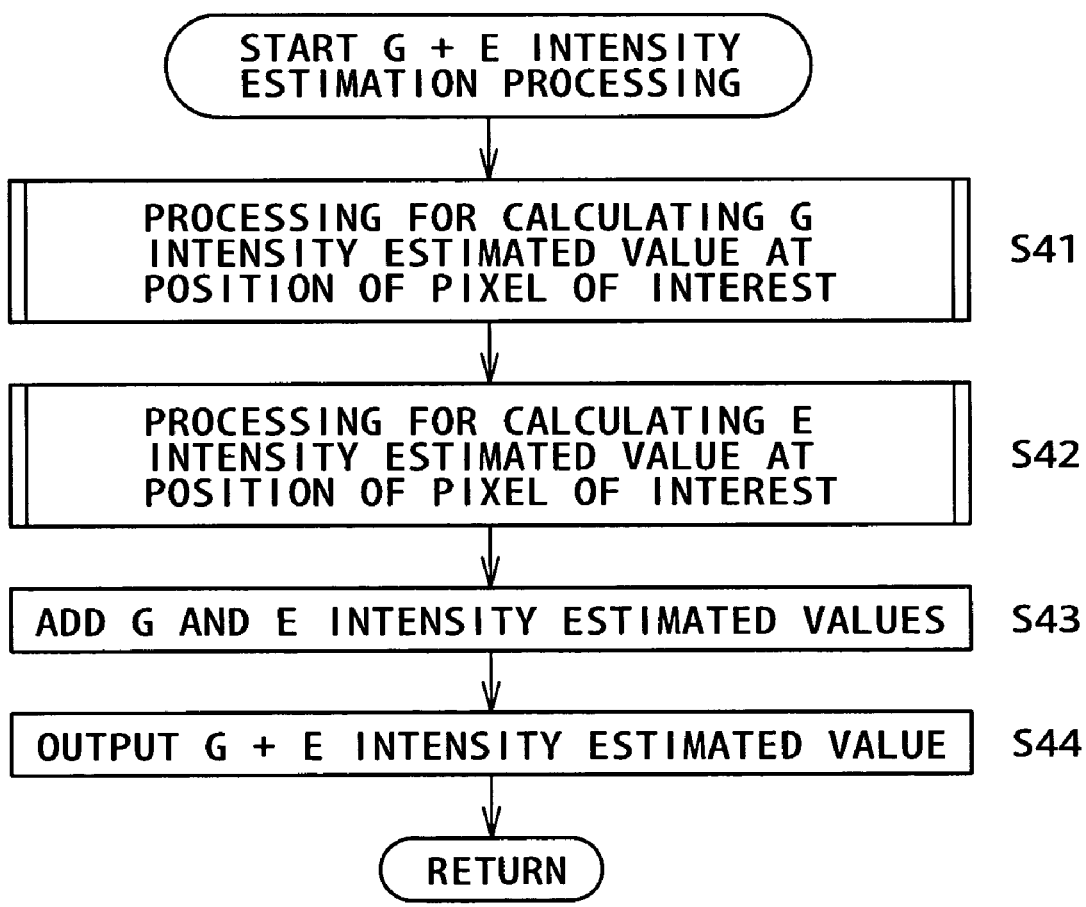
FIG. 25 is a flowchart of assistance in explaining G+E intensity estimation processing.

In step S23, G+E intensity estimation processing to be described later with reference to a flowchart of FIG. 25 is performed.

Figure 50:
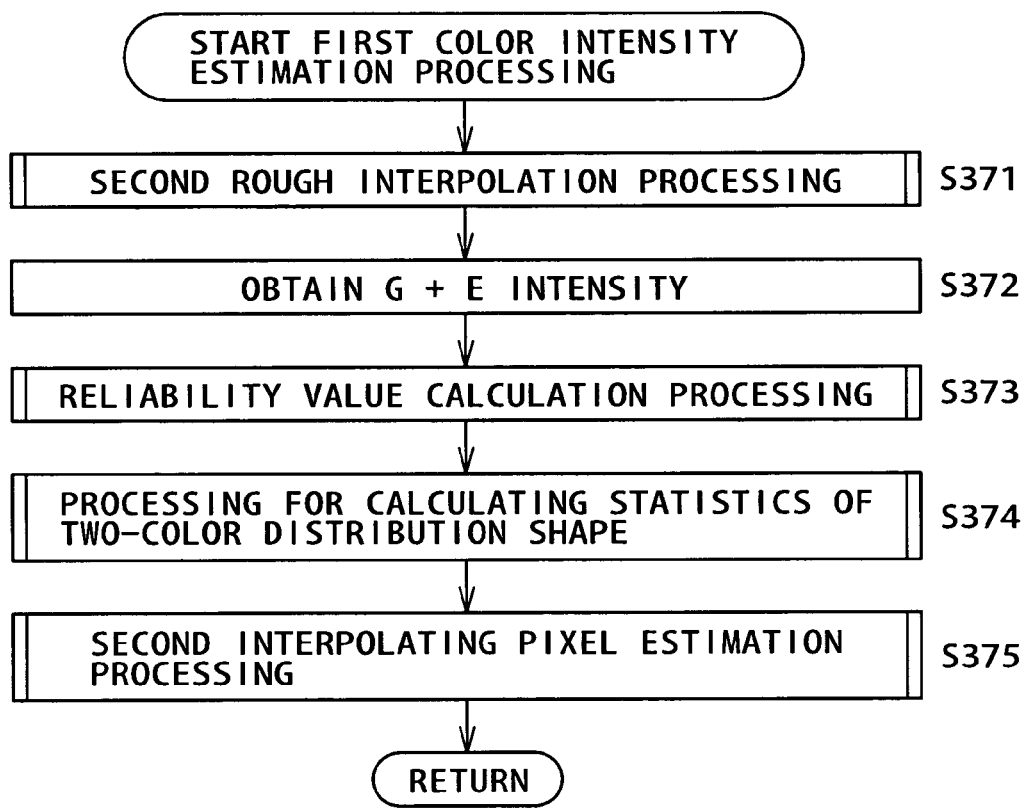
FIG. 50 is a flowchart of assistance in explaining first color intensity estimation processing.

In step S24, first color intensity estimation processing to be described later with reference to a flowchart of FIG. 50 is performed in parallel by the parts of the RGBE intensity estimating unit 283 in FIG. 6.

IN step S25, the local area extracting unit 281 determines whether the processing is completed at all the pixels. When the local area extracting unit 281 determines in step S25 that the processing is not completed at all the pixels, the processing returns to step S21 to repeat the process from step S21 on down. When the local area extracting unit 281 determines in step S25 that the processing is completed at all the pixels, the processing proceeds to step S5 in FIG. 23.

In other words, when the position of a certain pixel of interest is determined, the parts including the demosaic processing unit 253 perform respective processes at the position of the pixel of interest, and when the processing from step S21 to step S25 is ended at all the pixels, the processing is ended.

As a result of such processing, the mosaic image obtained on the basis of the arrangement of the color filters of the CCD image sensor 213 is demosaicked (color interpolation or synchronization), whereby image data in which each color for forming the color filters is interpolated at each pixel can be obtained.

The G+E intensity estimation processing performed in step S23 in FIG. 24 now will be described with reference to a flowchart of FIG. 25.

In step S41, the G intensity estimating unit 291 performs processing for calculating a G intensity estimated value at the position of the pixel of interest. The processing will be described later with reference to FIG. 26.

In step S42, the E intensity estimating unit 292 performs processing for calculating an E intensity estimated value at the position of the pixel of interest. The processing will be described later with reference to FIG. 26.

In step S43, the addition processing unit 293 adds together the G intensity estimated value calculated in step S41 and the E intensity estimated value calculated in step S42, and thereby calculates a G+E intensity estimated value. In step S44, the addition processing unit 293 outputs the G+E intensity estimated value. The processing then returns to step S24 in FIG. 24.

AS a result of such processing, the G+E intensity estimated value as a new estimated intensity value of G and E arranged in a checkered manner can be calculated to be used for the operation of estimation of intensity of each of the RGBE colors as later described.

Incidentally, the process of step S41 and the process of step S42 may be performed in parallel with each other or in reverse order.

Referring to a flowchart of FIG. 26, description now will be made of the processing for calculating the G intensity estimated value at the position of the pixel of interest and the processing for calculating the E intensity estimated value at the position of the pixel of interest. The processing is performed in step S41 and step S42 of the G+E intensity estimation processing in FIG. 25.

That is, the processing for calculating the G intensity estimated value at the position of the pixel of interest performed by the G intensity estimating unit 291 and the processing for calculating the E intensity estimated value at the position of the pixel of interest performed by the E intensity estimating unit 292 are basically the same processing except that a color to be interpolated is G or E.

In description of the block diagram of FIG. 8 showing the G intensity estimating unit 291 or the E intensity estimating unit 292, estimated values are calculated in advance by all the four different types of operations based on the color at the position of the pixel of interest, and finally one of the estimated values is selected for output by the switch 306. However, when the same processing is performed by software, an operating procedure in which the color of the pixel of interest is determined first and an operation to be performed is correspondingly selected is more efficient.

In step S61, the G intensity estimating unit 291 or the E intensity estimating unit 292 determines whether the color of the pixel of interest is the color to be interpolated (G in the processing of the G intensity estimating unit 291 and E in the processing of the E intensity estimating unit 292).

When the G intensity estimating unit 291 or the E intensity estimating unit 292 determines in step S61 that the color of the pixel of interest is the color to be interpolated, the G intensity estimating unit 291 or the E intensity estimating unit 292 outputs a pixel intensity at the position of the pixel of interest in step S62. The processing then proceeds to step S42 or step S43 in FIG. 25.

When the G intensity estimating unit 291 or the E intensity estimating unit 292 determines in step S61 that the color of the pixel of interest is not the color to be interpolated, the G intensity estimating unit 291 or the E intensity estimating unit 292 determines in step S63 whether the color of the pixel of interest is either G or E that is not the color to be interpolated (E in the processing of the G intensity estimating unit 291 and G in the processing of the E intensity estimating unit 292).

When the G intensity estimating unit 291 or the E intensity estimating unit 292 determines in step S63 that the color of the pixel of interest is either G or E that is not the color to be interpolated, the G intensity estimating unit 291 or the E intensity estimating unit 292 in step S64 calculates an estimated intensity value to be interpolated by the first processing block 302, and outputs the estimated intensity value. The processing then proceeds to step S42 or step S43 in FIG. 25.

When the G intensity estimating unit 291 or the E intensity estimating unit 292 determines in step S63 that the color of the pixel of interest is not the color to be interpolated and is neither G nor E, the G intensity estimating unit 291 or the E intensity estimating unit 292 determines in step S65 whether the color of the pixel of interest is disposed on a right and a left of the color to be interpolated (B in the processing of the G intensity estimating unit 291 and R in the processing of the E intensity estimating unit 292 when the four-color arrangement of FIG. 3 is used for the color filters, for example).

When the G intensity estimating unit 291 or the E intensity estimating unit 292 determines in step S65 that the color of the pixel of interest is disposed on the right and the left of the color to be interpolated, the G intensity estimating unit 291 or the E intensity estimating unit 292 in step S66 calculates an estimated intensity value to be interpolated by the second processing block 303, and outputs the estimated intensity value. The processing then proceeds to step S42 or step S43 in FIG. 25.

When the G intensity estimating unit 291 or the E intensity estimating unit 292 determines in step S65 that the color of the pixel of interest is not the color disposed on the right and the left of the color to be interpolated, the G intensity estimating unit 291 or the E intensity estimating unit 292 in step S67 calculates an estimated intensity value to be interpolated by the third processing block 304, and outputs the estimated intensity value. The processing then proceeds to step S42 or step S43 in FIG. 25.

By such processing, the G intensity estimating unit 291 or the E intensity estimating unit 292 can estimate the G or E intensity at the position of the pixel of interest.

Figure 26:
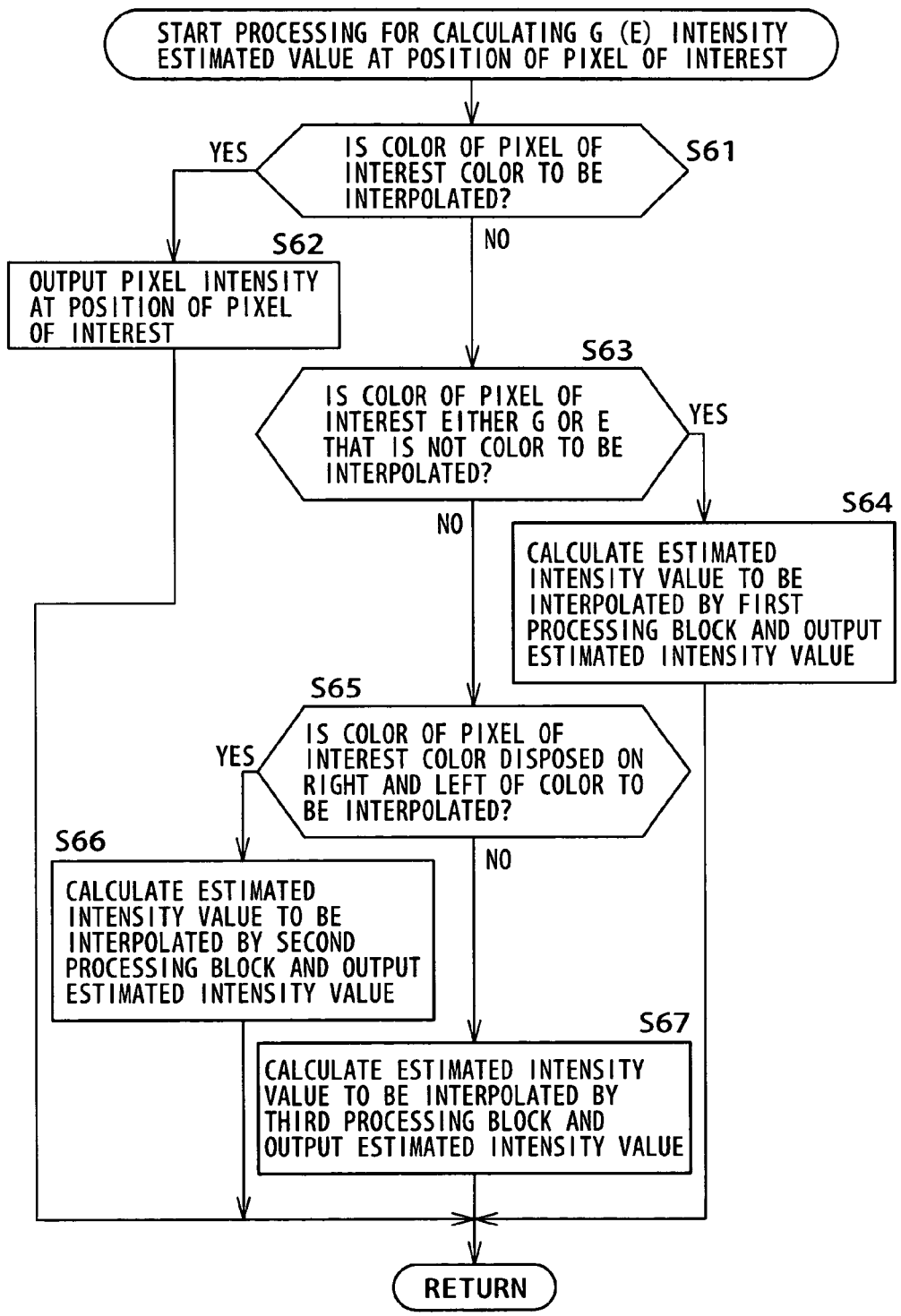
FIG. 26 is a flowchart of assistance in explaining processing for calculating a G(E) intensity estimated value at the position of a pixel of interest.

In the process of step S64, step S66, or step S67 in FIG. 26, that is, the process performed by each of the first processing block 302 to the third processing block 304, first rough interpolation processing by the rough interpolation processing unit 341, processing for calculating statistics of a two-color distribution shape by the statistic calculating unit 342, and first interpolating pixel estimation processing by the regression operation processing unit 343 are performed in the first intensity estimating unit 311, the second intensity estimating unit 321, the third intensity estimating unit 322, or the fourth intensity estimating unit 323 described with reference to FIG. 10.

The first rough interpolation processing by the rough interpolation processing unit 341, the processing for calculating statistics of a two-color distribution shape by the statistic calculating unit 342, and the first interpolating pixel estimation processing by the regression operation processing unit 343 will be described with reference to FIGS. 27 to 34.

Figure 27:
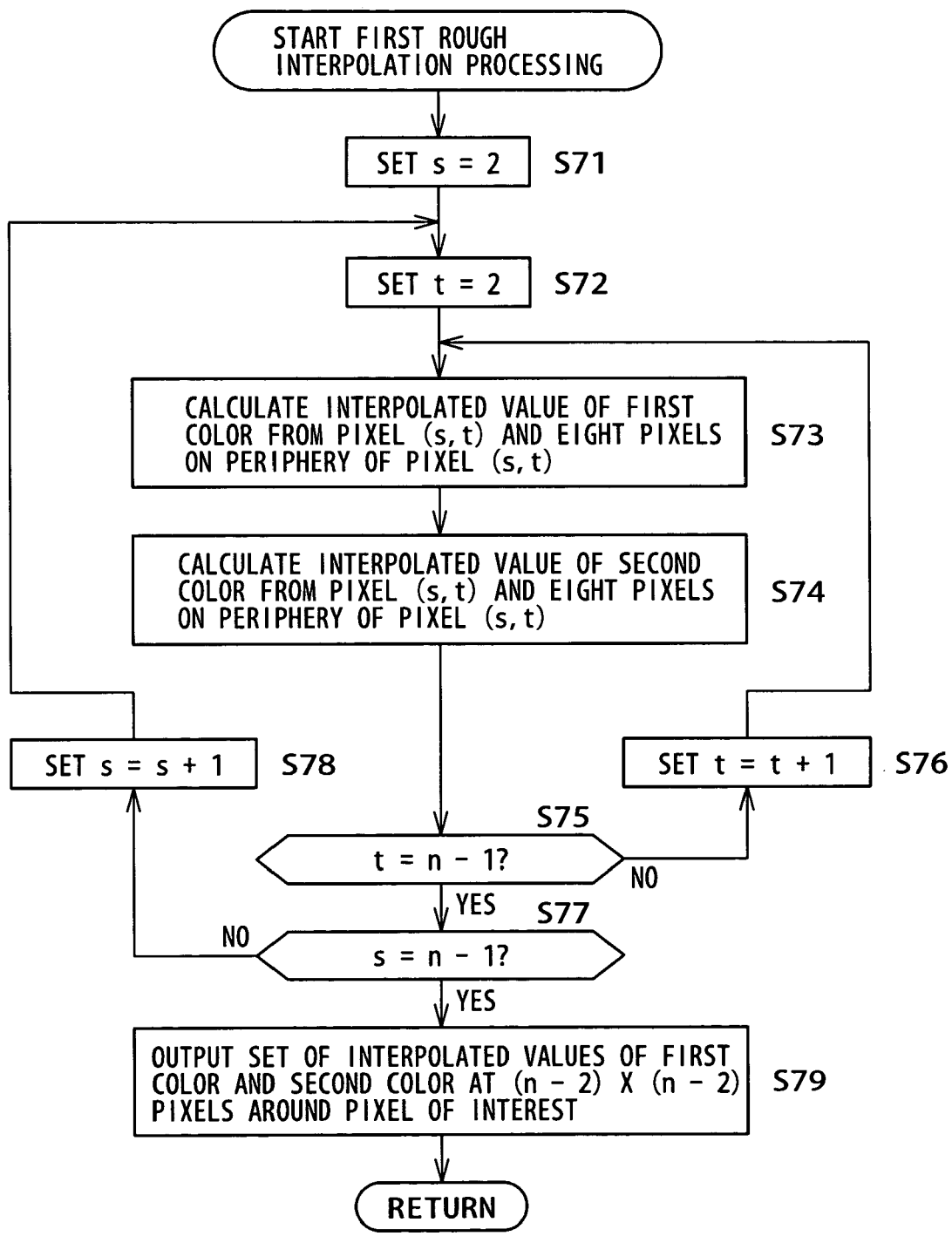
FIG. 27 is a flowchart of assistance in explaining first rough interpolation processing.

The first rough interpolation processing first will be described with reference to the flowchart of FIG. 27.

The rough interpolation processing unit 341 of the first intensity estimating unit 311 selects the color at the position of the pixel of interest as a first color and a color obliquely adjacent thereto as a second color. The rough interpolation processing unit 341 of the second intensity estimating unit 321 selects the color at the position of the pixel of interest as a first color and a color horizontally adjacent thereto as a second color. The rough interpolation processing unit 341 of the third intensity estimating unit 322 selects the color at the position of the pixel of interest as a first color and a color vertically adjacent thereto as a second color. The rough interpolation processing unit 341 of the fourth intensity estimating unit 323 selects the color horizontally adjacent to the position of the pixel of interest and the color vertically adjacent to the position of the pixel of interest as a first color and a second color.

In step S71, the rough interpolation processing unit 341 sets s=2 by initializing a value s of a first register indicating the position of a pixel where the processing is to be performed among the pixels of the supplied local area. In step S72, the rough interpolation processing unit 341 sets t=2 by initializing a value t of a second register indicating the position of a pixel where the processing is to be performed among the pixels of the supplied local area.

In step S73, the rough interpolation processing unit 341 extracts pixel values of the first color from the pixel (s, t) and eight pixels on the periphery of the pixel (s, t), and calculates an average value of the pixel values as a first pixel interpolated value.

In step S74, the rough interpolation processing unit 341 extracts pixel values of the second color from the pixel (s, t) and eight pixels on the periphery of the pixel (s, t), and calculates an average value of the pixel values as a second pixel interpolated value.

In step S75, the rough interpolation processing unit 341 refers to the value t of the second register to determine whether t=n−1.

When the rough interpolation processing unit 341 determines in step S75 that t≠n−1, the rough interpolation processing unit 341 sets the value t of the second register to t=t+1 in step S76. The processing then returns to step S73 to repeat the process from step S73 on down.

When the rough interpolation processing unit 341 determines in step S75 that t=n−1, the rough interpolation processing unit 341 in step S77 refers to the value s of the first register to determine whether s=n−1.

When the rough interpolation processing unit 341 determines in step S77 that s≠n−1, the rough interpolation processing unit 341 sets the value s of the first register to s=s+1 in step S78. The processing then returns to step S72 to repeat the process from step S72 on down.

When the rough interpolation processing unit 341 determines in step S77 that s=n−1, the rough interpolation processing unit 341 in step S79 outputs a set of the interpolated values of the first color and the second color at (n−2)×(n−2) pixels around the pixel of interest, whereby the processing is ended.

By such processing, the rough interpolation processing unit 341 can calculate the rough interpolated values of the first color and the rough interpolated values of the second color from the pixels around the pixel of interest.

Figure 28:
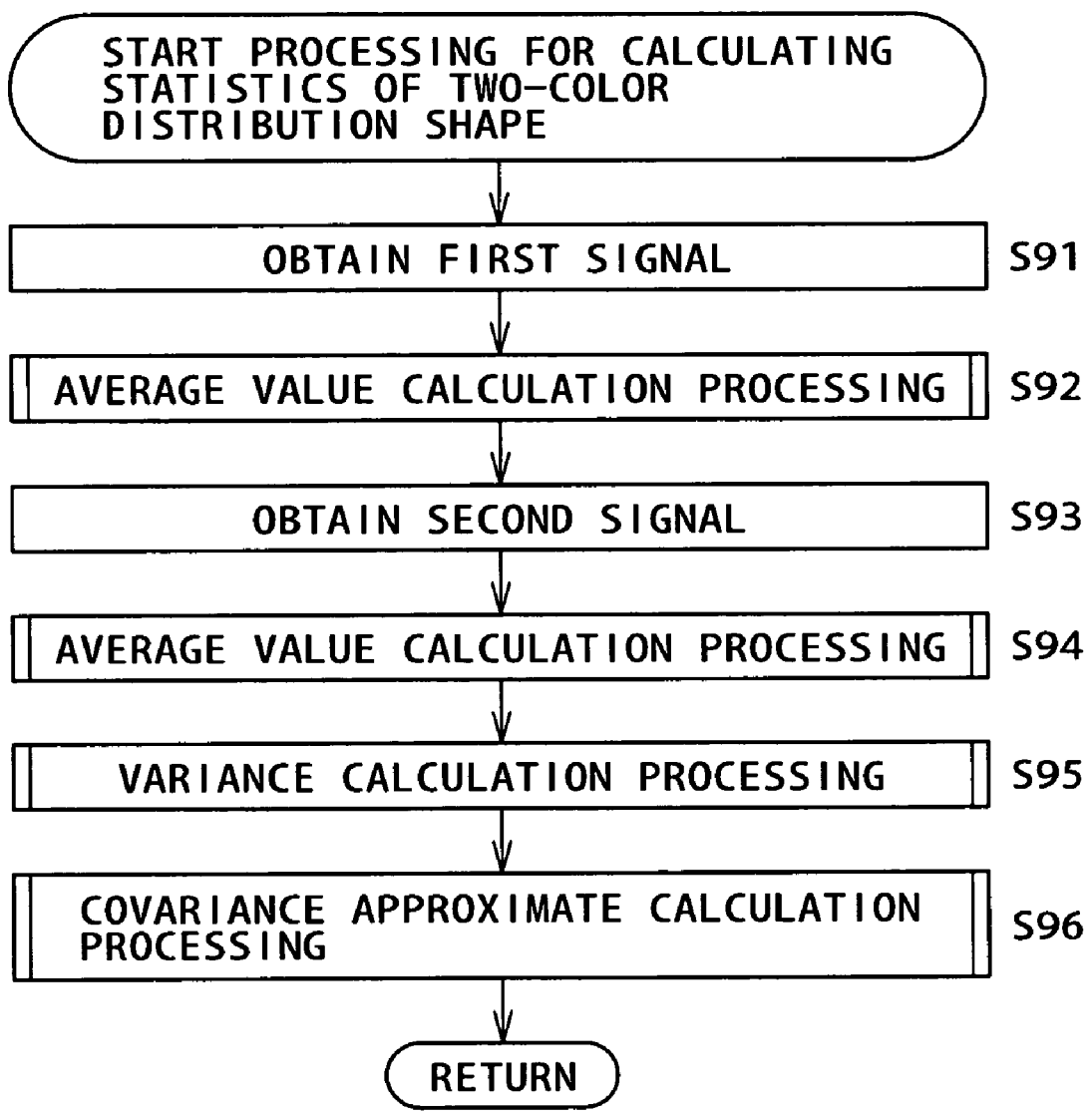
FIG. 28 is a flowchart of assistance in explaining processing for calculating statistics of a two-color distribution shape.

The processing for calculating statistics of a two-color distribution shape performed by the statistic calculating unit 342 now will be described with reference to a flowchart of FIG. 28.

In step S91, the average value calculating unit 361 of the statistic calculating unit 342 obtains a first signal of the rough interpolated values supplied from the rough interpolation processing unit 341.

Figure 29:
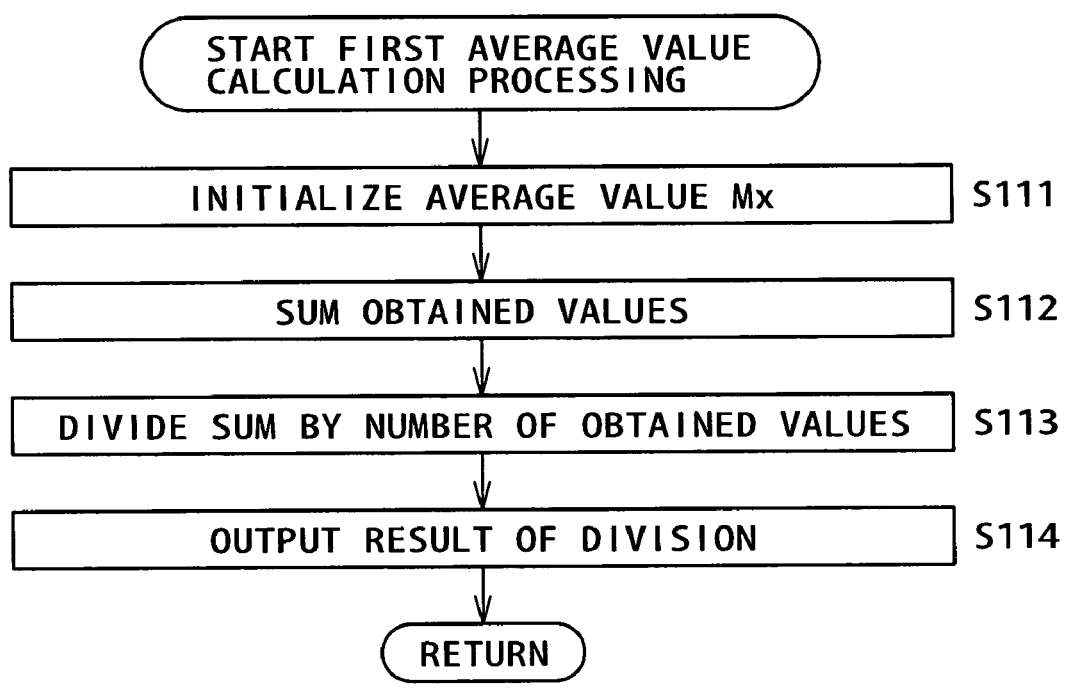
FIG. 29 is a flowchart of assistance in explaining first average calculation processing.
Figure 30:
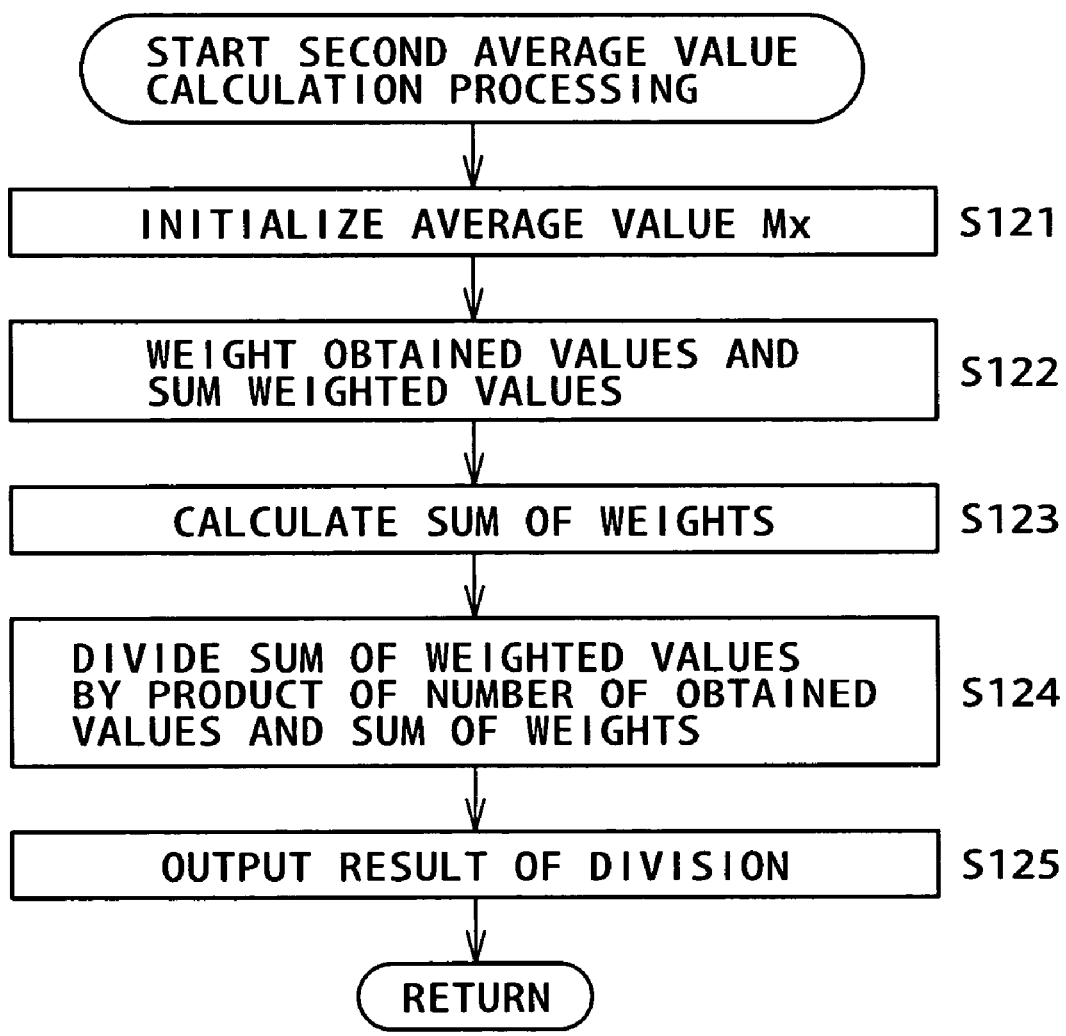
FIG. 30 is a flowchart of assistance in explaining second average calculation processing.

In step S92, the average value calculating unit 361 performs average value calculation processing to be described later with reference to a flowchart of FIG. 29 or FIG. 30.

In step S93, the average value calculating unit 363 obtains a second signal of the rough interpolated values supplied from the rough interpolation processing unit 341.

IN step S94, the average value calculating unit 363 performs average value calculation processing to be described later with reference to a flowchart of FIG. 29 or FIG. 30.

IN step S95, the variance calculating unit 362 performs variance calculation processing to be described later with reference to a flowchart of FIG. 35 or FIG. 36.

IN step S96, the covariance calculating unit 364 performs covariance approximate calculation processing to be described later with reference to a flowchart of FIG. 37.

First average value calculation processing performed in step S92 or step S94 in FIG. 28 will be described with reference to a flowchart of FIG. 29.

In step S111, the average value calculating unit 361 or the average value calculating unit 363 initializes an average value $M_x$ as a result of operation (a subscript x of the average value $M_x$ is replaced with Cr when an average value of the first color Cr is calculated and with Ce when an average value of the second color Ce is calculated).

In step S112, the average value calculating unit 361 or the average value calculating unit 363 sums obtained interpolated values ((n−2)² interpolated values in this case).

In step S113, the average value calculating unit 361 or the average value calculating unit 363 divides the total value calculated in step S112 by the number of obtained values ((n−2)² values in this case).

In step S114, the average value calculating unit 361 or the average value calculating unit 363 outputs a result of the division calculated by the process of step S113.

In obtaining the average value, the intensities of the first color and the second color roughly interpolated may be weighted according to a distance from the pixel of interest, and the average value may be obtained on the basis of weighted RGB intensities.

Second average value calculation processing performed in step S92 or step S94 in FIG. 28 will be described with reference to a flowchart of FIG. 30.

In step S121, the average value calculating unit 361 or the average value calculating unit 363 initializes an average value Mx as a result of operation (a subscript x of the average value Mx is replaced with Cr when an average value of the first color Cr is calculated and with Ce when an average value of the second color Ce is calculated).

IN step S122, the average value calculating unit 361 or the average value calculating unit 363 weights obtained interpolated values ((n−2)² interpolated values in this case) as shown in FIGS. 31 to 34, for example, and sums the weighted values.

A weight value $w_i$ is preset using, for example, a distance from a position of ith data to the position of the pixel of interest as an index. Also, different weight values may be set in each of the first intensity estimating unit 311, the second intensity estimating unit 321, the third intensity estimating unit 322, and the fourth intensity estimating unit 323. FIGS. 31 to 34 show examples of weight values used in the first intensity estimating unit 311, the second intensity estimating unit 321, the third intensity estimating unit 322, and the fourth intensity estimating unit 323. Squares in FIGS. 31-34 represent pixel positions in a local area of 9×9 pixels, and numbers in the squares represent weight values for data at the corresponding positions.

In step S123, the average value calculating unit 361 or the average value calculating unit 363 calculates a sum of weights.

In step S124, the average value calculating unit 361 or the average value calculating unit 363 calculates the above-described Equation (1). That is, in step S124, the average value calculating unit 361 or the average value calculating unit 363 divides the total value calculated in step S122 by a product of the number of obtained values ((n−2)² values in this case) and the sum of weights calculated in step S123.

In step S125, the average value calculating unit 361 or the average value calculating unit 363 outputs a result of the division calculated by the process of step S124.

By such processing, the operation of the weighted average described using Equation (1) is performed.

First variance calculation processing performed in step S95 in FIG. 28 now will be described with reference to a flowchart of FIG. 35.

In step S141, the variance calculating unit 362 of the statistic calculating unit 342 initializes a variance value Vxx outputted as a result of an operation. (The variance value Vxx is replaced with $V_{C_rC_r}$ because the variance value Vxx is the variance value of the first color Cr in this case. This description will be omitted in the following.)

In step S142, the variance calculating unit 362 obtains an average value $M_x$ of the first signal. The average value is calculated by the average value calculating unit 361. (A subscript x of $M_x$ is replaced with Cr. This description will be omitted in the following.)

In step S143, the variance calculating unit 362 is supplied with the rough interpolated values of a part (an area of (n−2)×(n−2) pixels with the pixel of interest as a center) of the pixels in the local area, and then initializes a value s' of a first register indicating the position of a pixel where the processing is to be performed among the part of the pixels to set s'=2. In step S144, the variance calculating unit 362 initializes a value t' of a second register indicating the position of the pixel where the processing is to be performed among the part (the area of the (n−2)×(n−2) pixels with the pixel of interest as the center) of the pixels in the local area to set t'=2.

In step S145, the variance calculating unit 362 subtracts the average value $M_{C_r}$ obtained in step S142 from the intensity X (that is, Crroughi, description of which will be omitted in the following) of the pixel (s', t'), squares a result of the subtraction, and then updates the variance value $V_{C_rC_r}$ with a value obtained by adding the squared result to the current variance value $V_{C_rC_r}$. That is, the variance calculating unit 362 calculates $V_{C_rC_r} = V_{C_rC_r} + (|\text{the intensity X of the pixel (s', t')} - \text{the average value } M_{C_r}|)^2$. In this calculation, the variance calculating unit 362 may weight the intensity X of the pixel (s', t') as described with reference to FIG. 11 or FIG. 12, for example.

In step S146, the variance calculating unit 362 refers to the value t' of the second register indicating the position of the pixel where the processing is performed to determine whether t'=n−1.

When the variance calculating unit 362 determines in step S146 that t'≠n−1, the variance calculating unit 362 updates the value t' of the second register to t'=t'+1 in step S147. The processing then returns to step S145 to repeat the process from step S145 on down.

When the variance calculating unit 362 determines in step S146 that t'=n−1, the variance calculating unit 362 in step S148 refers to the value s' of the first register indicating the position of the pixel where the processing is performed to determine whether s'=n−1.

When the variance calculating unit 362 determines in step S148 that s'≠n−1, the variance calculating unit 362 updates the value s' of the first register to s'=s'+1 in step S149. The processing then returns to step S144 to repeat the process from step S144 on down.

When the variance calculating unit 362 determines in step S148 that s'=n−1, the variance calculating unit 362 in step S150 outputs the variance value $V_{C_rC_r}$ of the rough interpolated values of the part (the area of the (n−2)×(n−2) pixels with the pixel of interest as the center) of the pixels in the local area. The processing then returns to step S96 in FIG. 28.

The calculation of the variance value according to its definition requires division of (|the intensity X of the pixel (s', t')−the average value $M_{C_r}$|)² by the number of pixels used in the operation of the variance value. However, the result of calculation of the variance value is used for division of a result of calculation of a covariance value by processing to be described later. When division by the same number is also performed in the calculation of the covariance value, the division process can be omitted in both the operation of the variance value and the operation of the covariance value.

Incidentally, when weighting is performed in the calculation of the variance value, as shown in the definition of the variance value described using Equation (2), the variance value can be calculated by dividing (|the intensity X of the pixel (s', t')–the average value $M_{Cr}|)^2$ by a sum of weighting factors. However, the result of calculation of the variance value is used for division of a result of calculation of a covariance value by processing to be described later. When weighting also is performed in the calculation of the covariance value, the process of division by the sum of weighting factors can be omitted in both the operation of the variance value and the operation of the covariance value.

The first variance calculation processing described with reference to FIG. 35 requires square calculation and, thus, presents problems in that the operation processing takes time and a scale of hardware is increased. Therefore, the square calculation may be replaced with an approximate calculation.

Referring to a flowchart of FIG. 36, description now will be made of second variance calculation processing performed in step S95 in FIG. 28 when the square calculation is replaced with an approximate calculation.

Figure 35:
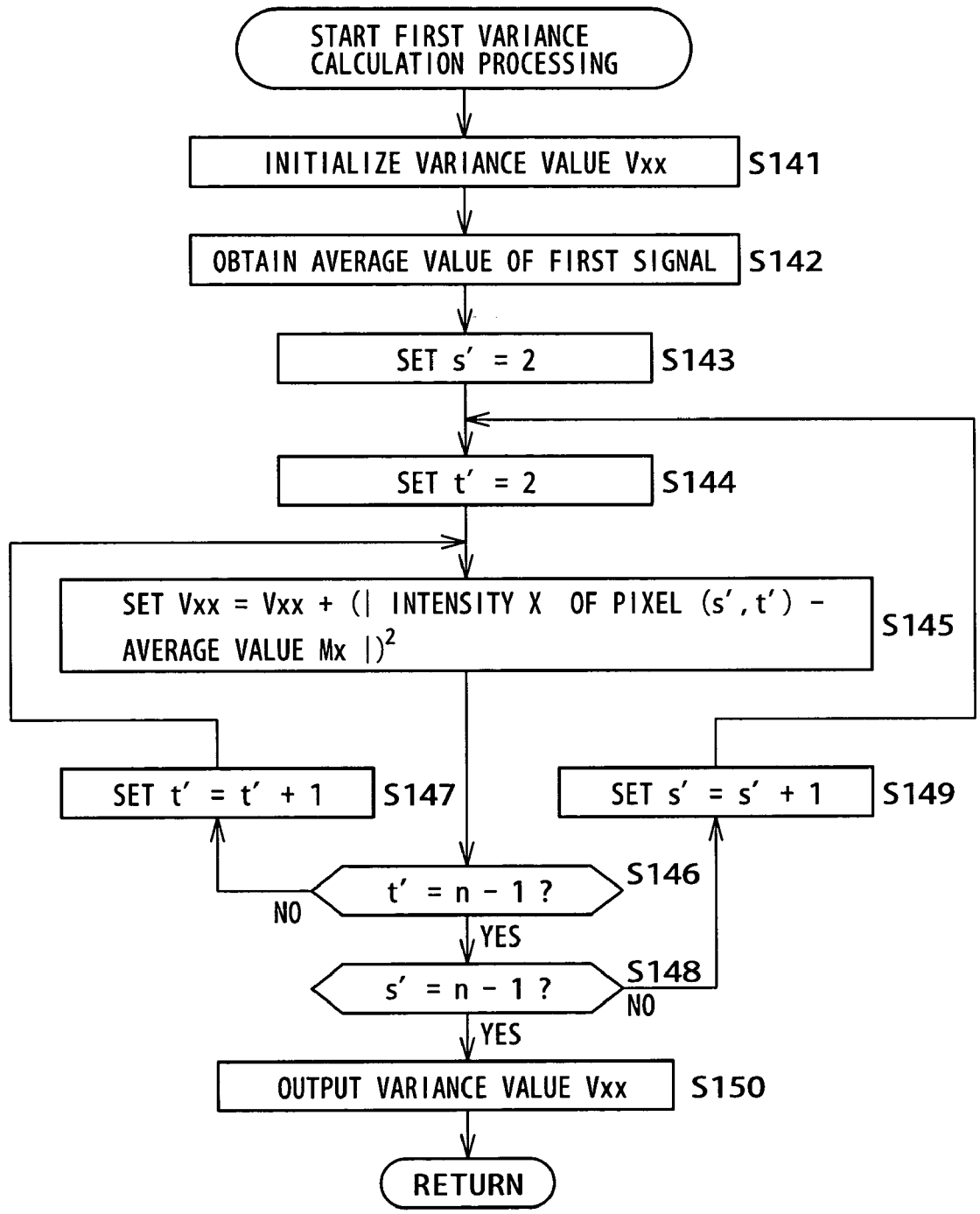
FIG. 35 is a flowchart of assistance in explaining first variance calculation processing.
Figure 36:
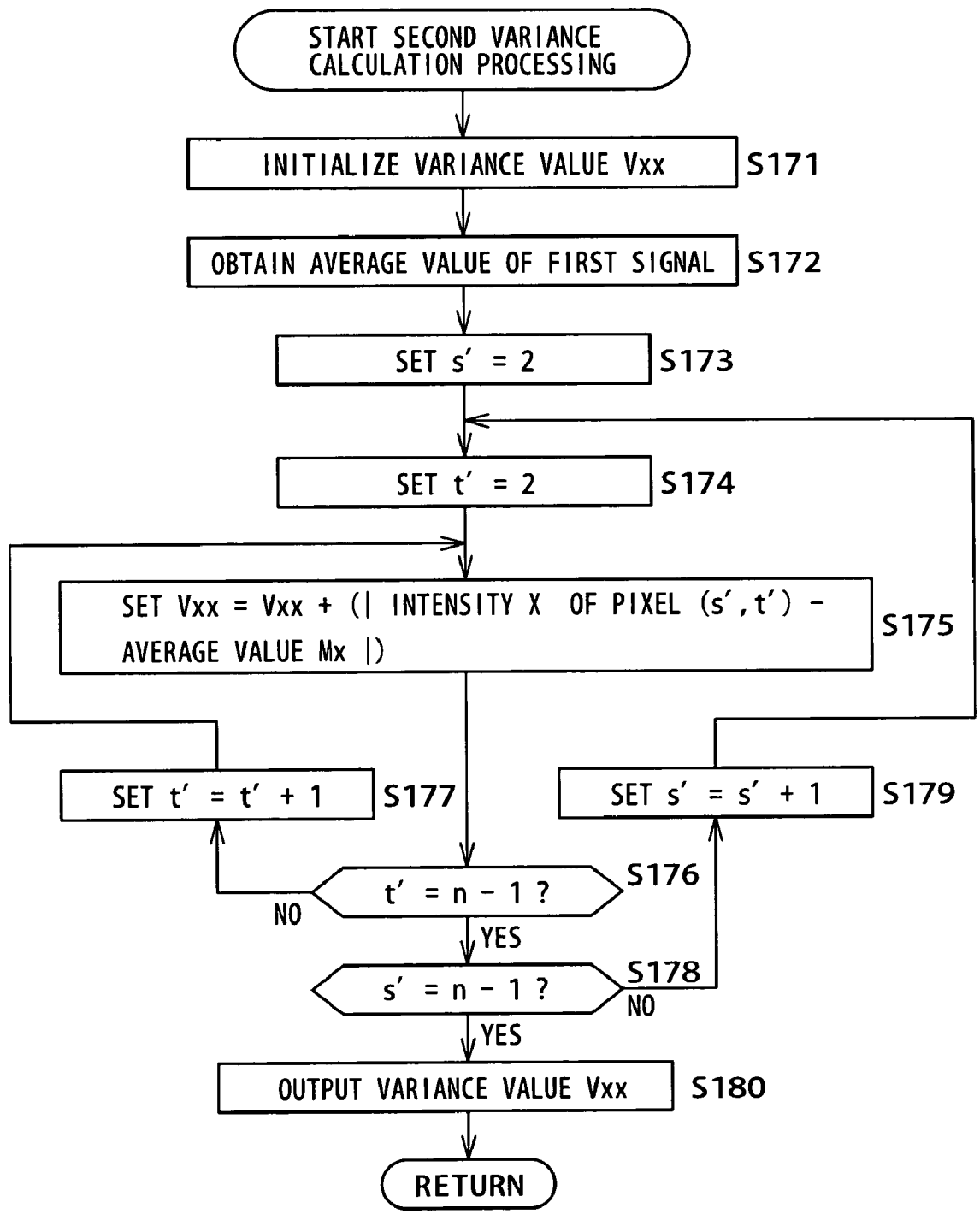
FIG. 36 is a flowchart of assistance in explaining second variance calculation processing.

In steps S171 to S174, the same process as in steps S141 to S144 described with reference to FIG. 35 is performed.

In step S175, the variance calculating unit 362 subtracts the average value $M_{Cr}$ obtained in step S172 from the intensity X of the pixel (s', t'), and then updates the variance value $V_{CrCr}$ with a value obtained by adding the substracted result to the current variance value $V_{CrCr}$. That is, the variance calculating unit 362 calculates $V_{CrCr}=V_{CrCr}+(|$the intensity X of the pixel (s', t')–the average value $M_{Cr}|)$. In this calculation, the variance calculating unit 362 may weight the intensity X of the pixel (s', t') in the same manner as in the calculation of the average value as shown in FIGS. 31 to 34, for example.

When a value |p| is normalized and $0\leq|P|<1$ holds, $p^2$ can be approximated by |p|. This is similar to the approximate operation that can be performed by using Equation (4) or Equation (5) for the operation of the covariance value expressed by Equation (3).

In steps S176 to S180, the same process as in steps S146 to S150 described with reference to FIG. 35 is performed. The processing then returns to step S96 in FIG. 28.

Thus, it is possible to obtain an approximate value of the variance value by the approximate operation for omitting the square calculation required in the operation of the variance value, or by the approximate operation processing as in the case where the approximate operation is performed by using Equation (4) or Equation (5) for the operation of the covariance value expressed by Equation (3).

Covariance calculation processing performed in step S96 in FIG. 28 will next be described with reference to a flowchart of FIG. 37.

In step S201, the covariance calculating unit 364 initializes a covariance value $V_{xy}$ as a value to be outputted. (The covariance value $V_{xy}$ is replaced with $V_{CrCe}$ because the covariance value $V_{xy}$ is the covariance value of the first color Cr and the second color Ce in this case. This description will be omitted in the following.)

In step S202, the covariance calculating unit 364 obtains the average value $M_{Cr}$ of the first signal and an average value $M_{Ce}$ of the second signal. The average value $M_{Cr}$ is calculated in the process of step S92 in FIG. 28 by the average value calculating unit 361. The average value $M_{Ce}$ is calculated in the process of step S94 in FIG. 28 by the average value calculating unit 363.

In step S203, the covariance calculating unit 364 is supplied with the rough interpolated values of a part (an area of (n−2)×(n−2) pixels with the pixel of interest as a center) of the pixels in the local area, and then initializes a value s' of a first register indicating the position of a pixel where the processing is to be performed among the part of the pixels to set s'=2.

In step S204, the covariance calculating unit 364 initializes a value t' of a second register indicating the position of the pixel where the processing is to be performed among the part (the area of the (n−2)×(n−2) pixels with the pixel of interest as the center) of the pixels in the local area to set t'=2.

Figure 39:
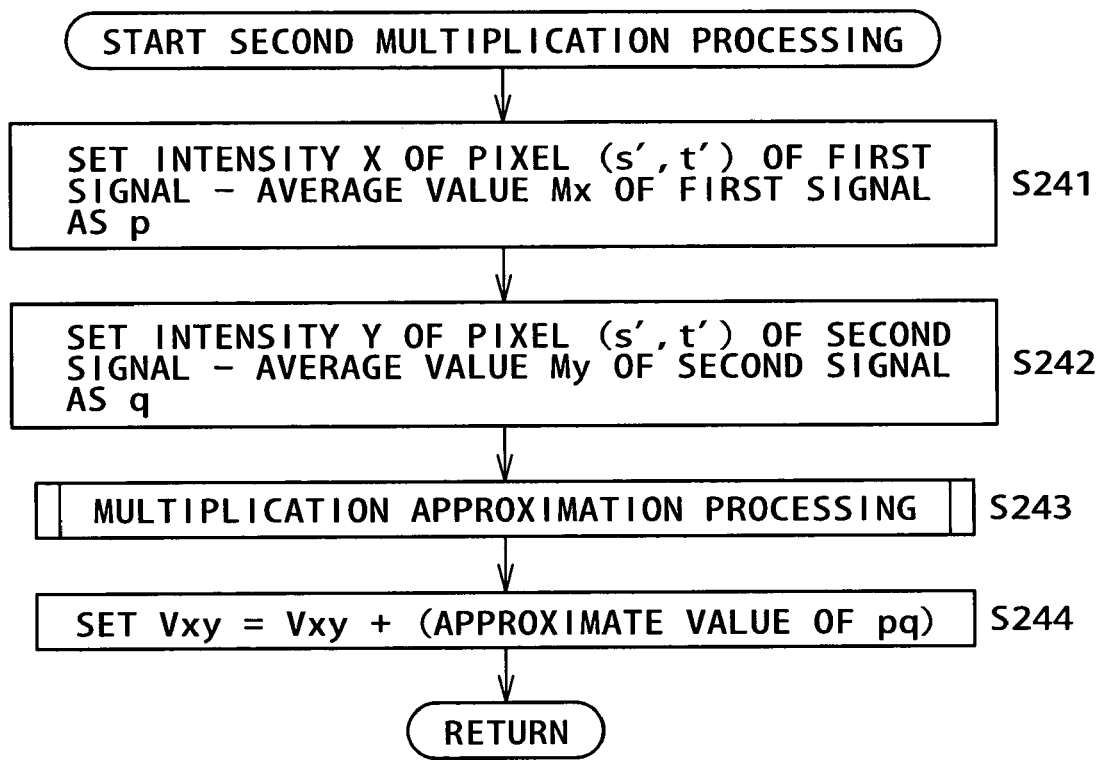
FIG. 39 is a flowchart of assistance in explaining second multiplication processing.
Figure 40:
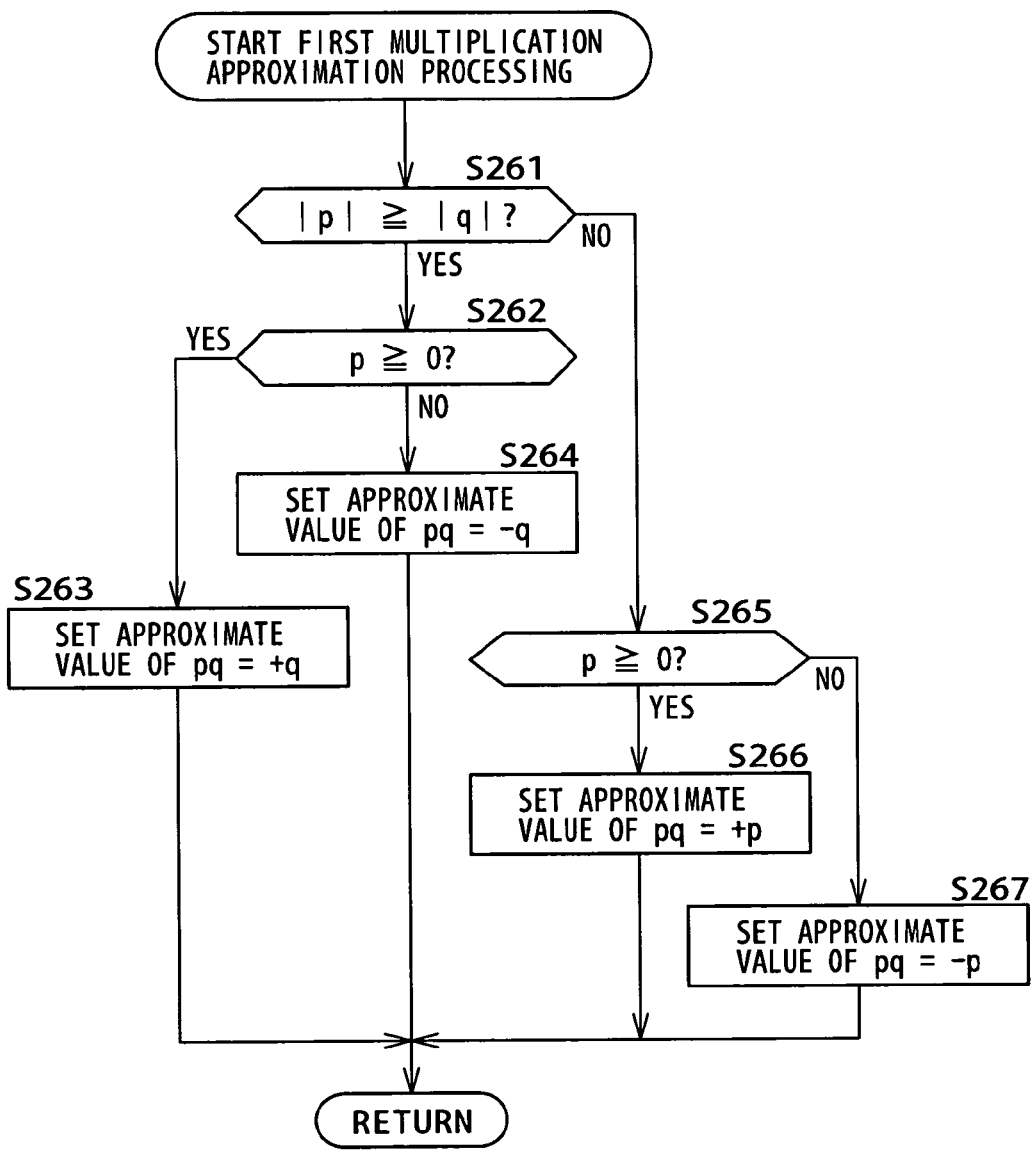
FIG. 40 is a flowchart of assistance in explaining first multiplication approximation processing.

In step S205, multiplication processing to be described later with reference to FIG. 39 or FIG. 40 is performed.

In step S206, the covariance calculating unit 364 refers to the value t' of the second register indicating the position of the pixel where the processing is performed to determine whether t'=n−1.

When the covariance calculating unit 364 determines in step S206 that t'≠n−1, the covariance calculating unit 364 updates the value t' of the second register to t'=t'+1 in step S207. The processing then returns to step S205 to repeat the process from step S205 on down.

When the covariance calculating unit 364 determines in step S206 that t'=n−1, the covariance calculating unit 364 in step S208 refers to the value s' of the first register indicating the position of the pixel where the processing is performed to determine whether s'=n−1.

When the covariance calculating unit 364 determines in step S208 that s'≠n−1, the covariance calculating unit 364 updates the value s' of the first register to s'=s'+1 in step S209. The processing then returns to step S204 to repeat the process from step S204 on down.

When the covariance calculating unit 364 determines in step S208 that s'=n−1, the covariance calculating unit 364 in step S210 outputs the covariance value $V_{CrCe}$, whereby the processing is ended.

The calculation of the covariance value according to its definition requires division of (|the intensity X of the pixel (s', t')–the average value $M_{Cr}|)(|$the intensity y of the pixel (s', t')–the average value $M_{Ce}|)$ by the number of pixels used in the operation of the covariance value. However, the result of calculation of the covariance value is divided by the result of calculation of the variance value by processing to be described later. When division by the same number is also performed in the calculation of the variance value, the division process can be omitted in both the operation of the variance value and the operation of the covariance value.

Incidentally, when weighting is performed in the calculation of the covariance value, as shown in the definition of the covariance value described using Equation (3), the covariance value can be calculated by dividing (|the intensity X of the pixel (s', t')–the average value $M_{Cr}|)(|$the intensity y of the pixel (s', t')–the average value $M_{Ce}|)$ by a sum of weighting factors. However, the result of calculation of the covariance value is divided by the result of calculation of the variance value by processing to be described later. When weighting is also performed in the calculation of the variance value, the process of division by the sum of weighting factors can be omitted in both the operation of the variance value and the operation of the covariance value.

Figure 37:
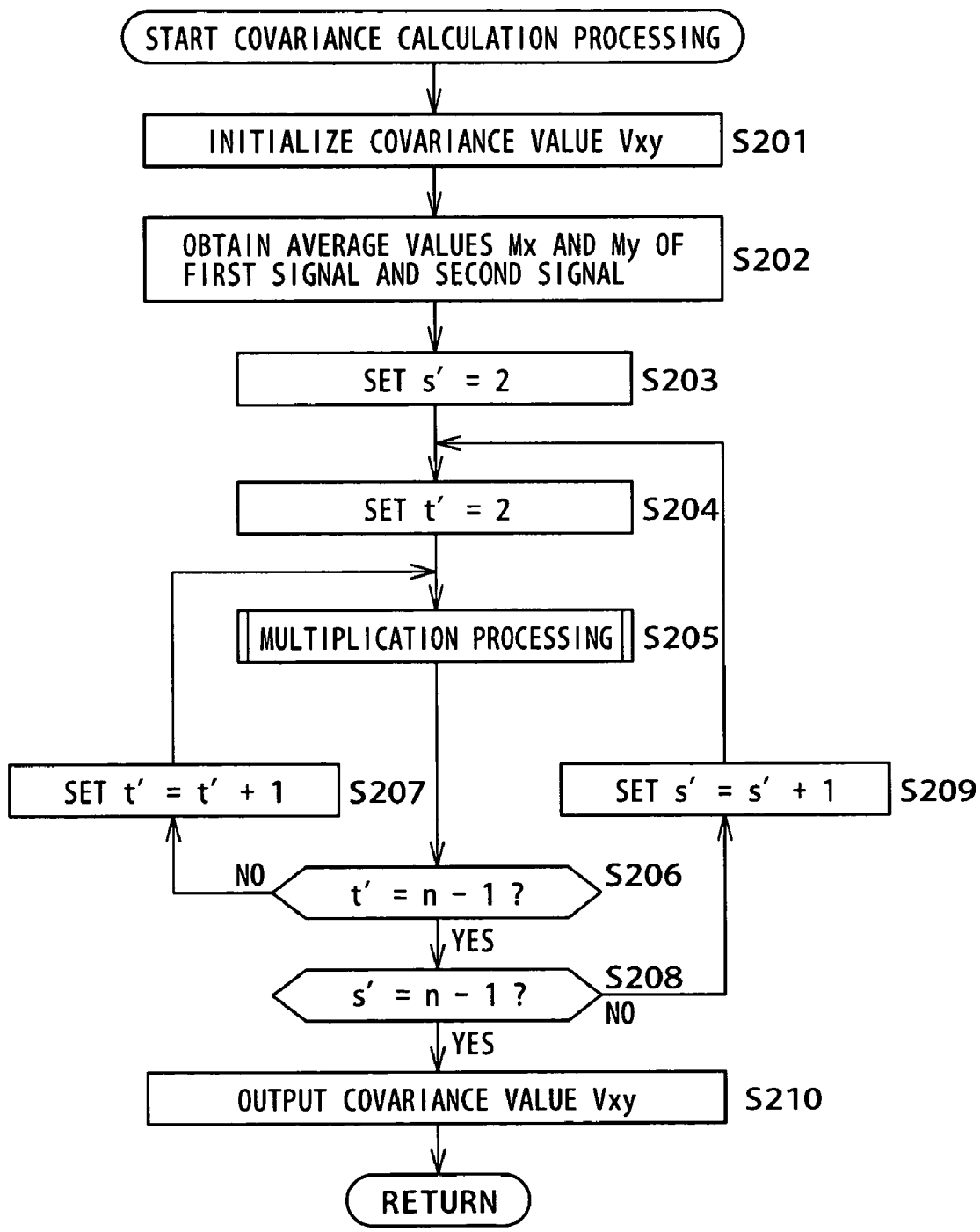
FIG. 37 is a flowchart of assistance in explaining covariance calculation processing.

As the multiplication processing performed in step S205 in the covariance calculation processing of FIG. 37 as described above, there are two types of processing, that is, first multiplication processing performed when the covariance value is calculated according to its definition using the above-described Equation (3), and second multiplication processing performed when the covariance value is calculated using an approximate operation.

Figure 38:
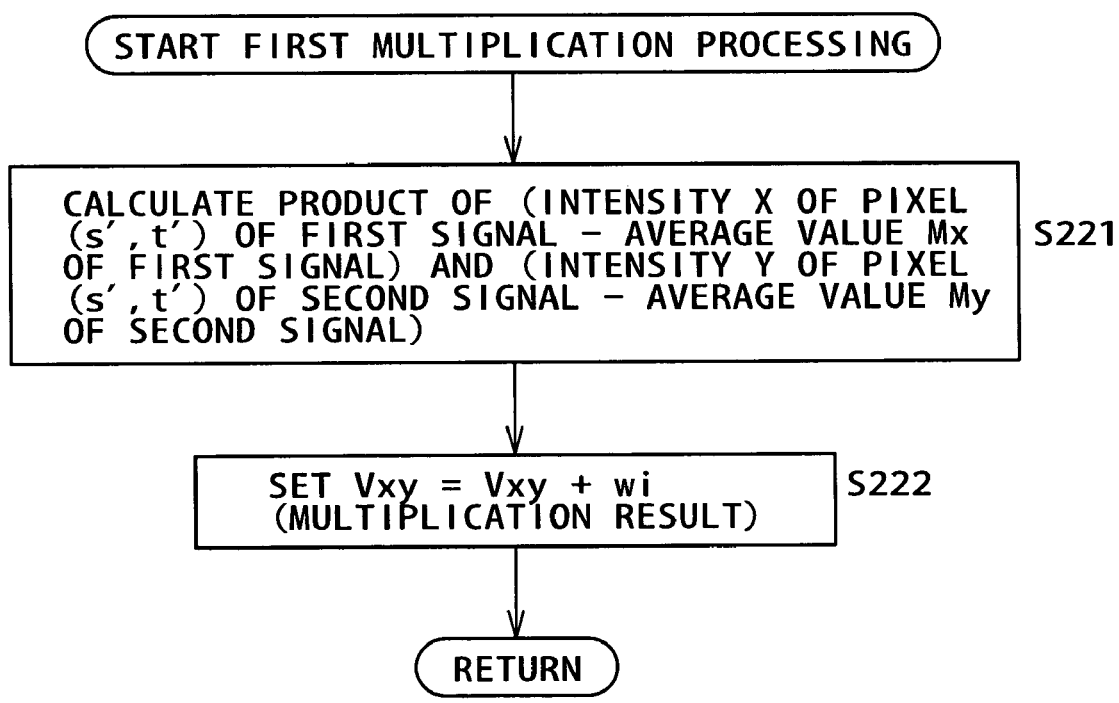
FIG. 38 is a flowchart of assistance in explaining first multiplication processing.

The first multiplication processing performed in step S205 in FIG. 37 will be described with reference to a flowchart of FIG. 38. The first multiplication processing is performed when the covariance value is calculated according to its definition using the above-described Equation (3).

In step S221, the covariance calculating unit 364 calculates a product of (the intensity X of the pixel (s', t') of the first signal−the average value $M_{Cr}$ of the first signal) and (the intensity Y (that is, Ceroughi, description of which will be omitted in the following) of the pixel (s', t') of the second signal−the average value $M_{Ce}$ of the second signal).

In step S222, the covariance calculating unit 364 sets $V_{CrCe}=V_{CrCe}+wi$ (multiplication result). The processing then proceeds to step S206 in FIG. 37. In this case, wi is a weight value at the pixel (s', t').

By performing such multiplication processing, the covariance value is calculated according to its definition using the above-described Equation (3). The first multiplication processing, which is the operation in accordance with the definition, provides a very accurate result of the operation. On the other hand, the operation takes time, and the number of gates in hardware implementation is increased.

The second multiplication processing performed in step S205 in FIG. 37 will be described with reference to a flowchart of FIG. 39. The second multiplication processing is performed when an approximate covariance value is calculated using the above-described Equation (4) or Equation (5).

In step S241, the covariance calculating unit 364 sets {the intensity X of the pixel (s', t') of the first signal−the average value $M_{Cr}$ of the first signal} as p.

In step S242, the covariance calculating unit 364 sets {the intensity Y of the pixel (s', t') of the second signal−the average value $M_{Ce}$ of the second signal} as q.

Figure 41:
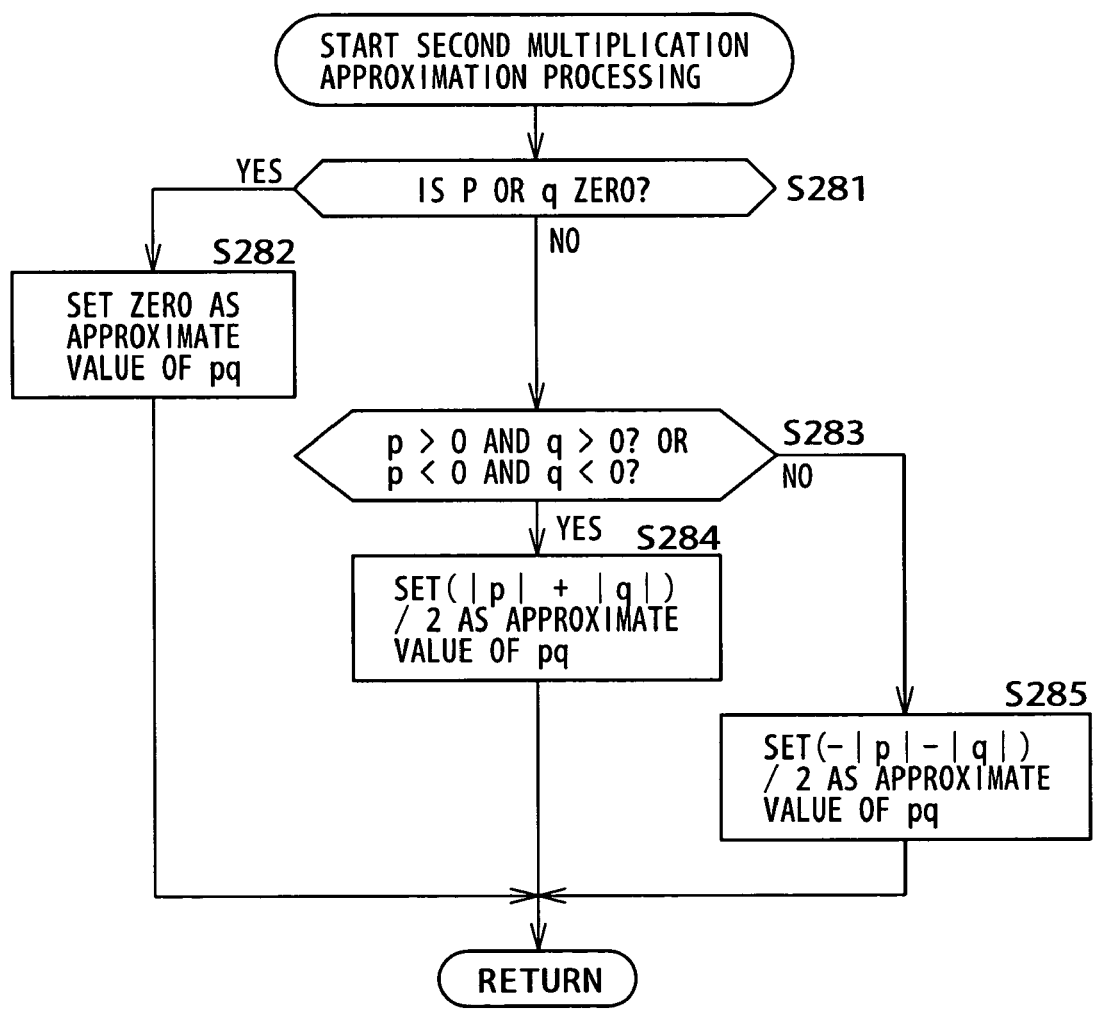
FIG. 41 is a flowchart of assistance in explaining second multiplication approximation processing.

In step S243, multiplication approximation processing to be described later with reference to FIG. 40 or FIG. 41 is performed.

In step S244, the covariance calculating unit 364 sets $V_{CrCe}=V_{CrCe}$+(approximate value of pq). The processing then proceeds to step S206 in FIG. 37.

First multiplication approximation processing performed in step S243 in FIG. 39 will be described with reference to a flowchart of FIG. 40. The first multiplication approximation processing is performed when an approximate covariance value is calculated by using the above-described Equation (4).

In step S261, the covariance calculating unit 364 determines whether $|p|\geq|q|$ using the values p and q substituted in step S241 and step S242 in FIG. 39.

When the covariance calculating unit 364 determines in step S261 that $|p|\geq|q|$, the covariance calculating unit 364 determines in step S262 whether $p\geq 0$.

When the covariance calculating unit 364 determines in step S262 that $p\geq 0$, the covariance calculating unit 364 sets the approximate value of pq=+q in step S263. The processing then returns to step S244 in FIG. 39.

When the covariance calculating unit 364 determines in step S262 that p<0, the covariance calculating unit 364 sets the approximate value of pq=−q in step S264. The processing then returns to step S244 in FIG. 39.

When the covariance calculating unit 364 determines in step S261 that $|p|<|q|$, the covariance calculating unit 364 determines in step S265 whether $q\geq-0$.

When the covariance calculating unit 364 determines in step S265 that $q\geq-0$, the covariance calculating unit 364 sets the approximate value of pq=+p in step S266. The processing then returns to step S244 in FIG. 39.

When the covariance calculating unit 364 determines in step S265 that q<0, the covariance calculating unit 364 sets the approximate value of pq=−p in step S267. The processing then returns to step S244 in FIG. 39.

In this processing, when q or p is zero, the approximate value of pq is always zero. Specifically, when q is zero, $|p|\geq|q|$ always holds, and, hence, the approximate value of pq is zero irrespective of the value of p. When p is zero, $|p|\geq|q|$ never holds, and hence the approximate value of pq is zero irrespective of the value of q.

By the processing described with reference to FIG. 40, it is possible to approximate the covariance value using the above-described Equation (4).

Second multiplication approximation processing performed in step S243 in FIG. 39 will be described with reference to a flowchart of FIG. 41. The second multiplication approximation processing is performed when an approximate covariance value is calculated by using the above-described Equation (5).

In step S281, the covariance calculating unit 364 determines whether p or q is zero using the values p and q substituted in step S241 and step S242 in FIG. 39.

When the covariance calculating unit 364 determines in step S281 that p or q is zero, the covariance calculating unit 364 sets the approximate value of pq to zero in step S282. The processing then returns to step S244 in FIG. 39.

When the covariance calculating unit 364 determines in step S281 that neither p nor q is zero, the covariance calculating unit 364 determines in step S283 whether a relation between p and q is p>0 and q>0 or whether the relation between p and q is p<0 and q<0.

When the covariance calculating unit 364 determines in step S283 that the relation between p and q is p>0 and q>0 or that the relation between p and q is p<0 and q<0, the covariance calculating unit 364 sets $(|p|+|q|)/2$ as the approximate value of pq in step S284. The processing then returns to step S244 in FIG. 39.

When the covariance calculating unit 364 determines in step S283 that the relation between p and q is not p>0 and q>0 or that the relation between p and q is not p<0 and q<0, the covariance calculating unit 364 sets $(-|p|-|q|)/2$ as the approximate value of pq in step S285. The processing then returns to step S244 in FIG. 39.

Incidentally, depending on the types of signals, it can be rare that one of the values p and q substituted in step S241 and step S242 in FIG. 39 assumes a zero value. Accordingly, the process of step S281 and step S282 may be omitted. This can increase operation processing speed and reduce a scale of hardware implementation.

By the processing described with reference to FIG. 41, the covariance value can be approximated using the above-described Equation (5).

By performing the multiplication processing described with reference to FIGS. 39 to 41, the covariance value can be approximated using the above-described Equation (4) or Equation (5). In such cases, there occur advantages of increasing calculation speed and reducing the number of gates of hardware implemented for the calculation, for example, as compared with the case where the operation of the covariance value is performed according to its definition as expressed by Equation (3).

Figure 42:
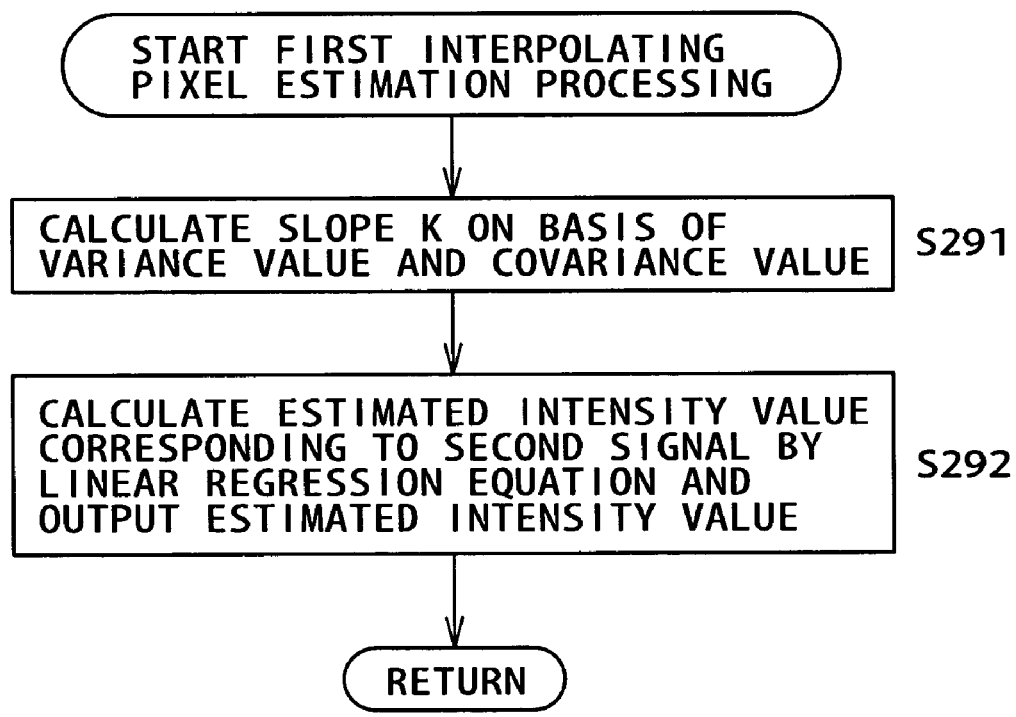
FIG. 42 is a flowchart of assistance in explaining first interpolating pixel estimation processing.

First interpolating pixel estimation processing performed by the regression operation processing unit 343 in FIG. 16 now will be described with reference to a flowchart of FIG. 42.

In step S291, the slope calculating unit 381 calculates a slope K based on the variance value and the covariance value using the above-described Equation (7) or Equation (8).

As shown by the above-described Equation (8), the slope calculating unit 381 performs the process of clipping the denominator of Ks when the slope K is obtained from Ks. The clipping process has effects of noise reduction as in a case where both processes of determining whether the image is flat and suppressing the output amplitude are performed. Thus, by performing this process, it is possible to suppress noticeable noise in a flat portion of an image without addition of a separate noise reduction process.

In step S292, the pixel intensity estimating unit 382 calculates an estimated intensity value at the position of the pixel of interest. The estimated intensity value is calculated using the linear regression equation of the above-described Equation (6) on the basis of the slope K calculated in step S291, the two average values $M_{Cr}$ and $M_{Ce}$, and the pixel intensity of the pixel of interest, whereby the processing is ended.

By such processing, the estimated intensity of each color at the position of the pixel of interest can be calculated. In particular, by multiplying the slope K in the linear regression equation for calculating the estimated intensity by an appropriate constant u greater than unity as in the above-described Equation (11), the high-frequency component can be somewhat boosted to provide the same effects as in the case where appropriate high-frequency correction is made. It is thus possible to obtain an image with corrected high frequencies without addition of a separate high frequency correction process.

Figure 43:
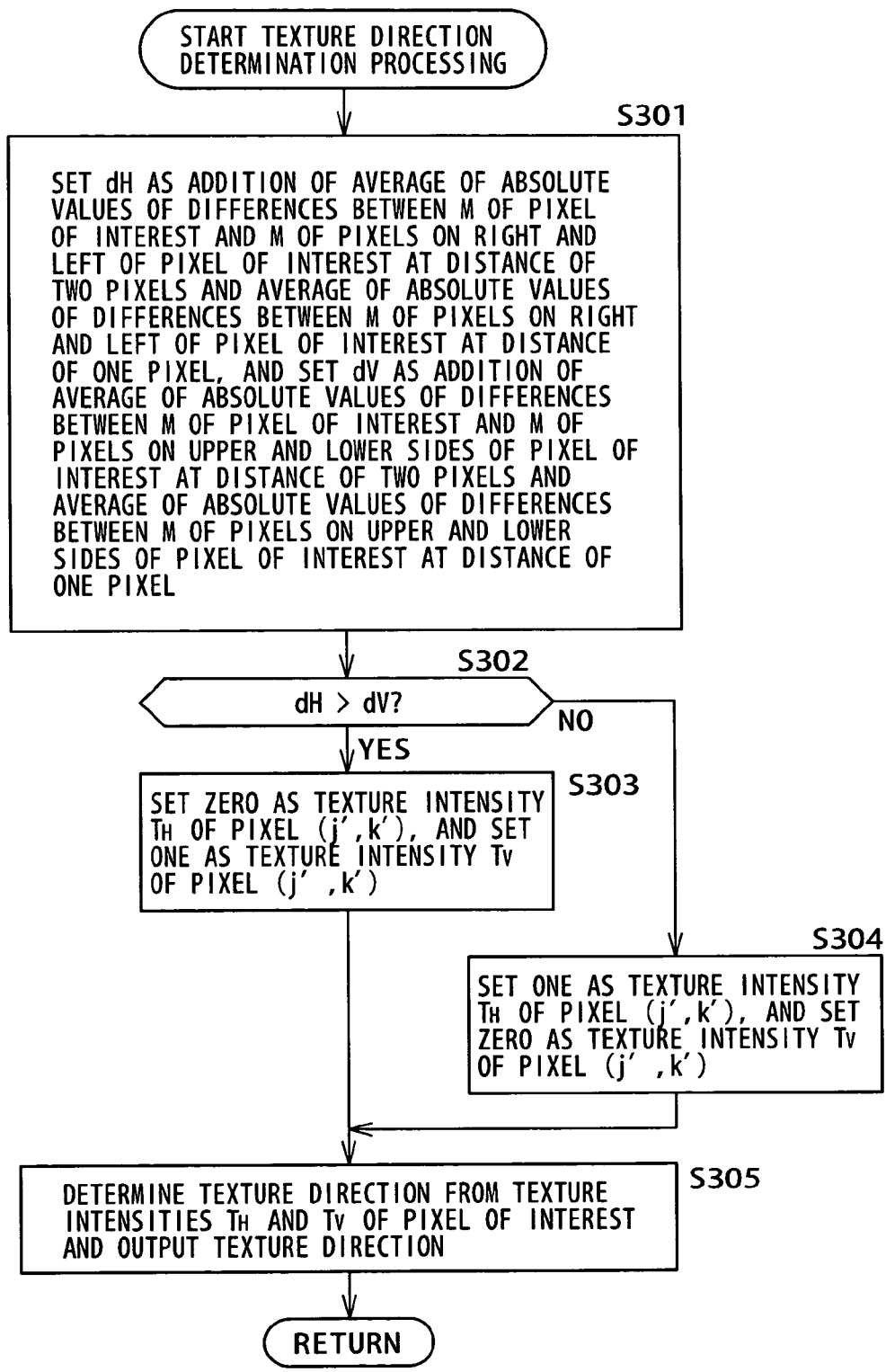
FIG. 43 is a flowchart of assistance in explaining texture direction determination processing.

Texture direction determination processing performed by the texture direction determining unit 305 in FIG. 8 now will be described with reference to a flowchart of FIG. 43.

In step S301, the texture direction determining unit 305 calculates a gradient value dH in a horizontal direction at a pixel of interest (j, k) using the following Equation (16), and calculates a gradient value dV in a vertical direction at the pixel of interest (j, k) using the following Equation (17). Specifically, a texture intensity calculation processing unit 334 calculates dH. dH is an addition of an average of absolute values of differences between a mosaic image signal M of a pixel of interest (j', k') and mosaic image signals M at pixel positions on a right and a left (horizontal direction) of the pixel of interest at a distance of two pixels and an average of absolute values of differences between the mosaic image signals M at pixel positions on the right and the left (horizontal direction) of the pixel of interest at a distance of one pixel. The processing unit 334 calculates dV. dV is an addition of an average of absolute values of differences between the mosaic image signals M of the pixel of interest and mosaic image signals M at pixel positions on an upper side and a lower side (vertical direction) of the pixel of interest at a distance of two pixels and an average of absolute values of differences between the mosaic image signals M at pixel positions on the upper side and the lower side (vertical direction) of the pixel of interest at a distance of one pixel.

$$dH=\{(|M(j'-2, k')-M(j', k')|+|M(j'+2, k')-M(j', k')|)/2 + |M(j'-1, k')-M(j'+1, k')|\}/2$$ [Equation 16]

$$dV=\{(|M(j', k'-2)-M(j', k')|+|M(j', k'+2)-M(j', k')|)/2 + |M(j', k'-1)-M(j', k'+1)|\}/2$$ [Equation 17]

In step S302, the texture direction determining unit 305 determines whether the texture intensity dH>the texture intensity dV. When the texture direction determining unit 305 determines that dH>dV, the texture intensity calculation processing unit 334 in step S303 sets zero as a texture intensity $T_H$ of the pixel of interest (j', k'), and sets one as a texture intensity $T_V$ of the pixel of interest (j', k').

When the texture direction determining unit 305 determines in step S302 that dH≦dV, the texture direction determining unit 305 in step S304 sets one as the texture intensity $T_H$ of the pixel of interest (j', k'), and sets zero as the texture intensity $T_V$ of the pixel of interest (j', k').

After the process of step S303 or step S304, the texture direction determining unit 305 in step S305 determines a texture direction from a set of the texture intensities $T_H$ and $T_V$ of the pixel of interest. Then, the determining unit 305 outputs the texture direction, whereby the processing is ended.

By such processing, a result of determination of whether the texture at the position of the pixel of interest is close to horizontal stripes or vertical stripes is obtained, and then supplied to the switch 324.

Figure 44:
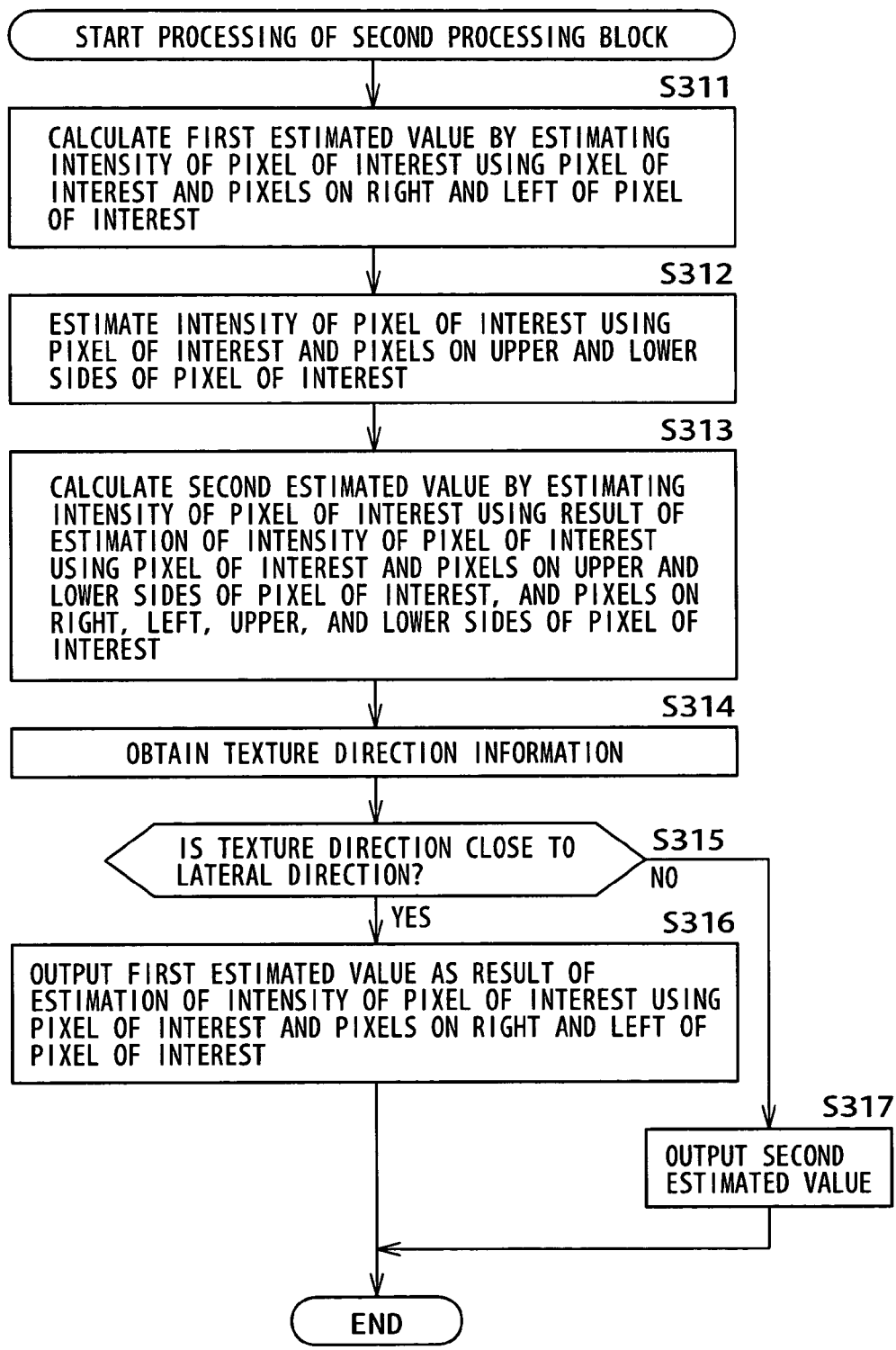
FIG. 44 is a flowchart of assistance in explaining processing of a second processing block.

Processing of the second processing block 303 in FIG. 8 will be described with reference to a flowchart of FIG. 44.

In step S311, the second intensity estimating unit 321 of the second processing block 303 calculates a first estimated value by estimating the intensity of the pixel of interest using the pixel of interest and pixels on a right and a left of the pixel of interest.

In step S312, the third intensity estimating unit 322 of the second processing block 303 estimates the intensity of the pixel of interest using the pixel of interest and pixels on an upper side and a lower side of the pixel of interest.

In step S313, the fourth intensity estimating unit 323 of the second processing block 303 calculates a second estimated value by estimating the intensity of the pixel of interest using a result, which is calculated in step S312, of the estimation of the intensity of the pixel of interest using the pixel of interest and the pixels on the upper and lower sides of the pixel of interest and the pixels on the right, left, upper, and lower sides of the pixel of interest.

In step S314, the switch 324 of the second processing block 303 obtains texture direction information supplied from the texture direction determining unit 305.

In step S315, the switch 324 of the second processing block 303 determines whether the texture direction is close to a horizontal direction.

When the switch 324 of the second processing block 303 determines in step S315 that the texture direction is close to the horizontal direction, the switch 324 of the second processing block 303 in step S316 outputs the first estimated value. The first estimated value is a result of the estimation of the intensity of the pixel of interest using the pixel of interest and the pixels on the right and the left of the pixel of interest, whereby the processing is ended.

When the switch 324 of the second processing block 303 determines in step S315 that the texture direction is not close to the horizontal direction, that is, the texture direction is close to a vertical direction, the switch 324 of the second processing block 303 in step S317 outputs the second estimated value. The second estimated value is a result of the estimation of the intensity of the pixel of interest using the pixels on the right, left, upper, and lower sides of the pixel of interest, whereby the processing is ended.

As a result of such processing, an estimated value of higher reliability corresponding to the texture direction is selected to be supplied to the switch 306.

Figure 45:
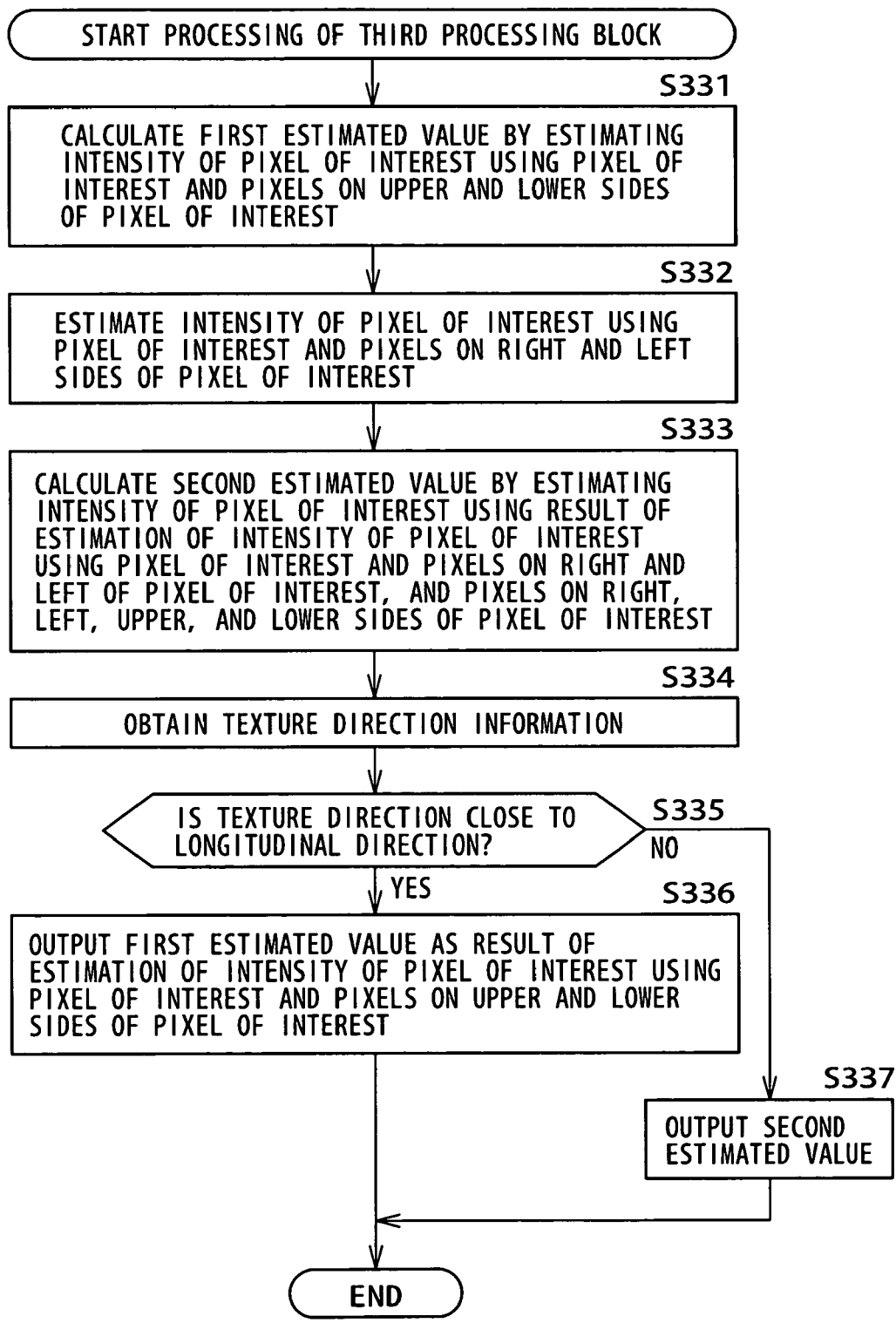
FIG. 45 is a flowchart of assistance in explaining processing of a third processing block.

Processing of the third processing block 304 in FIG. 8 will be described with reference to a flowchart of FIG. 45.

In step S331, the third intensity estimating unit 322 of the third processing block 304 calculates a first estimated value by estimating the intensity of the pixel of interest using the pixel of interest and pixels on an upper side and a lower side of the pixel of interest.

In step S332, the second intensity estimating unit 321 of the third processing block 304 estimates the intensity of the pixel of interest using the pixel of interest and pixels on a right and a left of the pixel of interest.

In step S333, the fourth intensity estimating unit 323 of the third processing block 304 calculates a second estimated value by estimating the intensity of the pixel of interest using a result, which is calculated in step S332, of the estimation of the intensity of the pixel of interest using the pixel of interest and the pixels on the right and the left of the pixel of interest and the pixels on the right, left, upper, and lower sides of the pixel of interest.

In step S334, the switch 324 of the third processing block 304 obtains texture direction information supplied from the texture direction determining unit 305.

In step S335, the switch 324 of the third processing block 304 determines whether the texture direction is close to the vertical direction.

When the switch 324 of the third processing block 304 determines in step S335 that the texture direction is close to the vertical direction, the switch 324 of the third processing block 304 in step S336 outputs the first estimated value. The first estimated value is a result of the estimation of the intensity of the pixel of interest using the pixel of interest and the pixels on the upper side and the lower side of the pixel of interest, whereby the processing is ended.

When the switch 324 of the third processing block 304 determines in step S335 that the texture direction is not close to the vertical direction, that is, the texture direction is close to the horizontal direction, the switch 324 of the third processing block 304 in step S337 outputs the second estimated value. The second estimated value is a result of the estimation of the intensity of the pixel of interest using the pixels on the right, left, upper, and lower sides of the pixel of interest, whereby the processing is ended.

As a result of such processing, an estimated value of higher reliability corresponding to the texture direction is selected to be supplied to the switch 306.

With the configuration of the G+E intensity estimation processing unit 282 described with reference to FIG. 7, the G intensity estimating unit 291 and the E intensity estimating unit 292 separately estimate the G intensity and the E intensity at the position of the pixel of interest, as described with reference to FIG. 8. Further, as described with reference to FIG. 8, the G intensity estimating unit 291 and the E intensity estimating unit 292 have the same configuration. From the operation of the switch 306 shown in FIG. 9 and the configuration of the G intensity estimating unit 291 and the E intensity estimating unit 292 described with reference to FIG. 8, some parts of the configuration can be shared by the G intensity estimating unit 291 and the E intensity estimating unit 292. Specifically, when the color at the position of the pixel of interest is G or E, the output of the switch 306 of the G intensity estimating unit 291 and the E intensity estimating unit 292 is a or b, and when the color at the position of the pixel of interest is R or B, the output of the switch 306 of the G intensity estimating unit 291 and the E intensity estimating unit 292 is c or d. The outputs of the G intensity estimating unit 291 and the E intensity estimating unit 292 are added to each other by an adder. When (a+b) is outputted in the case where the color at the position of the pixel of interest is G or E, and (c+d) is outputted in the case where the color at the position of the pixel of interest is R or B. The G intensity estimating unit 291 and the E intensity estimating unit 292 can share common parts to form a simple configuration.

Figure 46:
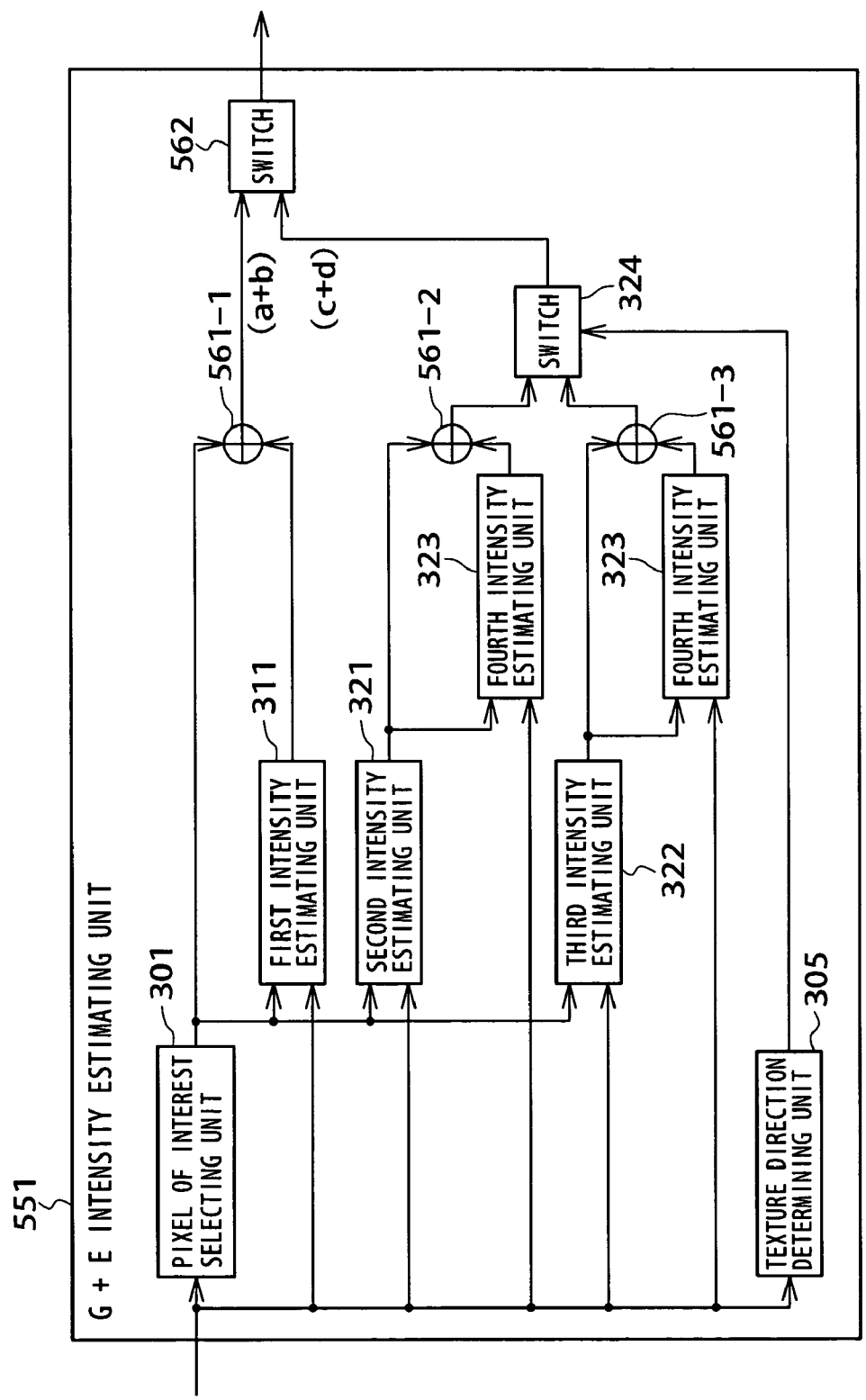
FIG. 46 is a block diagram showing a different configuration of the G+E intensity estimation processing unit.

FIG. 46 is a block diagram showing a thus modified configuration of a G+E intensity estimating unit 551.

A pixel of interest selecting unit 301, a first intensity estimating unit 311, a second intensity estimating unit 321, a third intensity estimating unit 322, fourth intensity estimating units 323, and a switch 324 are of the same configurations as in the configuration of the G intensity estimating unit 291 and the E intensity estimating unit 292 described with reference to FIG. 8.

A pixel of interest selected by the pixel of interest selecting unit 301 and an estimated intensity value estimated by the first intensity estimating unit 311 are subjected to addition processing by an addition processing unit 561-1, and then supplied as an input (a+b) to a switch 562. Two estimated values of higher reliability when the texture direction is close to the horizontal direction as a result of processing of the second intensity estimating unit 321 and the fourth intensity estimating unit 323 are subjected to addition processing by an addition processing unit 561-2. Two estimated values of higher reliability when the texture direction is close to the vertical direction as a result of processing of the third intensity estimating unit 322 and the fourth intensity estimating unit 323 are subjected to addition processing by an addition processing unit 561-3. A sum of the estimated values selected by the switch 324 on the basis of a result of determination of the texture direction by a texture direction determining unit 305 is supplied as an input (c+d) to the switch 562.

The switch 562 operates at this time as shown in FIG. 47. Specifically, when the color of the pixel of interest is R, the output of the switch 562 is (c+d); when the color of the pixel of interest is G, the output of the switch 562 is (a+b); when the color of the pixel of interest is B, the output of the switch 562 is (c+d); and when the color of the pixel of interest is E, the output of the switch 562 is (a+b).

The first intensity estimating unit 311, the second intensity estimating unit 321, the third intensity estimating unit 322, and the fourth intensity estimating units 323 each have there within a rough interpolation processing unit 341, a statistic calculating unit 342, and a regression operation processing unit 343 as described with reference to FIG. 10. Hence, a G+E intensity estimating unit 571 shown in FIG. 48 can be configured by sharing parts for the same processes of the rough interpolation processing units 341, the statistic calculating units 342, and the regression operation processing units 343 in the G+E intensity estimating unit 551 described with reference to FIG. 46. The G+E intensity estimating unit 571 can, of course, perform the same processing as the G+E intensity estimating unit 551.

Specifically, since the first intensity estimating unit 311 and the fourth intensity estimating unit 323 in the G+E intensity estimating unit 551 perform the same statistic calculation, the statistic calculation is performed by one statistic calculating unit as a statistic calculating unit 342-1 in the G+E intensity estimating unit 571. Further, outputs of the second intensity estimating unit 321 and the third intensity estimating unit 322 in the G+E intensity estimating unit 551 are used when the color of the pixel of interest is R or B. A switch 581 in the G+E intensity estimating unit 571 selects interpolated values of the color corresponding to the color of the pixel of interest from rough interpolated values of R and rough interpolated values of B supplied from a rough interpolation processing unit 472. Then, the switch 581 supplies the interpolated values to a statistic calculating unit 342-2 and a statistic calculating unit 342-3.

Figure 49:
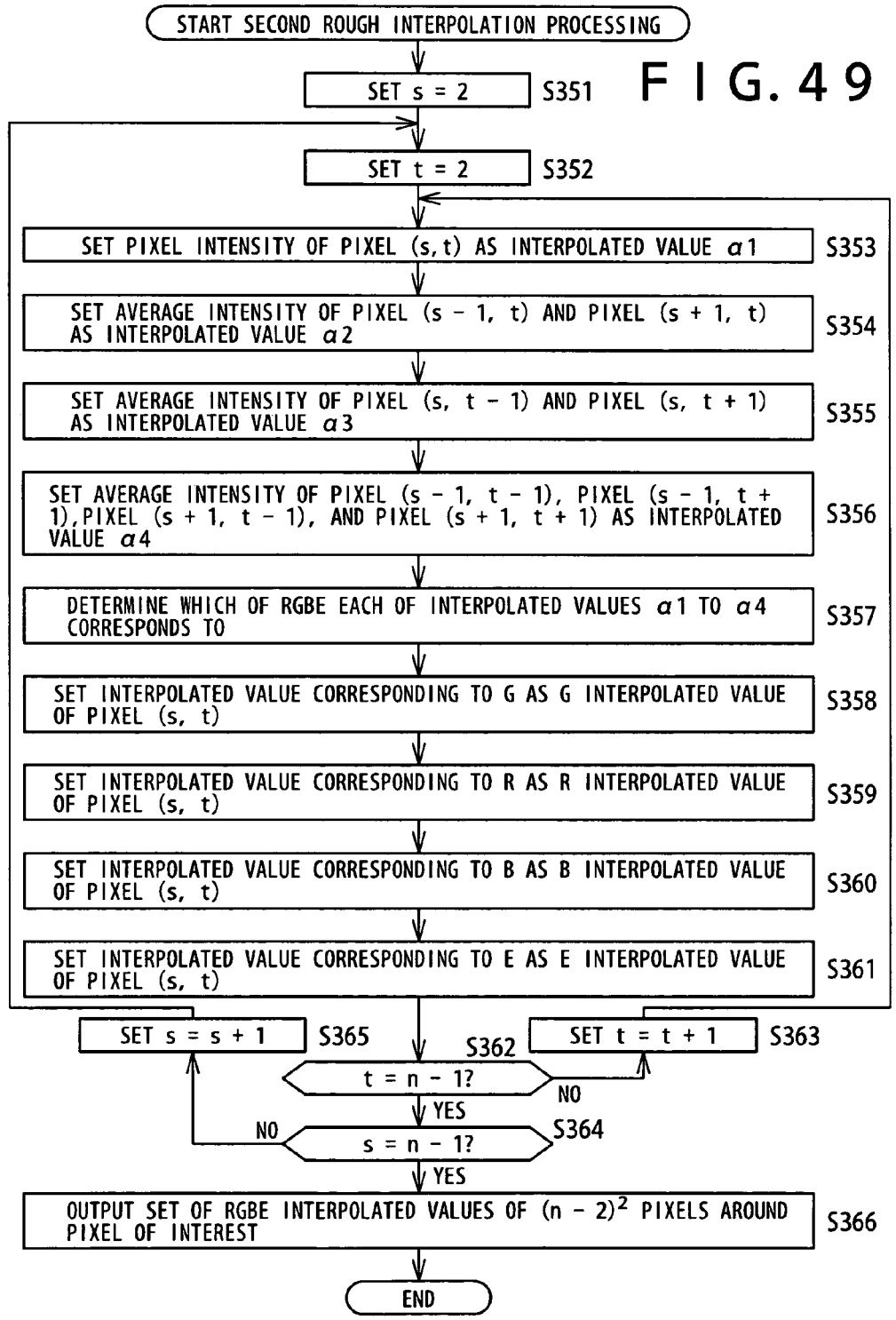
FIG. 49 is a flowchart of assistance in explaining second rough interpolation processing.

The rough interpolation processing unit 472 calculates rough interpolated values of the four colors R, G, B, and E by processing to be described later with reference to a flowchart of FIG. 49. Operation of a switch 562 is the same as described with reference to FIG. 47.

Figure 48:
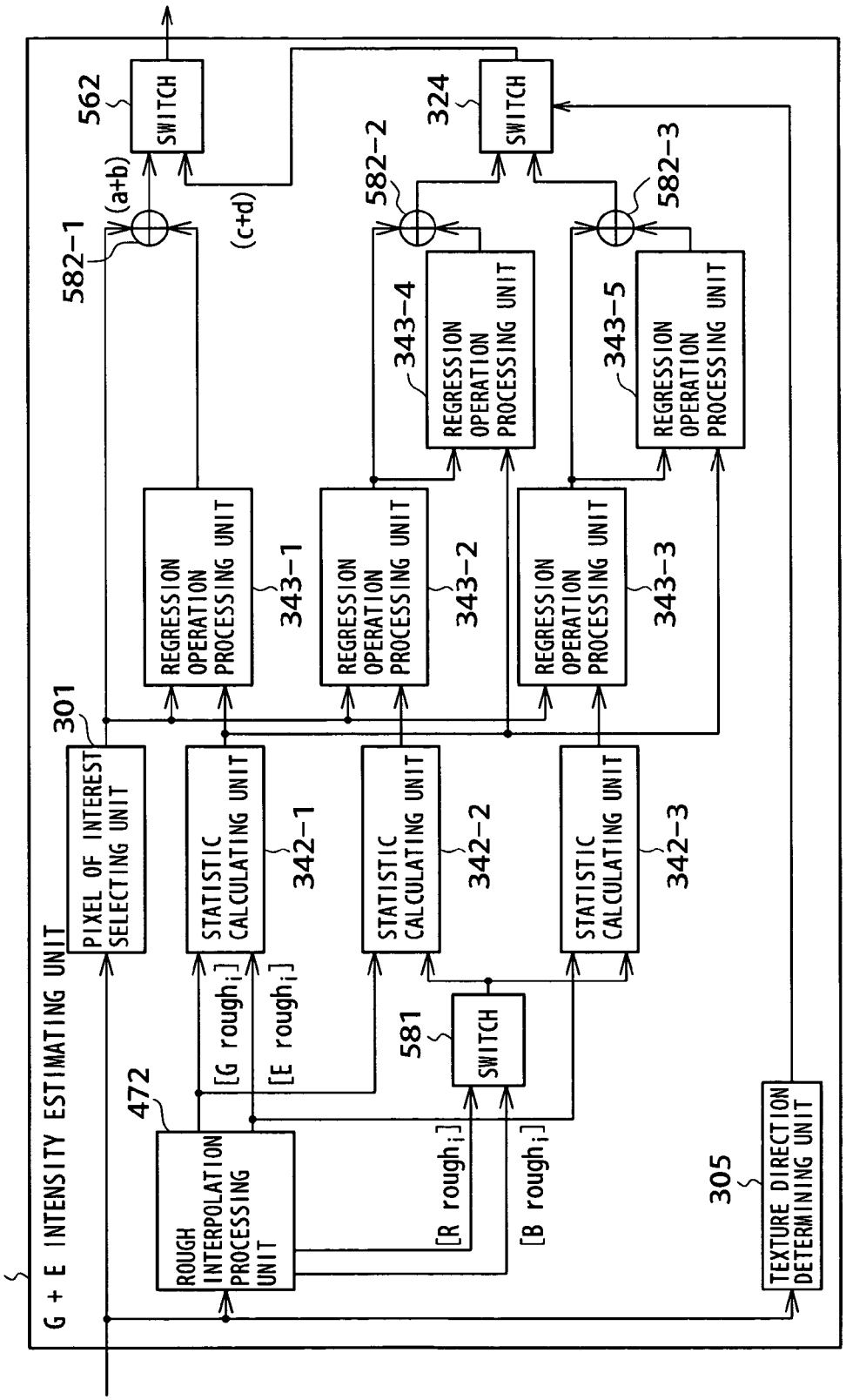
FIG. 48 is a block diagram showing a different configuration of the G+E intensity estimation processing unit.

Next, referring to a flowchart of FIG. 49, description will be made of rough interpolation processing performed by the rough interpolation processing unit 472 in FIG. 48 (this processing is performed in step S371 in FIG. 50 to be described later by the rough interpolation processing unit 472 described with reference to FIG. 17).

In step S351, the rough interpolation processing unit 472 sets s=2 by initializing a value s of a first register indicating the position of a pixel where the processing is to be performed among pixels of a supplied local area. In step S352, the rough interpolation processing unit 341 sets t=2 by initializing a value t of a second register indicating the position of the pixel where the processing is to be performed among the pixels of the supplied local area.

In step S353, the rough interpolation processing unit 472 sets a pixel intensity of the pixel (s, t) as an interpolated value α1.

In step S354, the rough interpolation processing unit 472 sets an average intensity of a pixel (s−1, t) adjacent to the pixel (s, t) and a pixel (s+1, t) adjacent to the pixel (s, t) in a direction opposite from the pixel (s−1, t) as an interpolated value α2.

In step S355, the rough interpolation processing unit 472 sets an average intensity of a pixel (s, t−1) adjacent to the pixel (s, t) in a direction perpendicular to the direction of the pixel (s−1, t) and the pixel (s+1, t), and a pixel (s, t+1) adjacent to the pixel (s, t) in a direction opposite from the pixel (s, t−1) as an interpolated value α3.

For example, when the pixel (s, t) is a pixel (2, 2) in FIG. 8, the pixel indicates G intensity, the pixel (s−1, t) and the pixel (s+1, t) indicate R intensity, and the pixel (s, t−1) and the pixel (s, t+1) indicate B intensity.

In step S356, the rough interpolation processing unit 472 sets, as interpolated value α4, an average intensity of a pixel (s−1, t−1), a pixel (s−1, t+1), a pixel (s+1, t−1), and a pixel (s+1, t+1) in an oblique direction of an upper right, an oblique direction of a lower right, an oblique direction of an upper left, and an oblique direction of a lower left with respect to the pixel of interest.

For example, when the pixel (s, t) is the pixel (2, 2) in FIG. 8, the pixel indicates G intensity, and each of the pixel (s−1, t−1), the pixel (s−1, t+1), the pixel (s+1, t−1), and the pixel (s+1, t+1) also indicates G intensity. When the pixel (s, t) is a pixel (2, 3) in FIG. 8, the pixel indicates B intensity, and each of the pixel (s−1, t−1), the pixel (s−1, t+1), the pixel (s+1, t−1), and the pixel (s+1, t+1) indicates R intensity. When the pixel (s, t) is a pixel (3, 2) in FIG. 8, the pixel indicates R intensity, and each of the pixel (s−1, t−1), the pixel (s−1, t+1), the pixel (s+1, t−1), and the pixel (s+1, t+1) indicates B intensity.

In step S357, the rough interpolation processing unit 472 determines which of RGBE each of the interpolated values α1 to α4 calculated by the processes of steps S353 to S356 corresponds to.

In the case of the color filter arrangement as described with reference to FIG. 3, when the pixel (s, t) is a G pixel, the interpolated value α1 corresponds to G, the interpolated value α2 corresponds to B, the interpolated value α3 corresponds to R, and the interpolated value α4 corresponds to E. When the pixel (s, t) is an R pixel, the interpolated value α1 corresponds to R, the interpolated value α2 corresponds to E, the interpolated value α3 corresponds to G, and the interpolated value α4 corresponds to B. When the pixel (s, t) is a B pixel, the interpolated value al corresponds to B, the interpolated value α2 corresponds to G, the interpolated value α3 corresponds to E, and the interpolated value α4 corresponds to R. When the pixel (s, t) is an E pixel, the interpolated value α1 corresponds to E, the interpolated value α2 corresponds to R, the interpolated value α3 corresponds to B, and the interpolated value α4 corresponds to G.

In step S358, the rough interpolation processing unit 472 sets an average value of the two interpolated values corresponding to G as a G interpolated value of the pixel (s, t).

In step S359, the rough interpolation processing unit 472 sets the interpolated value corresponding to R as an R interpolated value of the pixel (s, t).

In step S360, the rough interpolation processing unit 472 sets the interpolated value corresponding to B as a B interpolated value of the pixel (s, t).

In step S361, the rough interpolation processing unit 472 sets the interpolated value corresponding to E as an E interpolated value of the pixel (s, t).

In step S362, the rough interpolation processing unit 472 refers to the value t of the second register indicating the position of the pixel where the processing is performed to determine whether t=n−1.

When the rough interpolation processing unit 472 determines in step S362 that t≠n−1, the rough interpolation processing unit 472 sets the value t of the second register indicating the position of the pixel where the processing is performed to t=t+1 in step S363. The processing then returns to step S353 to repeat the process from step S353 on down.

In step S364, the rough interpolation processing unit 472 refers to the value s of the first register indicating the position of the pixel where the processing is performed to determine whether s=n−1.

When the rough interpolation processing unit 472 determines in step S364 that s≠n−1, the rough interpolation processing unit 472 sets the value s of the first register indicating the position of the pixel where the processing is performed to s=s+1 in step S365. The processing then returns to step S352 to repeat the process from step S352 on down.

When the rough interpolation processing unit 472 determines in step S364 that s=n−1, the rough interpolation processing unit 472 in step S366 outputs a set of the RGBE interpolated values of the $(n-2)^2$ pixels around the pixel of interest, whereby the processing is ended.

By such processing, the RGBE interpolated values at each of the (n−2)×(n−2) pixel positions with the pixel of interest as a center in n×n pixels extracted as the local area are calculated.

In the rough interpolation processing described with reference to FIG. 49, the processes of steps S353 to S356 may be interchanged with each other, and the processes of steps S358 to S361 may be interchanged with each other.

Even when the G+E intensity estimation processing unit 282 in FIG. 6 is replaced with the G+E intensity estimating unit 551 described with reference to FIG. 46 and the G+E intensity estimating unit 571, the R (G, B, and E) intensity estimating unit 283 (or the RGBE intensity estimating unit 283) in the subsequent stage performs the same processing.

Next, referring to a flowchart of FIG. 50, description will be made of first color intensity estimation processing performed in step S24 in FIG. 24 by the RGBE intensity estimating unit 283 described with reference to FIG. 17.

In step S371, the rough interpolation processing unit 472 performs the second rough interpolation processing described with reference to FIG. 49.

In step S372, the reliability calculating unit 471 obtains the G+E intensity calculated by the G+E intensity estimation processing unit 282.

Figure 51:
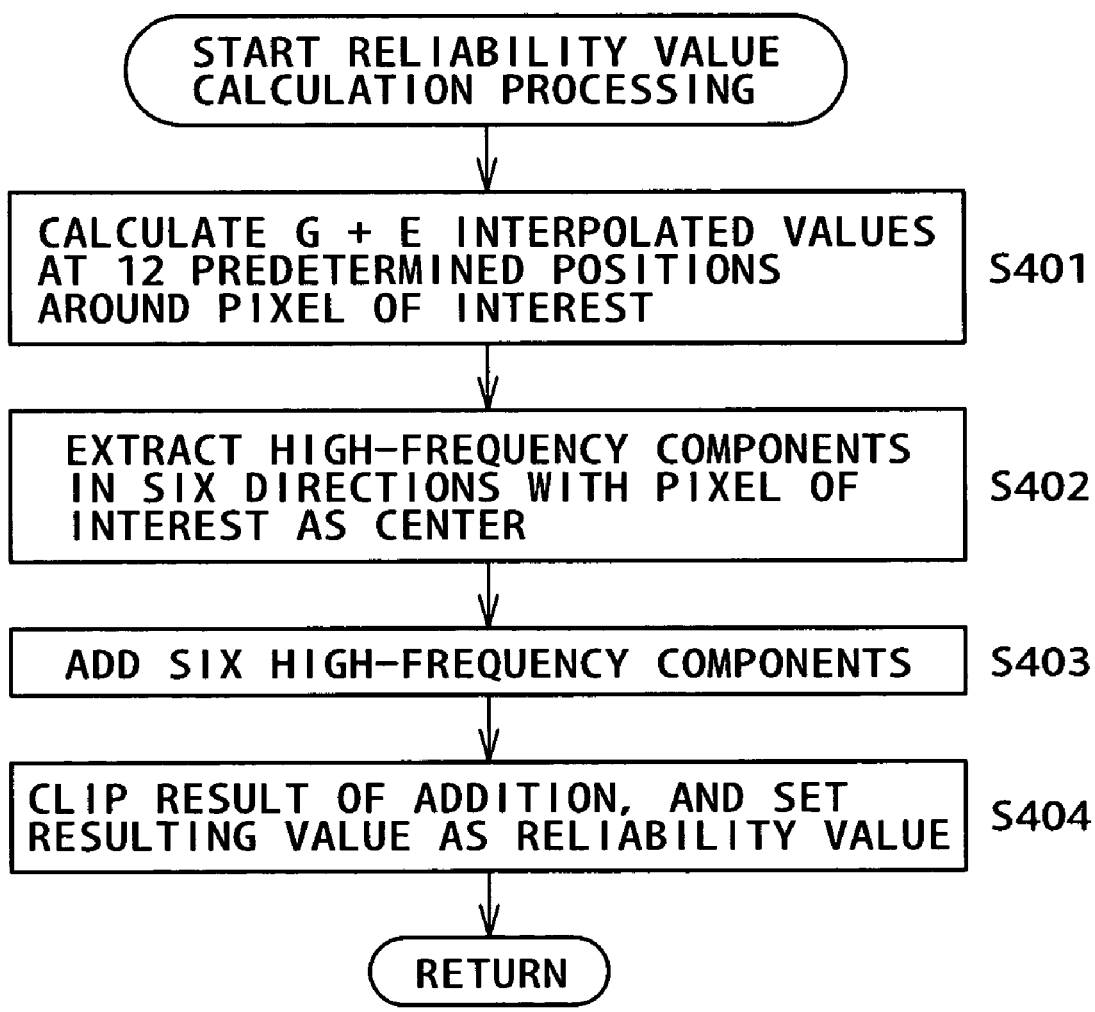
FIG. 51 is a flowchart of assistance in explaining reliability calculation processing.

In step S373, the reliability calculating unit 471 performs reliability calculation processing to be described later with reference to a flowchart of FIG. 51.

In step S374, the statistic calculating units 342-1 to 342-4 perform the processing for calculating statistics of a two-color distribution shape as described with reference to FIG. 28.

Figure 52:
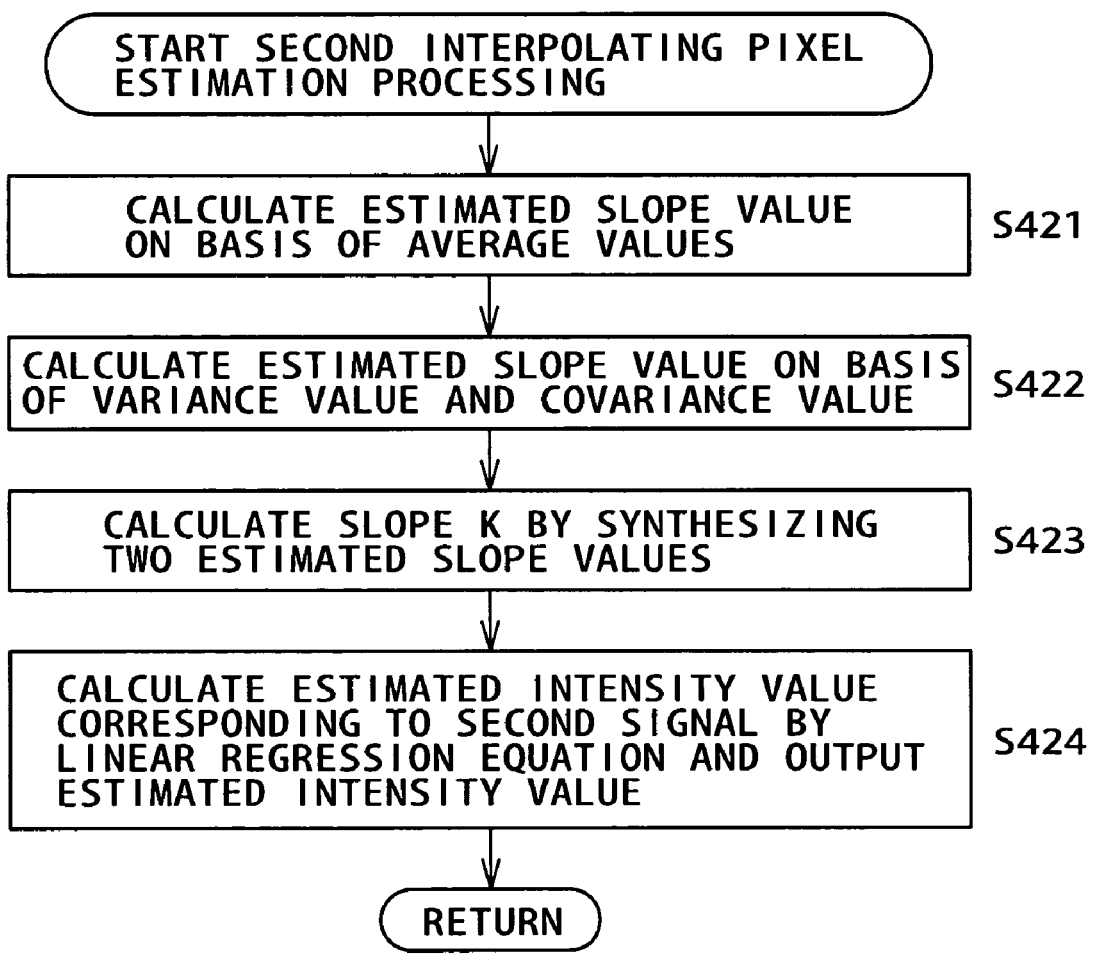
FIG. 52 is a flowchart of assistance in explaining second interpolating pixel estimation processing.

In step S375, the regression operation processing units 474-1 to 474-4 perform second interpolating pixel estimation processing to be described with reference to FIG. 52. The processing then proceeds to step S25 in FIG. 24.

The reliability calculation processing performed in step S373 in FIG. 50 will be described with reference to a flowchart of FIG. 51.

In step S401, the high-frequency extracting units 481-1 to 481-6 in the reliability calculating unit 471 calculate G+E interpolated values at pixel positions necessary to obtain high frequencies to be extracted by the high-frequency extracting units 481-1 to 481-6; that is, average values of pixel values of G and E obliquely adjacent to each other among the G+E interpolated values at the predetermined 12 positions in the vicinity of the pixel of interest as described with reference to FIG. 19.

In step S402, the high-frequency extracting units 481-1 to 481-6 respectively extract high-frequency components in the six directions with the pixel of interest as a center on the basis of the G+E interpolated values calculated in the process of step S401, and then supply the high-frequency components to the addition processing unit 482.

In step S403, the addition processing unit 482 adds together the six high-frequency components supplied from the high-frequency extracting units 481-1 to 481-6, and then outputs a result of the addition to the clip processing unit 483.

In step S404, the clip processing unit 483 clips the result of the addition supplied from the addition processing unit 482, and then outputs a resulting value as a reliability value to the regression operation processing units 474-1 to 474-4. The processing then proceeds to step S374 in FIG. 50.

By such processing, the reliability value indicating whether high-frequency components are present in the vicinity of the pixel of interest is calculated, and outputted to the regression operation processing units 474-1 to 474-4. The calculated reliability value becomes larger as intensity of a texture in the form of a fine stripe pattern is increased. Hence, the smaller the reliability value, the stronger the possibility that the estimation of the shape of color distribution on the basis of statistics is accurate.

Second interpolating pixel estimation processing performed in step S375 in FIG. 50 now will be described with reference to a flowchart of FIG. 52.

In step S421, the slope calculating unit 501 calculates an estimated slope value Km on the basis of average values using the above-described Equation (7), and then outputs the estimated slope value Km to the slope synthesizing unit 503.

In step S422, the slope calculating unit 502 calculates an estimated slope value Ks on the basis of a variance value and a covariance value using the above-described Equation (8), and then outputs the estimated slope value Ks to the slope synthesizing unit 503.

As shown by the above-described Equation (8), the slope calculating unit 502 performs the process of clipping the denominator of the slope Ks. The clipping process has effects of noise reduction as in a case where both processes of determining whether the image is flat and suppressing the output amplitude are performed. Thus, by performing this process, it is possible to suppress noticeable noise in a flat portion of an image without addition of a separate noise reduction process.

In step S423, the slope synthesizing unit 503 synthesizes the estimated slope value Ks calculated in step S422 with the estimated slope value Km calculated in step S421 on the basis of reliability h using the above-described Equation (9), thereby calculates an estimated slope value K, and then outputs the estimated slope value K to the pixel intensity estimating unit 504.

In step S424, the pixel intensity estimating unit 504 calculates an R intensity (B intensity) estimated value at the position of the pixel of interest. The R intensity estimated value is calculated using the linear regression equation of the above-described Equation (10) or Equation (11) on the basis of the estimated slope value K calculated in step S423, the two average values $M_G$ and $M_R$ (or $M_B$), and G intensity at the position of the pixel of interest, whereby the processing is ended.

By such processing, the estimated intensity of each color at the position of the pixel of interest can be calculated. In particular, by multiplying the slope K in the linear regression equation for calculating the estimated intensity by an appropriate constant u greater than unity using the above-described Equation (11), the high-frequency component can be somewhat boosted to provide the same effects as in the case where appropriate high-frequency correction for R is made. Thus it is possible to obtain an image with corrected high frequencies without addition of a separate high frequency correction process.

Figure 53:
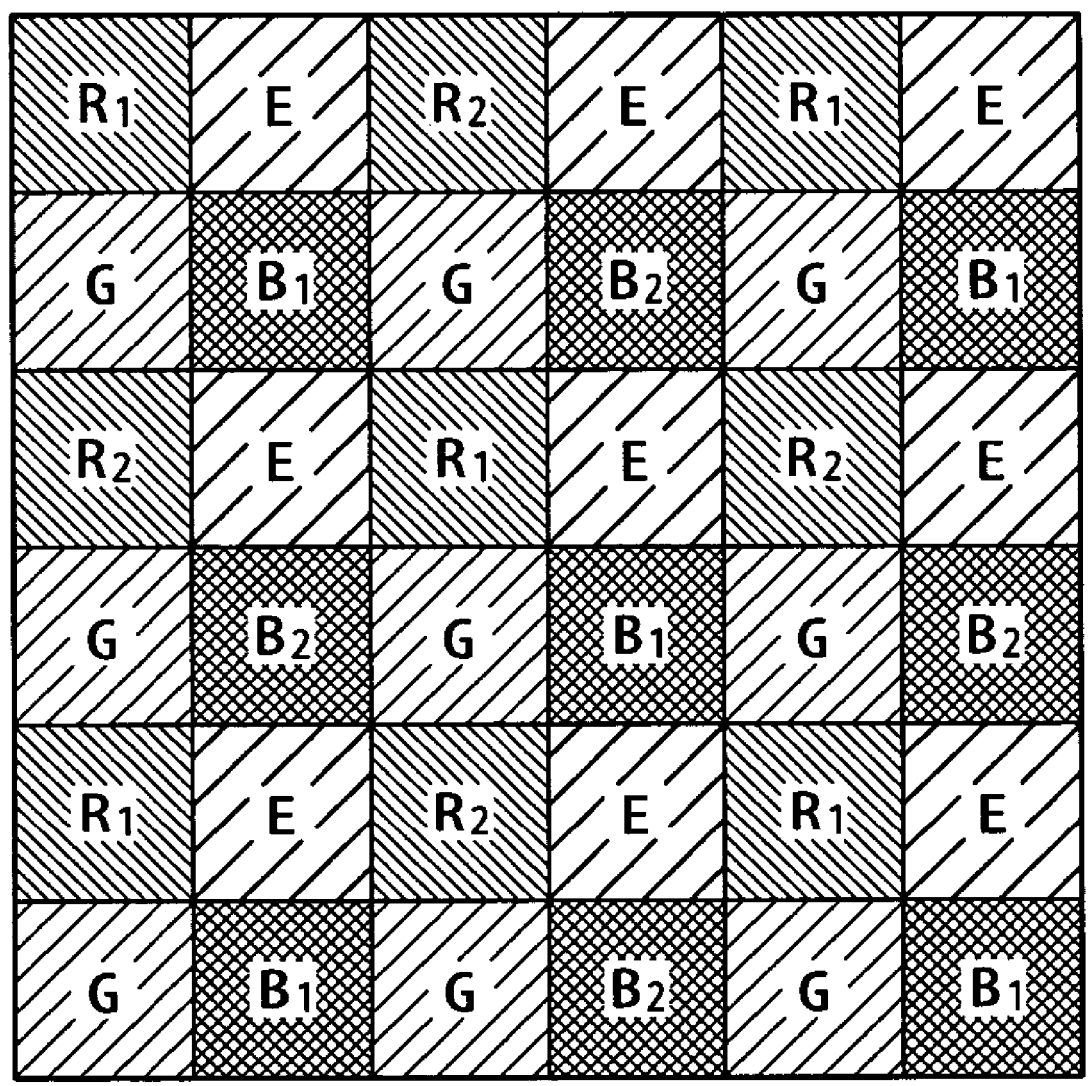
FIG. 53 is a diagram of assistance in explaining a different example of color filters used in the CCD image sensor in FIG. 2.

The above-described processing is applicable to a case where the mosaic pattern used for color filters is a six-color arrangement as shown in FIG. 53. The six-color arrangement as shown in FIG. 53 is obtained by replacing half of the R and B pixels of the four-color arrangement in FIG. 3 with pixels having spectral characteristics slightly different from R and B (in other words, spectral characteristics of R1 and R2 and spectral characteristics of B1 and B2 have a high correlation with each other). That is, color filters shown in FIG. 53 are formed such that G and E used for estimation of luminance values are arranged in a checkered manner such that G and E are not positioned on the same lines in a horizontal direction and a vertical direction, colors R1 and R2 different from G and E are positioned on the same lines as E (that is, lines different from G), and colors B1 and B2 different from G, E, R1, and R2 are positioned on the same lines as G (that is, lines different from E).

Since the arrangement of G and E in this six-color arrangement is the same as in the four-color arrangement of FIG. 3, it is obvious that the method of calculating a luminance component using an estimated value of G+E intensity is applicable to the six-color arrangement as it is. Also, while both R and B are divided into two colors having spectral characteristics close to each other in the six-color arrangement shown in FIG. 53, it is needless to say that the present invention is applicable without any change to a five-color arrangement in which only one of R and B is divided. By using color filters having such a six-color arrangement, it is possible to obtain an image signal more advantageous in terms of color reproduction by multi-spectral image pickup. Furthermore, since demosaic processing interpolates G+E at all pixels using G and E having a high correlation with each other, it is possible to accurately calculate even a high-frequency component of luminance.

In the processing of the demosaic processing unit 253 described with reference to FIGS. 6 to 53, the G+E intensity estimating unit 282, the G+E intensity estimating unit 551, or the G+E intensity estimating unit 571 estimates G+E intensities in a mosaic image obtained using the color filters of the four colors described with reference to FIG. 3 or the color filters of the six colors shown in FIG. 53, and images of the four colors of R, G, B, and E are obtained on the basis of the G+E intensities. When color filters having a color arranged in a checkered manner are used, on the other hand, a luminance value of a pixel of interest may be estimated using information of the color arranged in the checkered manner in place of G+E intensity so that images of the four colors of R, G, B, and E are obtained on the basis of the luminance value.

Figure 54:
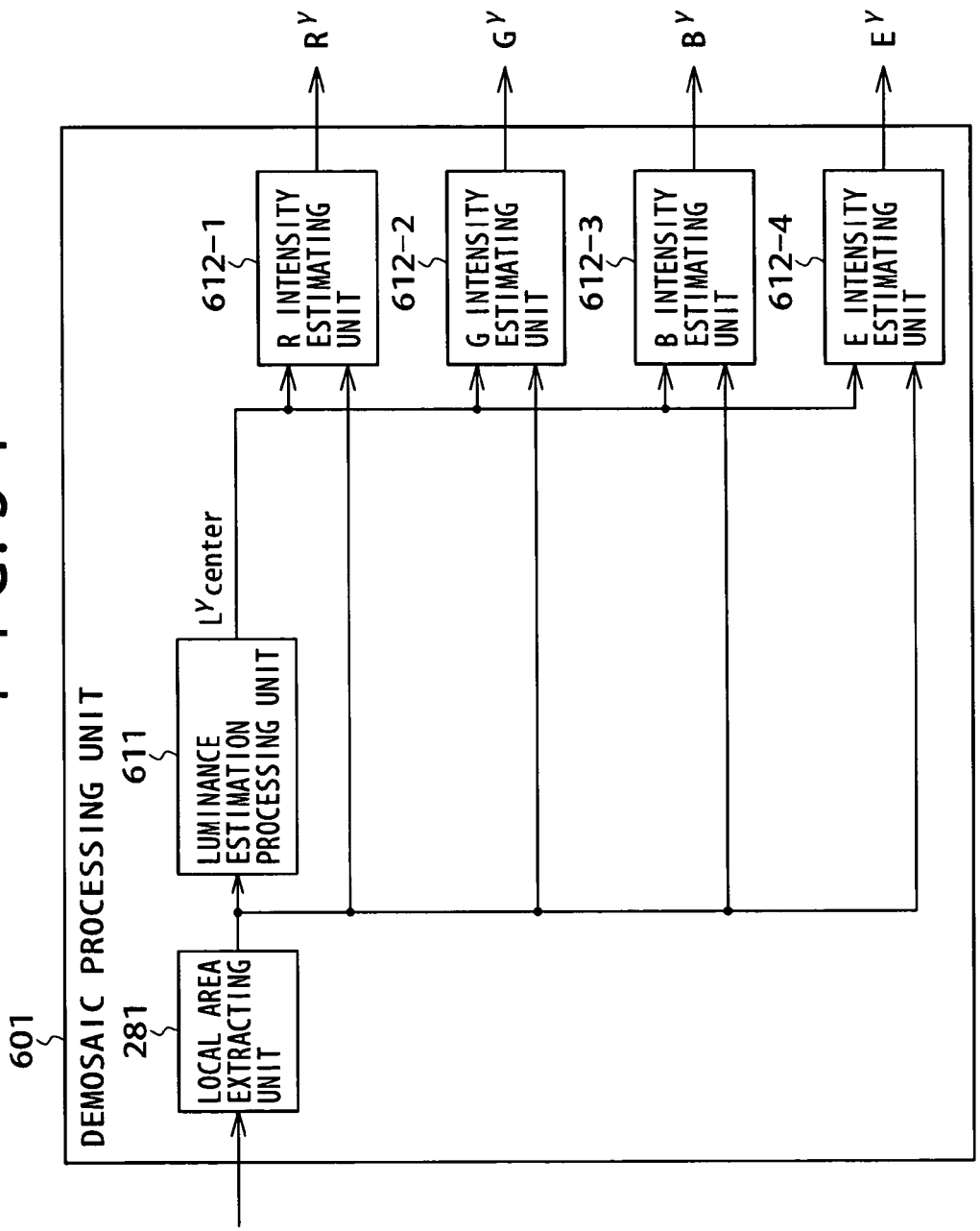
FIG. 54 is a block diagram showing a different example of configuration of the demosaic processing unit in FIG. 5.

When a luminance value of a pixel of interest is estimated in place of G+E intensity, a demosaic processing unit 601 shown in FIG. 54 is used in place of the demosaic processing unit 253 in the DSP block 216 described with reference to FIG. 5.

The demosaic processing unit 601 in FIG. 54 has the same configuration as the demosaic processing unit 253 described with reference to FIG. 6, except that a luminance estimation processing unit 611 is provided in place of the G+E intensity estimating unit 282 and an R intensity estimating unit 612-1 to an E intensity estimating unit 612-4 are provided in place of the R intensity estimating unit 283-1 to the E intensity estimating unit 283-4.

Figure 55:
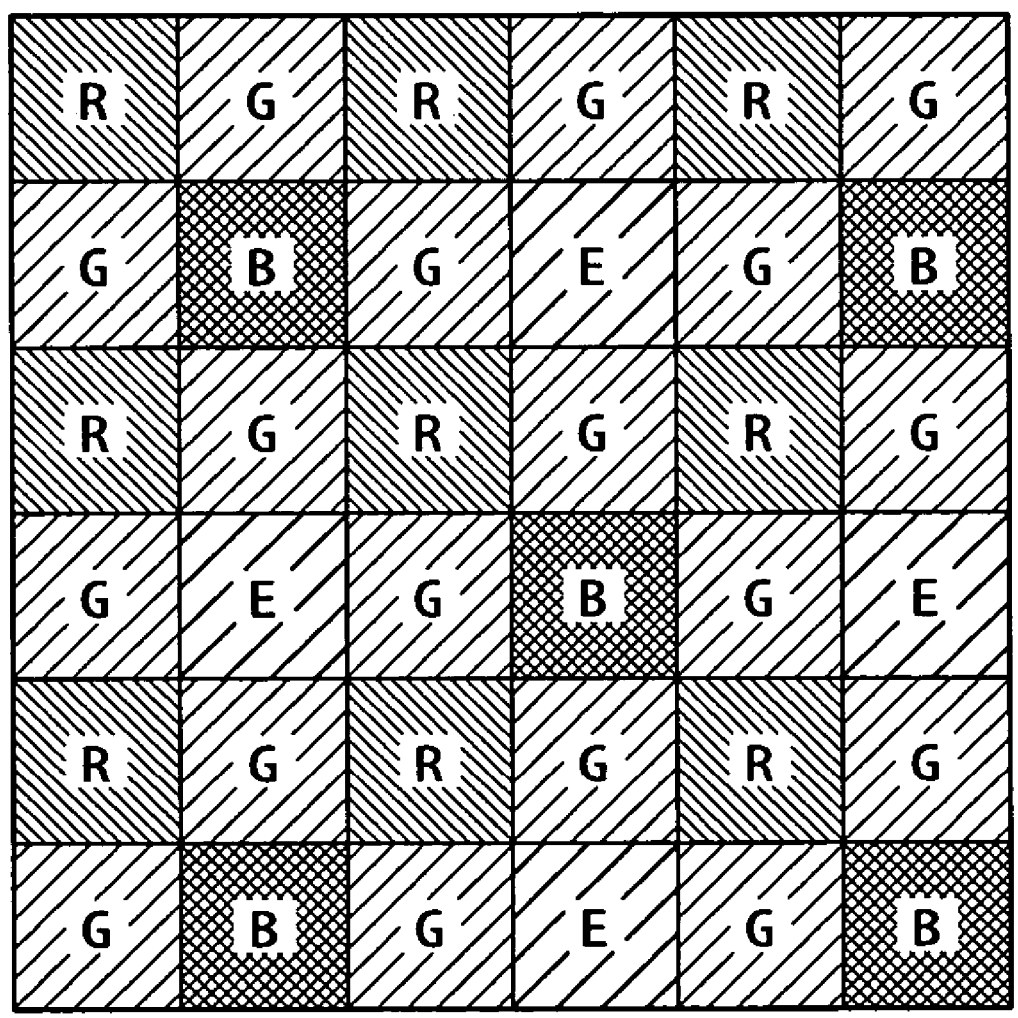
FIG. 55 is a diagram of assistance in explaining an example of color filters used in the CCD image sensor in FIG. 2 when the demosaic processing unit of FIG. 54 is used.

The demosaic processing unit 601 in FIG. 54 can perform suitable demosaic processing not only in the case of the Bayer arrangement shown in FIG. 1 but also in the case of an arrangement of color filters of four colors in which half of Bs in the Bayer arrangement shown in FIG. 1 are replaced with Es, and the Es are arranged in every other line in both a horizontal direction and a vertical direction, as shown in FIG. 55, for example.

The luminance estimation processing unit 611 calculates an estimated luminance value at the position of a pixel of interest using pixels in a rectangular area of n×n (for example, 9×9) pixels extracted by a local area extracting unit 281.

The R intensity estimating unit 612-1 to the E intensity estimating unit 612-4 calculate an estimated value of intensity of each of R, G, B, and E using the estimated luminance value calculated by the luminance estimation processing unit 611 and the pixels of the rectangular area extracted by the local area extracting unit 281. The R intensity estimating unit 612-1, the G intensity estimating unit 612-2, the B intensity estimating unit 612-3, and the E intensity estimating unit 612-4 have basically the same configuration. Therefore, when the R intensity estimating unit 612-1, the G intensity estimating unit 612-2, the B intensity estimating unit 612-3, and the E intensity estimating unit 612-4 do not need to be individually distinguished from each other, the R intensity estimating unit 612-1, the G intensity estimating unit 612-2, the B intensity estimating unit 612-3, and the E intensity estimating unit 612-4 will be referred to as an R (G, B, or E) intensity estimating unit 612, or all of the R intensity estimating unit 612-1, the G intensity estimating unit 612-2, the B intensity estimating unit 612-3, and the E intensity estimating unit 612-4 will be referred to as an RGBE intensity estimating unit 612.

Figure 56:
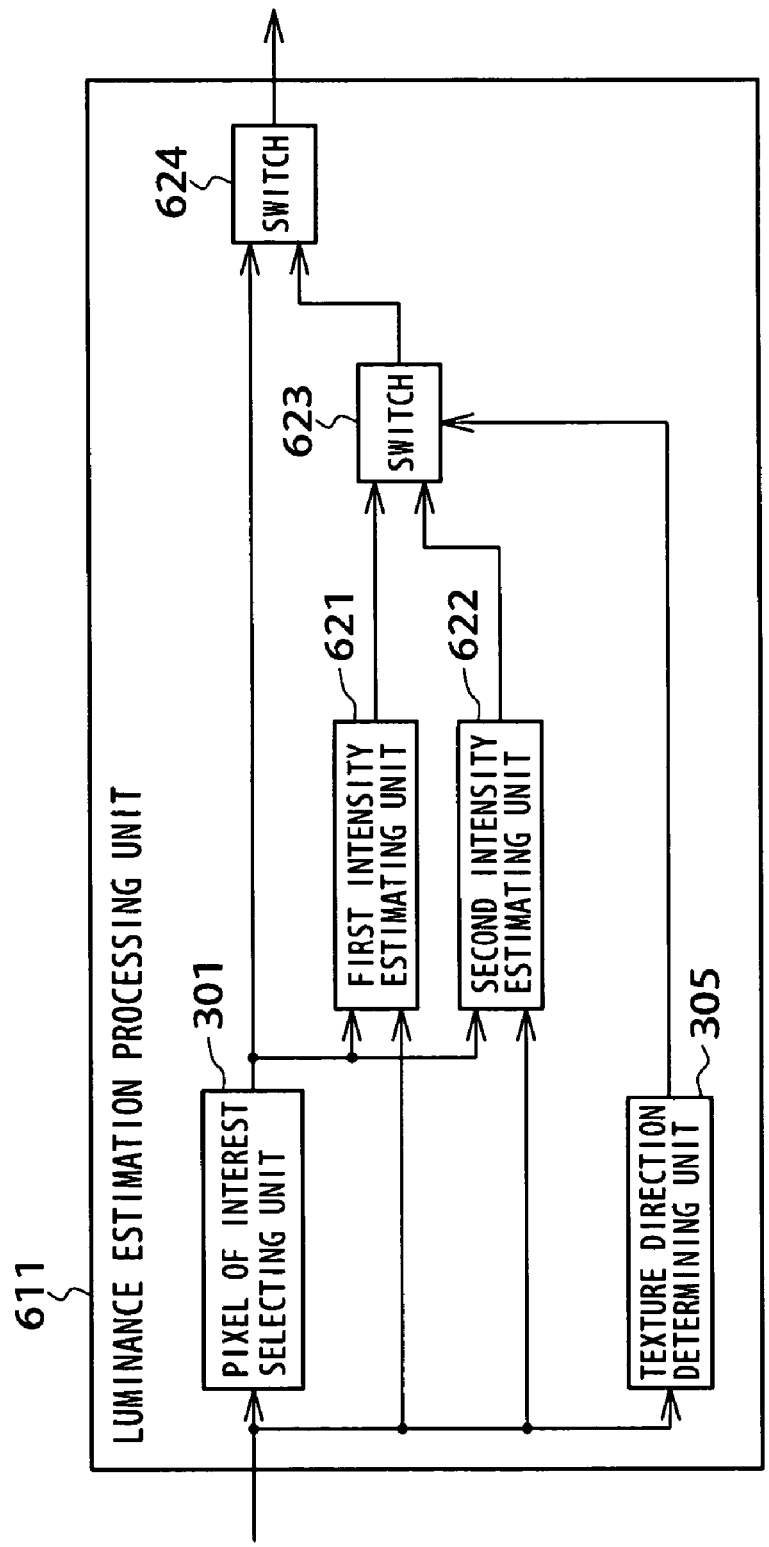
FIG. 56 is a block diagram showing a configuration of a luminance estimation processing unit in FIG. 54.

FIG. 56 is a block diagram showing a configuration of the luminance estimation processing unit 611.

The luminance estimation processing unit 611 includes a pixel of interest selecting unit 301, a texture direction determining unit 305, a first intensity estimating unit 621, a second intensity estimating unit 622, a switch 623, and a switch 624. The pixel of interest selecting unit 301 and the texture direction determining unit 305 each have the same functions as described with reference to FIG. 8. The first intensity estimating unit 621 and the second intensity estimating unit 622 calculate intensity of a color to be estimated on the basis of pixels of the local area and an estimated intensity value of a color at the position of the pixel of interest. The color to be estimated is G arranged in a checkered manner in the color filters described with reference to FIG. 55. The luminance estimation processing unit 611 calculates G intensity as a luminance component using G that is present in the checkered manner. While luminance estimation processing performed by the luminance estimation processing unit 611 estimates G intensity, G intensity as a result outputted by the demosaic unit is calculated separately from the G intensity estimated by the luminance estimation processing performed by the luminance estimation processing unit 611. Therefore, the G intensity estimated by the luminance estimation processing unit 611 will be referred to as luminance to be differentiated from the G intensity as a result outputted by the demosaic unit. The first intensity estimating unit 621 calculates luminance using pixel values of pixels on a right and a left of the pixel of interest. The second intensity estimating unit 622 calculates luminance using pixel values of pixels on an upper side and a lower side of the pixel of interest.

The switch 623 selects which of the two input estimated intensity values to use on the basis of a result of determination of a texture direction outputted by the texture direction determining unit 305. When it is determined that the texture direction is closer to that of horizontal stripes, the switch 623 outputs the estimated intensity value calculated by the first intensity estimating unit 621. When it is determined that the texture direction is closer to that of vertical stripes, the switch 623 outputs the estimated intensity value calculated by the second intensity estimating unit 622. The switch 624 selects which of two input estimated intensity values to use on the basis of the color at the position of the pixel of interest in the original mosaic image. When the color at the position of the pixel of interest in the mosaic image is G itself, it suffices to output the intensity of the pixel of interest in the mosaic image as it is without special estimation processing being required. Therefore, a signal to be outputted from the switch 624 is selected such that an output of the pixel of interest selecting unit 301 is an output of the switch 624. When the color at the position of the pixel of interest in the mosaic image is not G, the signal to be outputted from the switch 624 is selected such that an output of the switch 623 is an output of the switch 624.

Figure 57:
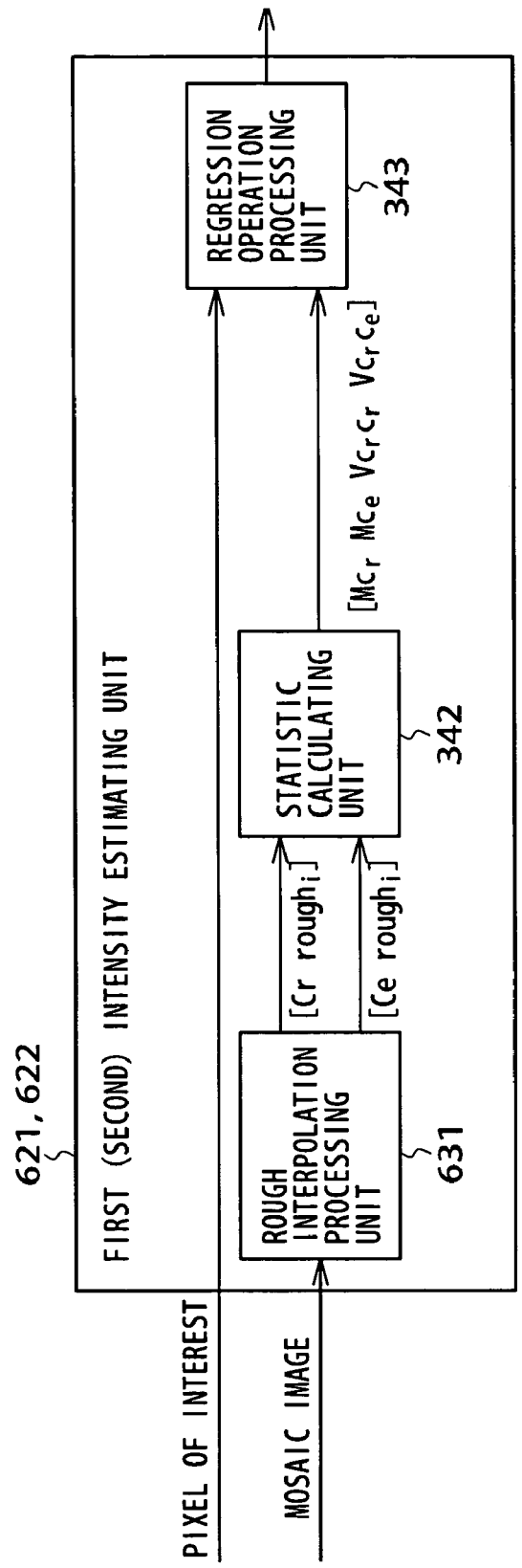
FIG. 57 is a block diagram showing a configuration of a first intensity estimating unit and a second intensity estimating unit in FIG. 56.

FIG. 57 is a block diagram showing a configuration of the first intensity estimating unit 621 or the second intensity estimating unit 622 in FIG. 56. A rough interpolation processing unit 631 obtains rough interpolated values of a first color and a second color on the basis of the mosaic image. Details of processing of the rough interpolation processing unit 631 will be described later with reference to flowcharts of FIG. 64 and FIG. 65. A statistic calculating unit 342 and a regression operation processing unit 343 have the same functions as described with reference to FIG. 10.

A difference between the first intensity estimating unit 621 and the second intensity estimating unit 622 is a method of selecting the first color and the second color in rough interpolation processing performed by the rough interpolation processing unit 631. The difference between the first intensity estimating unit 621 and the second intensity estimating unit 622 will be described with reference to FIG. 58 and FIG. 59. While the description with reference to FIG. 58 and FIG. 59 will be made of a case where the pixel of interest is R, similar description applies to cases where the pixel of interest is B or E.

Figures 58, 59:
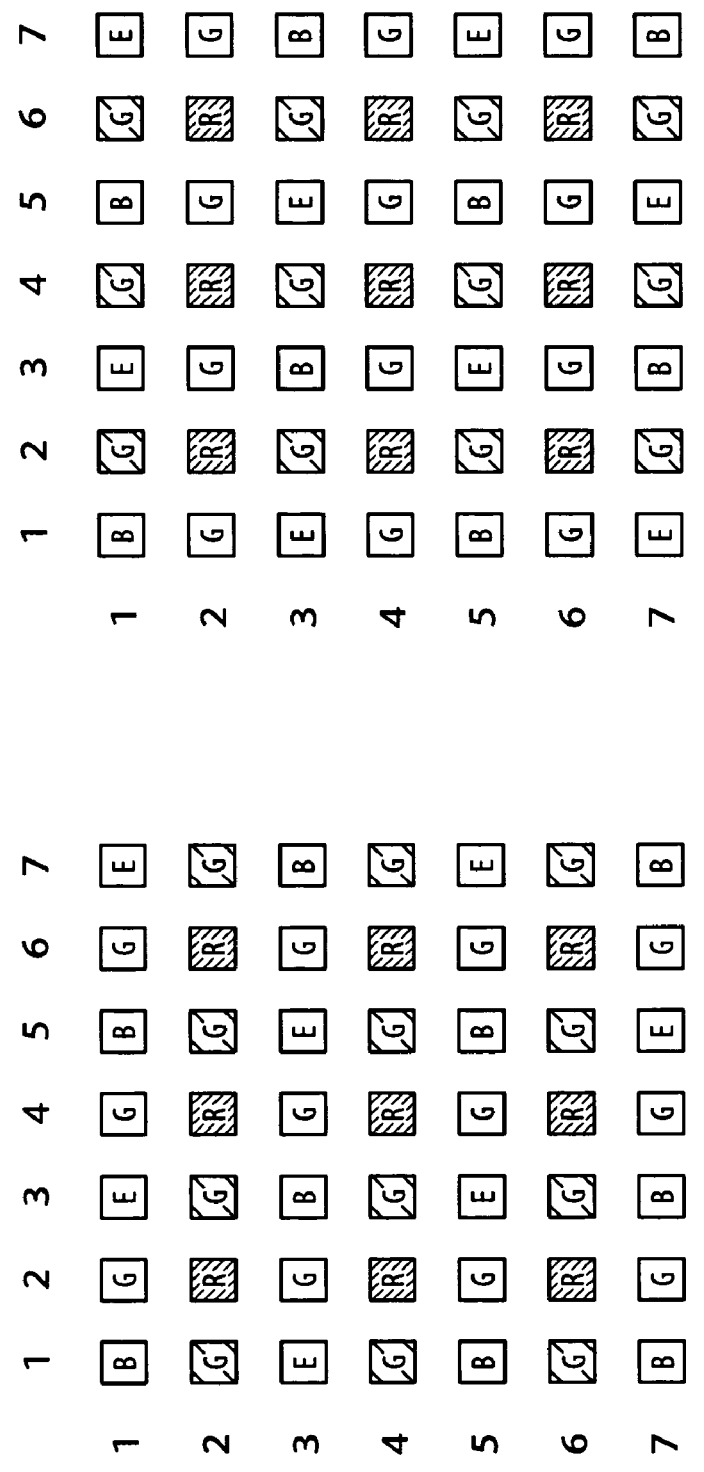

As shown in FIG. 58, the first intensity estimating unit 621 selects a color (R in FIG. 58) at the position of a pixel of interest as a first color Cr, and a color horizontally adjacent to the first color Cr, that is, G as a second color Ce. R and G pixels, which are pixels of hatched parts in FIG. 58, are used by the rough interpolation processing unit 631 of the first intensity estimating unit 621. On the other hand, as shown in FIG. 59, the second intensity estimating unit 622 selects a color (R in FIG. 59) at the position of a pixel of interest as a first color Cr; and a color vertically adjacent to the first color Cr, that is, G as a second color Ce. R and G pixels, which are pixels of hatched parts in FIG. 59, are used by the rough interpolation processing unit 631 of the second intensity estimating unit 622.

The statistic calculating unit 342 calculates average values, a variance value, and a covariance value in the same manner as described above. As shown in FIG. 60, for example, weighting factors used in the calculation are set to be highest at the position of the pixel of interest and set to be decreased with increase in distance from the position of the pixel of interest.

Figure 61:
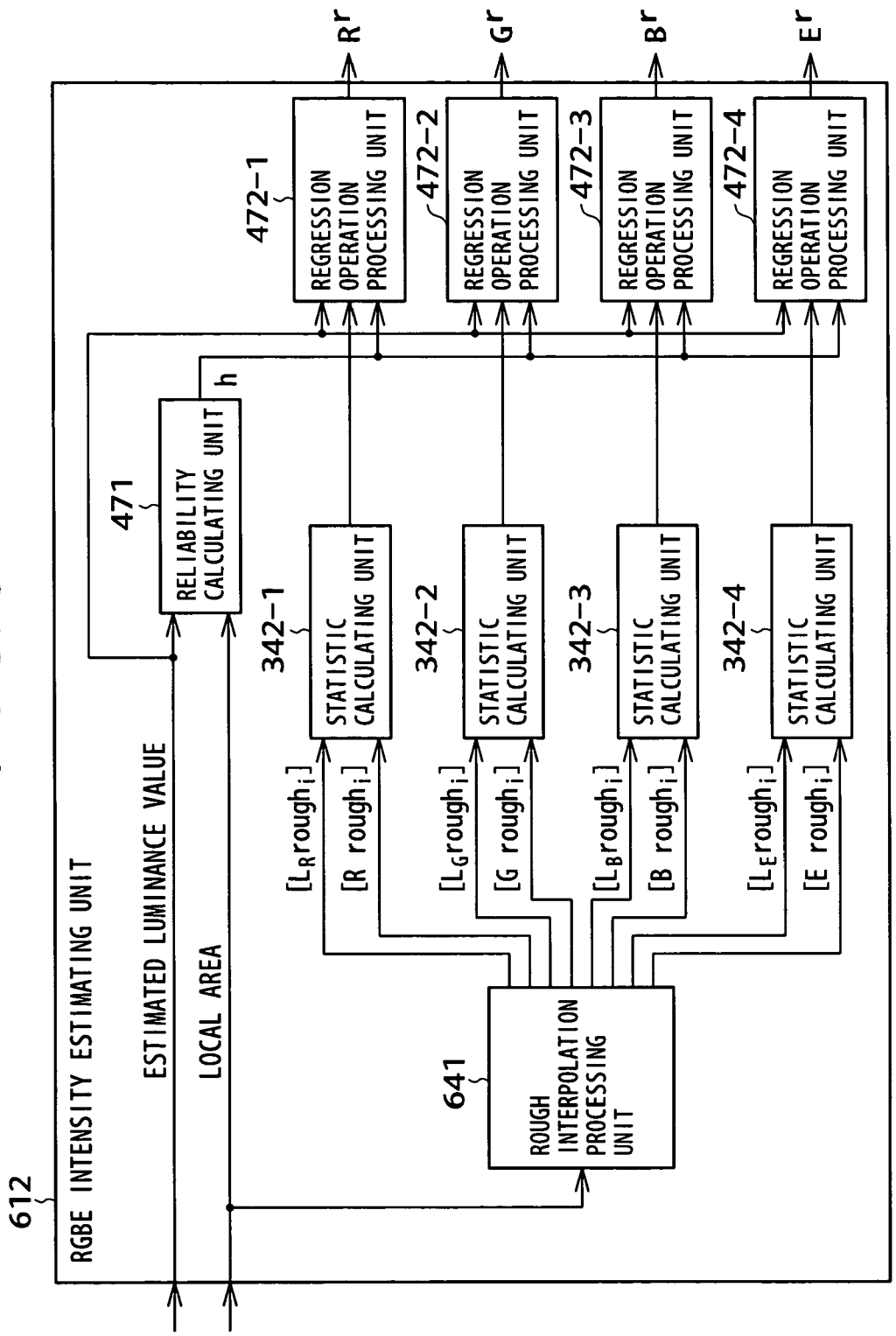
FIG. 61 is a block diagram showing a configuration of an RGBE intensity estimating unit in FIG. 54.

FIG. 61 is a block diagram showing a configuration of the R intensity estimating unit 612-1 to the E intensity estimating unit 612-4 in FIG. 54. While FIG. 60 shows one reliability calculating unit 471 and one rough interpolation processing unit 641 in the RGBE intensity estimating unit 612, it is needless to say that a reliability calculating unit 471 and a rough interpolation processing unit 641 may be provided in each of the R intensity estimating unit 612-1 to the E intensity estimating unit 612-4. Incidentally, parts corresponding to those of the RGBE intensity estimating unit 283 described with reference to FIG. 17 are identified by the same reference numerals. That is, the RGBE intensity estimating unit 612 in FIG. 60 has basically the same configuration as the RGBE intensity estimating unit 283 in FIG. 17, except that the synthesis processing unit 473 is omitted and the rough interpolation processing unit 641 is provided in place of the rough interpolation processing unit 472.

The rough interpolation processing unit 641 generates a number of sets of rough interpolated values of two different colors (Cr is set as a first color and Ce is set as a second color) at the same position using pixels within a local area of n×n pixels. Details of processing performed by the rough interpolation processing unit 641 will be described later with reference to a flowchart of FIG. 67.

The second demosaic processing performed by the demosaic processing unit 601 in FIG. 54 in step S4 in FIG. 23 will be described with reference to a flowchart of FIG. 62.

In step S451, the local area extracting unit 281 sets one of unprocessed pixels as a pixel of interest. In step S452, the local area extracting unit 281 extracts a predetermined number (n×n) of pixels around the position of the pixel of interest as a local area, and then supplies the local area to the luminance estimation processing unit 611 and the R (G, B, and E) intensity estimating unit 612.

Figure 62:
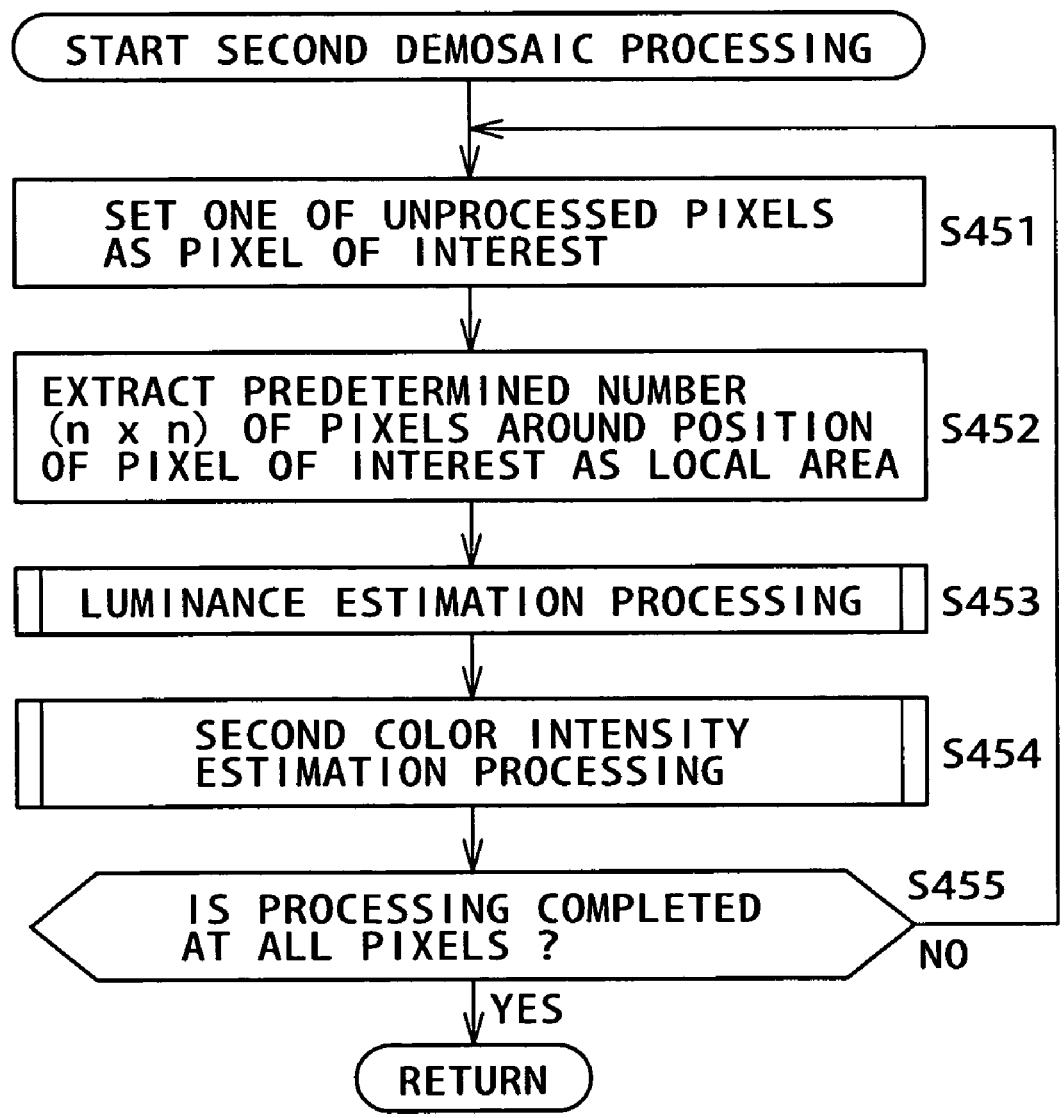
FIG. 62 is a flowchart of assistance in explaining second demosaic processing.

In step S453, luminance estimation processing to be described later with reference to a flowchart of FIG. 62 is performed.

Figure 63:
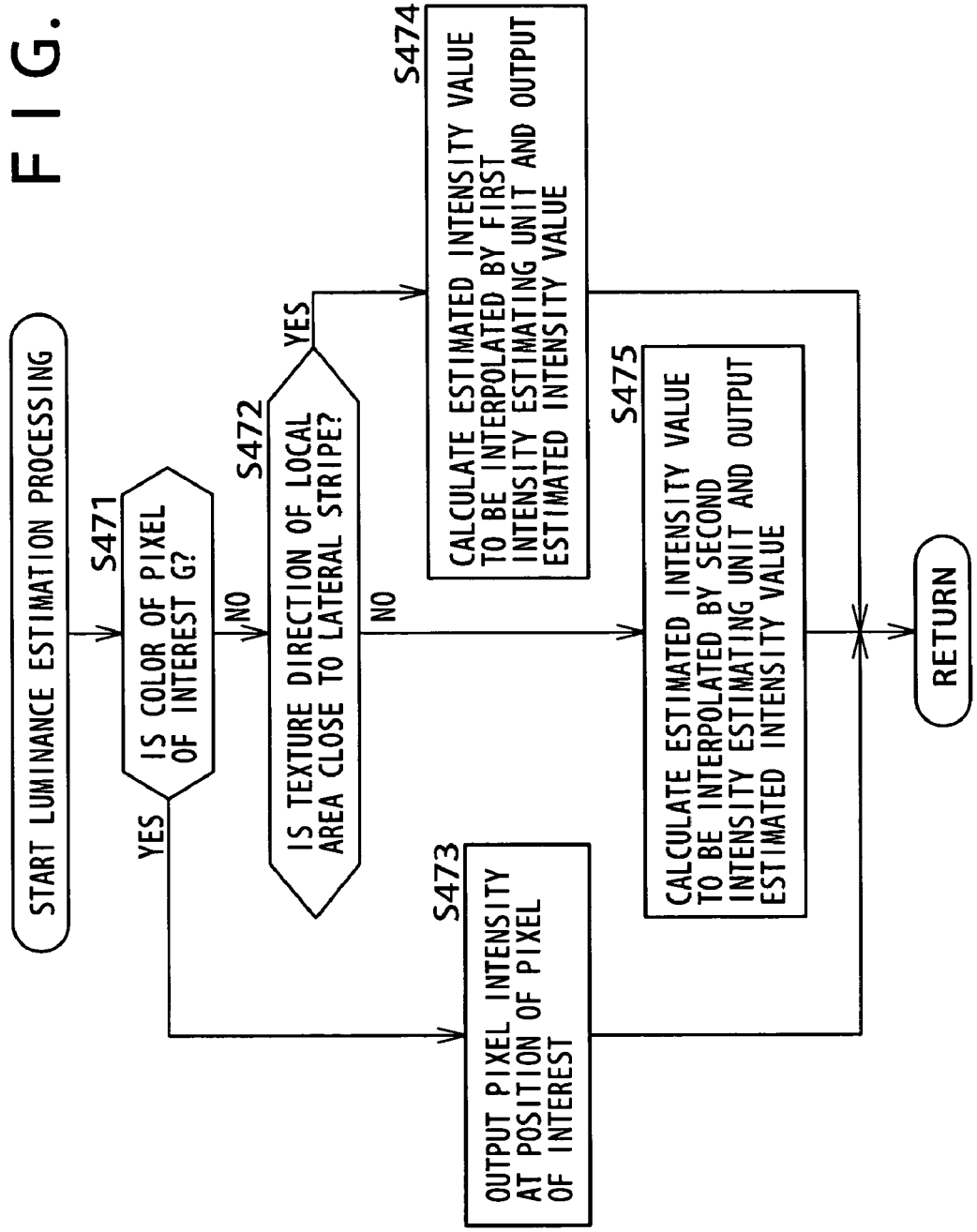
FIG. 63 is a flowchart of assistance in explaining luminance estimation processing.

In step S454, color intensity estimation processing to be described later with reference to a flowchart of FIG. 63 is performed in parallel by the parts of the R (G, B, and E) intensity estimating unit 612 in FIG. 61.

In step S455, the local area extracting unit 281 determines whether the processing is completed at all pixels. When the local area extracting unit 281 determines in step S455 that the processing is not completed at all the pixels, the processing returns to step S451 to repeat the process from step S451 on down. When the local area extracting unit 281 determines in step S455 that the processing is completed at all the pixels, the processing proceeds to step S5 in FIG. 23.

In other words, when the position of a certain pixel of interest is determined, the parts including the demosaic processing unit 601 perform respective processes at the position of the pixel of interest, and when the processing from step S451 to step S455 is ended at all the pixels, the processing is ended.

As a result of such processing, a mosaic image obtained on the basis of the arrangement of the color filters of the CCD image sensor 213 is demosaicked (color interpolation or synchronization), whereby image data in which each color for forming the color filters is interpolated at each pixel can be obtained.

The luminance estimation processing performed in step S453 in FIG. 62 will be described with reference to a flowchart of FIG. 63.

In the processing described with reference to FIG. 56, on the basis of whether the pixel of interest is G or not and the texture direction, after three estimated values are calculated in advance, the switch 623 and the switch 624 output an estimated value of a luminance value corresponding to the color of the pixel of interest and the texture direction. However, when the same processing is performed by software, it is desirable to use an appropriate method of calculating an estimated intensity value after detecting whether the color of the pixel of interest is G or not and the texture direction.

In step S471, the switch 624 determines whether the color of the pixel of interest is G or not.

When the switch 624 determines in step S471 that the color of the pixel of interest is G, the switch 624 in step S472 outputs a pixel intensity at the position of the pixel of interest selected by the pixel of interest selecting unit 301. The processing then proceeds to step S454 in FIG. 62.

When the switch 624 determines in step S471 that the color of the pixel of interest is not G, the switch 623 determines in step S473 whether the texture direction in the local area is close to that of horizontal stripes.

When the switch 623 determines in step S473 that the texture direction in the local area is close to that of horizontal stripes, the switch 623 in step S474 outputs an estimated intensity value to be interpolated. The value is calculated by the first intensity estimating unit 621. The processing then proceeds to step S454 in FIG. 62.

When the switch 623 determines in step S473 that the texture direction in the local area is not close to that of horizontal stripes, that is, the texture direction in the local area is close to that of vertical stripes, the switch 623 in step S475 outputs an estimated intensity value to be interpolated. The value is calculated by the second intensity estimating unit 622. The processing then proceeds to step S454 in FIG. 62.

By such processing, the estimated value of the luminance value corresponding to whether the color of the pixel of interest is G or not and the texture direction is calculated and then outputted.

Figure 64:
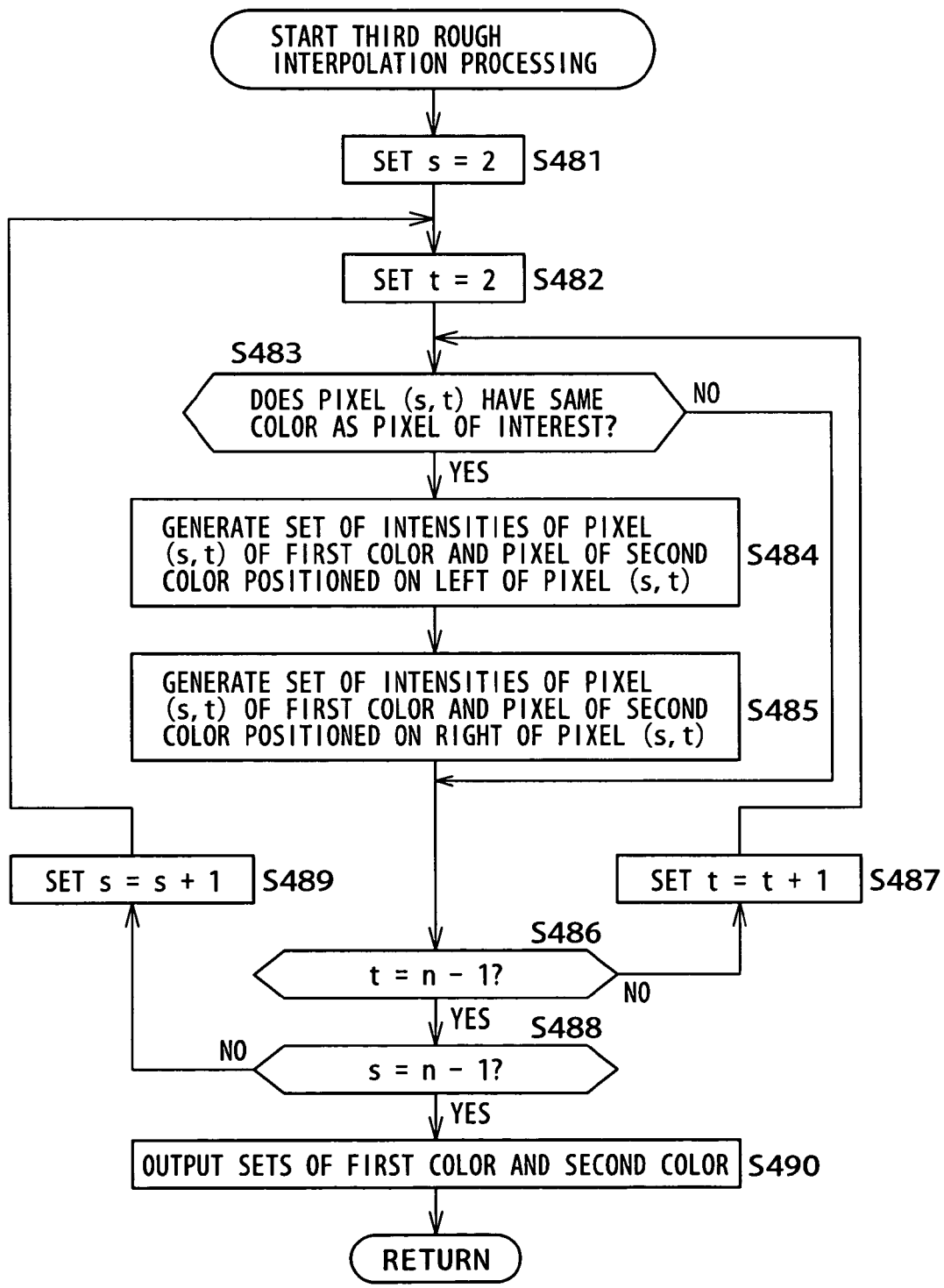
FIG. 64 is a flowchart of assistance in explaining third rough interpolation processing.

Next, referring to a flowchart of FIG. 64, description will be made of third rough interpolation processing performed by the rough interpolation processing unit 631 in the first intensity estimating unit 621 of FIG. 57.

In step S481, the rough interpolation processing unit 631 sets s=2 by initializing a value s of a first register indicating the position of a pixel where the processing is to be performed among the pixels of the supplied local area. In step S482, the rough interpolation processing unit 631 sets t=2 by initializing a value t of a second register indicating the position of the pixel where the processing is to be performed among the pixels of the supplied local area.

In step S483, the rough interpolation processing unit 631 determines whether the pixel (s, t) has the same color as the pixel of interest. When the rough interpolation processing unit 631 determines in step S483 that the pixel (s, t) does not have the same color as the pixel of interest, the processing proceeds to step S486.

When the rough interpolation processing unit 631 determines in step S483 that the pixel (s, t) has the same color as the pixel of interest, the rough interpolation processing unit 631 in step S484 generates a set of intensities of the pixel (s, t) of a first color and a pixel of a second color positioned on a left side of the pixel (s, t).

In step S485, the rough interpolation processing unit 631 generates a set of intensities of the pixel (s, t) of the first color and a pixel of the second color positioned on a right side of the pixel (s, t).

In step S486, the rough interpolation processing unit 631 refers to the value t of the second register to determine whether t=n−1.

When the rough interpolation processing unit 631 determines in step S486 that t≠n−1, the rough interpolation processing unit 631 sets the value t of the second register to t=t+1 in step S487. The processing then returns to step S483 to repeat the process from step S483 on down.

When the rough interpolation processing unit 631 determines in step S486 that t=n−1, the rough interpolation processing unit 631 in step S488 refers to the value s of the first register to determine whether s=n−1.

When the rough interpolation processing unit 631 determines in step S488 that s≠n−1, the rough interpolation processing unit 631 sets the value s of the first register to s=s+1 in step S489. The processing then returns to step S482 to repeat the process from step S482 on down.

When the rough interpolation processing unit 631 determines in step S488 that s=n−1, the rough interpolation processing unit 631 in step S490 outputs a set of the first color and the second color, whereby the processing is ended.

By such processing, an estimated luminance value of high reliability in a horizontal texture is calculated.

Figure 65:
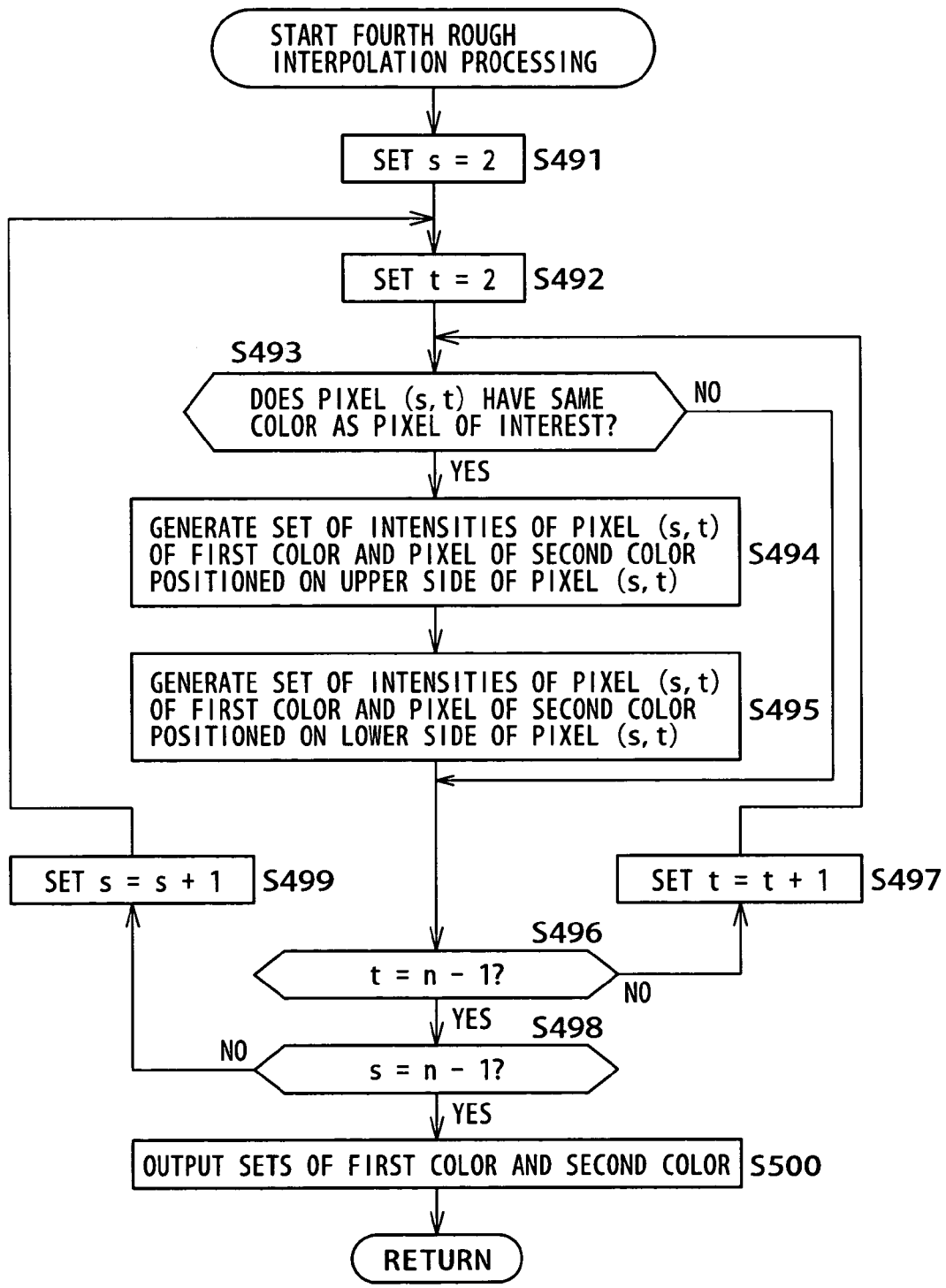
FIG. 65 is a flowchart of assistance in explaining fourth rough interpolation processing.

Next, referring to a flowchart of FIG. 65, description will be made of fourth rough interpolation processing performed by the rough interpolation processing unit 631 in the second intensity estimating unit 622 of FIG. 57.

In step S491, the rough interpolation processing unit 631 sets s=2 by initializing a value s of a first register indicating the position of a pixel where the processing is to be performed among the pixels of the supplied local area. In step S492, the rough interpolation processing unit 631 sets t=2 by initializing a value t of a second register indicating the position of the pixel where the processing is to be performed among the pixels of the supplied local area.

In step S493, the rough interpolation processing unit 631 determines whether the pixel (s, t) has the same color as the pixel of interest. When the rough interpolation processing unit 631 determines in step S493 that the pixel (s, t) does not have the same color as the pixel of interest, the processing proceeds to step S496.

When the rough interpolation processing unit 631 determines in step S493 that the pixel (s, t) has the same color as the pixel of interest, the rough interpolation processing unit 631 in step S494 generates a set of intensities of the pixel (s, t) of a first color and a pixel of a second color positioned on an upper side of the pixel (s, t).

In step S495, the rough interpolation processing unit 631 generates a set of intensities of the pixel (s, t) of the first color and a pixel of the second color positioned on a lower side of the pixel (s, t).

In step S496, the rough interpolation processing unit 631 refers to the value t of the second register to determine whether t=n−1.

When the rough interpolation processing unit 631 determines in step S496 that t≠n−1, the rough interpolation processing unit 631 sets the value t of the second register to t=t+1 in step S497. The processing then returns to step S493 to repeat the process from step S493 on down.

When the rough interpolation processing unit 631 determines in step S496 that t=n−1, the rough interpolation processing unit 631 in step S498 refers to the value s of the first register to determine whether s=n−1.

When the rough interpolation processing unit 631 determines in step S498 that s≠n−1, the rough interpolation processing unit 631 sets the value s of the first register to s=s+1 in step S499. The processing then returns to step S492 to repeat the process from step S492 on down.

When the rough interpolation processing unit 631 determines in step S498 that s=n−1, the rough interpolation processing unit 631 in step S500 outputs a set of the first color and the second color, whereby the processing is ended.

By such processing, an estimated luminance value of high reliability in a vertical texture is calculated.

Figure 66:
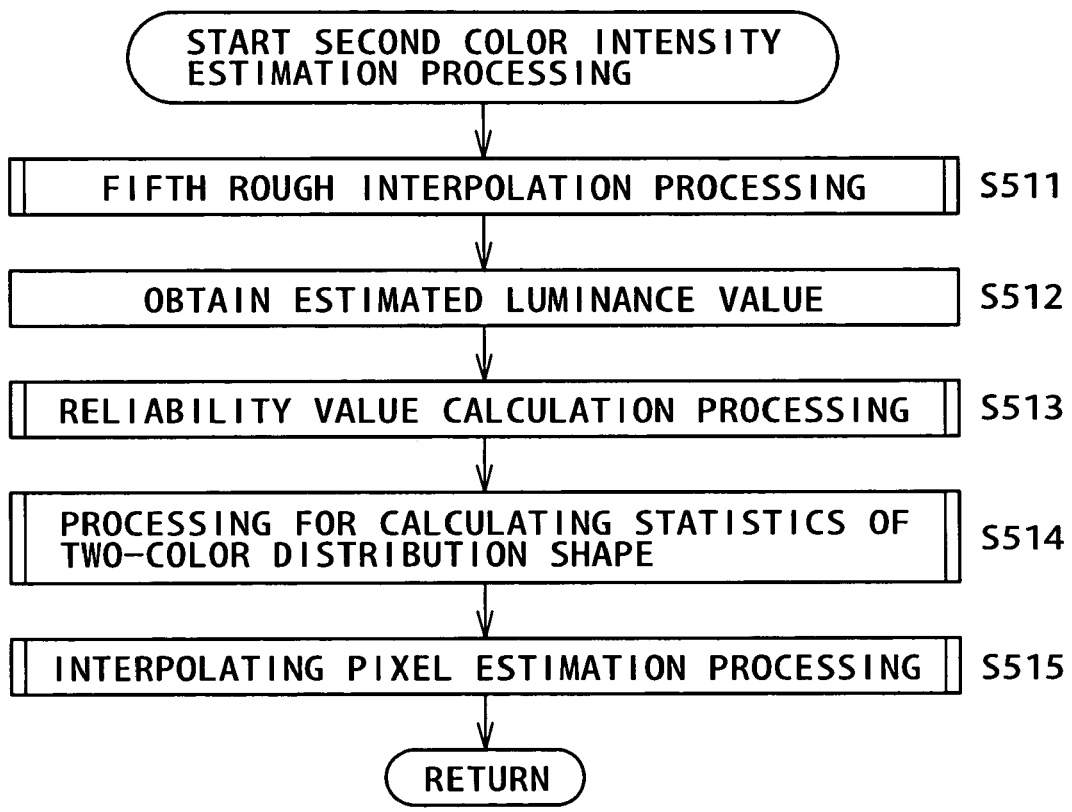
FIG. 66 is a flowchart of assistance in explaining second color intensity estimation processing.

Next, referring to a flowchart of FIG. 66, description will be made of second color intensity estimation processing performed in step S454 in FIG. 62 by the RGBE intensity estimating unit 612 described with reference to FIG. 61.

In step S511, the rough interpolation processing unit 641 performs fifth rough interpolation processing to be described later with reference to FIG. 67.

In step S512, the reliability calculating unit 471 obtains an estimated luminance value calculated by the luminance estimation processing unit 611.

In step S513, the reliability calculating unit 471 performs reliability calculation processing described with reference to the flowchart of FIG. 51.

In step S514, statistic calculating units 342-1 to 342-4 perform the processing for calculating statistics of a two-color distribution shape as described with reference to FIG. 28.

In step S515, regression operation processing units 474-1 to 474-4 perform second interpolating pixel estimation processing described with reference to FIG. 52. The processing then proceeds to step S455 in FIG. 62.

The fifth rough interpolation processing performed by the rough interpolation processing unit 641 (in FIG. 61, in step S511, in FIG. 66) now will be described with reference to a flowchart of FIG. 67.

In step S531, the rough interpolation processing unit 641 determines whether a color of a pixel at a given pixel position in an area of (n−2)×(n−2) pixels with the pixel of interest as a center in the supplied local area is G.

When the rough interpolation processing unit 641 determines in step S531 that the color of the pixel at the given pixel position is G, the rough interpolation processing unit 641 in step S532 generates a set (Ce, Ce) of intensity Ce of the pixel of interest and the intensity Ce of the pixel of interest.

In step S533, the rough interpolation processing unit 641 adds (Ce, Ce) as a set of Lg and G. The processing then proceeds to step S455 in FIG. 62.

When the rough interpolation processing unit 641 determines in step S531 that the color of the pixel at the given pixel position is not G, the rough interpolation processing unit 641 in step S534 extracts two G intensity values from four pixels adjacent to the given pixel; that is, pixels on a right, a left, an upper, and a lower side of the given pixel.

In step S535, the rough interpolation processing unit 641 sets the extracted G intensities as L1 and L2, and generates sets (L1, Ce) and (L2, Ce) of the intensity Ce of the given pixel and L1 and L2.

In step S536, the rough interpolation processing unit 641 determines whether the color of the given pixel is R.

When the rough interpolation processing unit 641 determines in step S536 that the color of the given pixel is R, the rough interpolation processing unit 641 in step S537 adds (L1, Ce) and (L2, Ce) as sets of Lr and R. The processing then proceeds to step S455 in FIG. 62.

When the rough interpolation processing unit 641 determines in step S536 that the color of the given pixel is not R, the rough interpolation processing unit 641 determines in step S538 whether the color of the given pixel is B.

When the rough interpolation processing unit 641 determines in step S538 that the color of the given pixel is B, the rough interpolation processing unit 641 in step S539 adds (L1, Ce) and (L2, Ce) as sets of Lb and B. The processing then proceeds to step S455 in FIG. 62.

When the rough interpolation processing unit 641 determines in step S538 that the color of the given pixel is not B, that is, the color of the given pixel is E, the rough interpolation processing unit 641 in step S540 adds (L1, Ce) and (L2, Ce) as sets of Le and E. The processing then proceeds to step S455 in FIG. 62.

By such processing, the rough interpolation processing unit 641 calculates all sets of rough interpolated values in the area of (n−2)×(n−2) pixels with the pixel of interest as a center in the local area, and then outputs all the sets of rough interpolated values calculated in the area of (n−2)×(n−2) pixels to the statistic calculating units 342-1 to 342-4.

Figure 67:
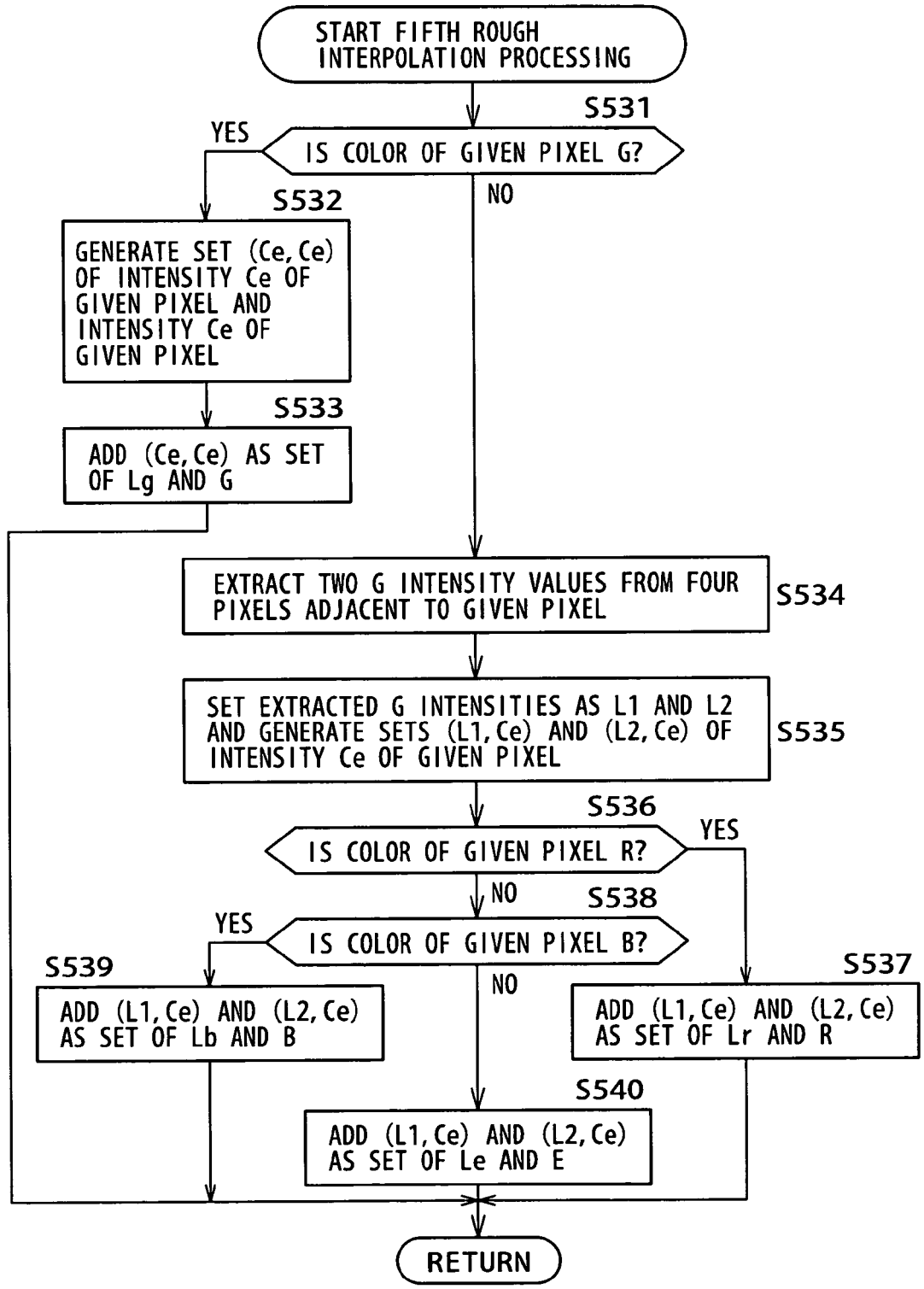
FIG. 67 is a flowchart of assistance in explaining fifth rough interpolation processing.

In step S534 in the processing of FIG. 67, the rough interpolation processing unit 641 extracts two G intensity values from the four pixels adjacent to the given pixel; that is, the pixels on the right, the left, the upper, and the lower side of the given pixel. However, another method may be used to select two G intensities. Specifically, for example, a value of difference between the G intensities of the pixels on the upper and lower sides of the given pixel and a value of difference between the G intensities of the pixels on the right and left of the given pixel are calculated, and the smaller of the two values of difference between the G intensities of the pixels on the upper and lower sides of the given pixel and between the G intensities of the pixels on the right and left of the given pixel is selected. Thus, when the given pixel is situated at a position of large color change such as on a contour of an object, it is possible to select the G intensities in a direction in which the smallest color change occurs. As a second method for similarly selecting the direction in which the smallest color change occurs, there is a method of selecting two of the upper, lower, right, and left G intensities by excluding a maximum value and a minimum value. As a third method, a result of determination of a texture direction by the texture direction determining unit 305 in the luminance estimation processing unit 611 may be used to select the right and left G intensities in the case of horizontal stripes and select the upper and lower G intensities in the case of vertical stripes. In a case where all the n×n pixels in the local area are selected as the given pixel, when the given pixel is positioned at a corner of the local area, there are only two adjacent Gs, wherein it suffices to select the two adjacent Gs.

Figure 68:
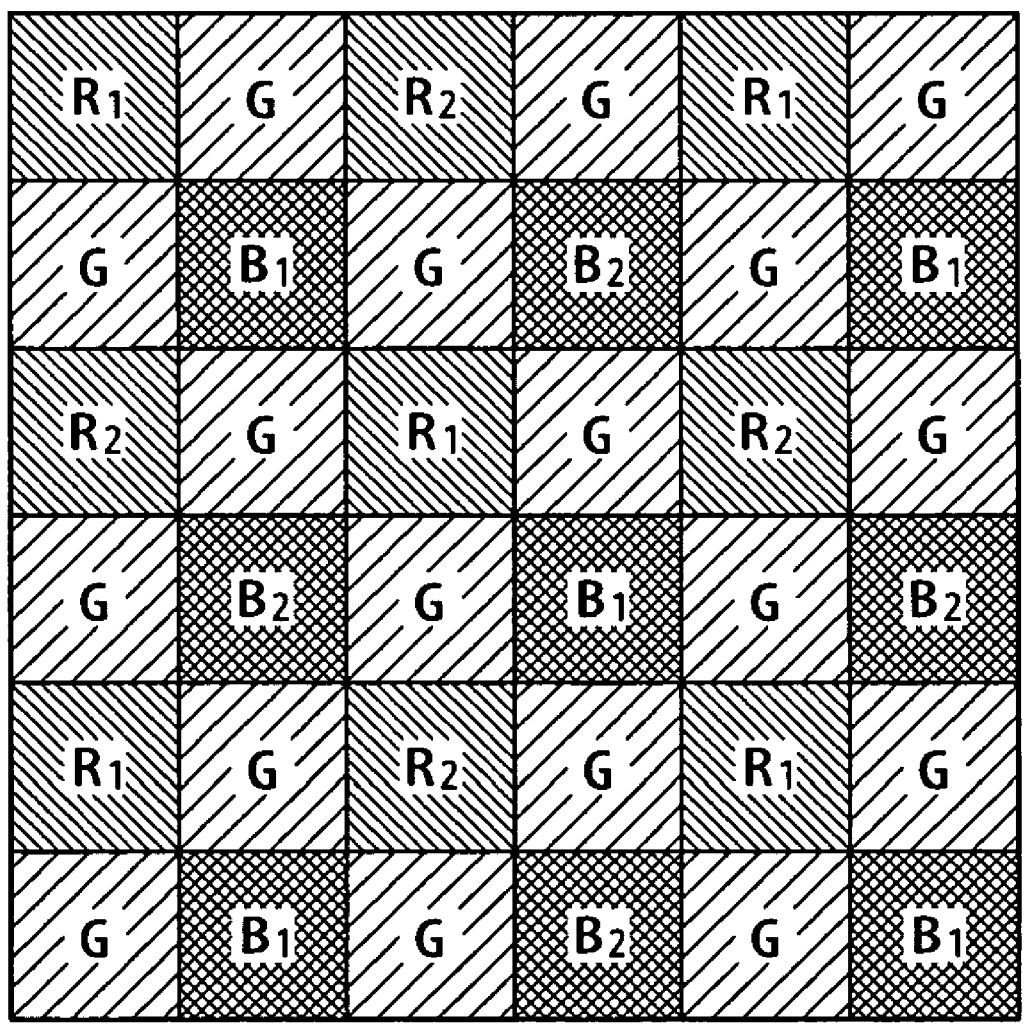
FIG. 68 is a diagram of assistance in explaining a different example of color filters used in the CCD image sensor in FIG. 2 when the demosaic processing unit of FIG. 54 is used.

Further, the demosaic processing unit 601 in FIG. 54 can perform suitable demosaic processing not only in the cases of the Bayer arrangement shown in FIG. 1 and the arrangement of the color filters of the four primary colors shown in FIG. 55 but also in a case of color filters of five colors as shown in FIG. 68, for example. The five-color arrangement is obtained by replacing half of the R and B pixels of the Bayer arrangement of the three colors with pixels having spectral characteristics slightly different from R and B, respectively (in other words, spectral characteristics of R1 and R2 and spectral characteristics of B1 and B2 have a high correlation with each other). Since an arrangement of G in this five-color arrangement is the same as in the four-color arrangement of FIG. 55, the method of calculating a luminance component using G by the demosaic processing unit 601 of FIG. 54 can be applied to the five-color arrangement as it is.

Incidentally, it is needless to say that the present invention is applicable to, for example, a four-color arrangement obtained by replacing half of the R pixels of the Bayer arrangement of the three colors with pixels having spectral characteristics slightly different from the R pixels and a four-color arrangement obtained by replacing half of the B pixels of the Bayer arrangement of the three colors with pixels having spectral characteristics slightly different from the B pixels, as opposed to the color filter arrangement shown in FIG. 68.

Thus, the present invention can be applied to color arrangements of four colors and more, and reduce jagginess and improve perceived resolution.

While the image processing of the digital still camera 201 has been described above, the present invention is applicable to digital video cameras capable of picking up moving images. When the present invention is applied to a digital video camera, the codec processing unit 221 performs processing by an algorithm for compression or decompression of digital image data such Gs, for example, as MPEG (Moving Picture Coding Experts Group/Moving Picture Experts Group).

The series of processes described above can be carried out not only by hardware but also by software.

In this case, the DSP block 216 executes the software to achieve the above-described functions. In addition, a part of the processing of the digital still camera 201 can be performed by a personal computer 701 as shown in FIG. 69, for example.

A CPU (Central Processing Unit) 711 in FIG. 69 performs various processing according to a program stored in a ROM (Read Only Memory) 712 or a program loaded from a storage unit 718 into a RAM (Random Access Memory) 713. As required, the RAM 713 also stores data and the like necessary for the CPU 711 to perform various processing.

The CPU 711, the ROM 712, and the RAM 713 are interconnected via a bus 714. The bus 714 is also connected with an input-output interface 715.

The input-output interface 715 is connected with an input unit 716 including a keyboard, a mouse, and the like, an output unit 717 including a display, a speaker, and the like, a storage unit 718 including a hard disk, and the like, and a communicating unit 719 including a modem, a terminal adapter, and the like. The communicating unit 719 performs communication processing via a network including the Internet.

When necessary, the input-output interface 715 is also connected with a drive 720, into which a magnetic disk 731, an optical disk 732, a magneto-optical disk 733, a semiconductor memory 734, or the like, is inserted as required. A computer program read from the magnetic disk 731, the optical disk 732, the magneto-optical disk 733, the semiconductor memory 734, or the like, is installed in the storage unit 718 as required.

When the series of processes is to be carried out by software, a program including the software is installed from a network or a recording medium onto a computer incorporated in special hardware (for example, the DSP block 216, or the demosaic processing unit 253 or the demosaic processing unit 601 included in the DSP block 216), or, for example, a general-purpose personal computer that can perform various functions by installing various programs thereon.

As shown in FIG. 69, the recording medium is not only formed by a packaged medium distributed to users to provide the program separately from the apparatus proper. The packaged medium includes the magnetic disk 731 (including floppy disks), the optical disk 732 (including CD-ROM (Compact Disk-Read Only Memory) and DVD (Digital Versatile Disk)), the magneto-optical disk 733 (including MD (Mini-Disk) (trademark)), the semiconductor memory 734, or the like, which has the program recorded thereon. The recording medium is also formed by the ROM 712, the hard disk included in the storage unit 718, or the like, which has the program recorded thereon and is provided to the user in a state of being preincorporated in the apparatus proper.

It is to be noted that in the present specification, the steps describing the program stored on the recording medium include not only processing carried out in time series in the included order but also processing carried out in parallel or individually and not necessarily in time series.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the herein appended claims.

The invention claimed is:

1. An image processing apparatus for picking up and processing an image, comprising:
    an image obtaining unit for obtaining a mosaic image by an image sensor having at least four kinds of filters with different spectral sensitivities, one of the at least four kinds of filters being used for each pixel of the mosaic image; and
    an image processing unit for generating a color image such that intensity information at a position of each pixel, the intensity information corresponding to a plurality of colors determined by the spectral sensitivities of the filters, is computed for all pixels of the mosaic image obtained by the image obtaining unit;
    wherein in a color filter arrangement of the image sensor of the image obtaining unit, filters possessed by pixels arranged in a checkered manner in half of all the pixels have at least one spectral characteristic having a strong correlation with a spectral characteristic of luminance; and
    wherein the image processing unit calculates estimated intensity values of colors possessed by the pixels arranged in the checkered manner at each pixel and calculates a luminance value of each pixel on a basis of the estimated intensity values; and
    wherein the color filter arrangement of the image sensor of the image obtaining unit further comprises:
    first filters corresponding to a first color having a spectral characteristic having a strong correlation with the spectral characteristic of luminance arranged horizontally and vertically in every other line; and
    second filters corresponding to a color different from the first color and having a spectral characteristic having a strong correlation with the spectral characteristic of luminance arranged horizontally and vertically in every other line and in lines different from lines of the first filter; and
    wherein the image processing unit further comprises;
    a first calculating unit for calculating a first estimated intensity value as an estimated intensity value of the first color at a position of a pixel of interest in the mosaic image;
    a second calculating unit for calculating a second estimated intensity value as an estimated intensity value of the second color at the position of the pixel of interest; and
    a synthesizing unit for synthesizing the first estimated intensity value calculated by the first calculating unit with the second estimated intensity value calculated by the second calculating unit.

2. An image processing apparatus as claimed in claim 1, wherein:
    the second calculating unit includes at least two third calculating units for calculating an estimated intensity value corresponding to a target color at the position of the pixel of interest on a basis of an intensity value corresponding to a known color already obtained at the position of the pixel of interest and a correlation between the known color and the target color desired to be estimated, the correlation being calculated from pixels in proximity to the pixel of interest; and
    a first of the at least two third calculating units calculates, when the pixel of interest is not of the second color, an intensity value corresponding to the first color at the position of the pixel of interest with the color of the filter at the position of the pixel of interest as the known color and the first color as the target color; and
    a second of the at least two third calculating units calculates the second estimated intensity value with the first color as the known color and the second color as the target color.

3. An image processing apparatus as claimed in claim 2, wherein the at least one of the two third calculating units further comprise:
    a generating unit for generating a plurality of sets of pixel intensities of pixels corresponding to the known color and pixel intensities of the pixels corresponding to the target color;
    a fourth calculating unit for calculating the center of gravity and the slope of a color distribution between the known color and the target color from the plurality of sets of the pixel intensities of the pixels corresponding to the known color and the pixel intensities of the pixels corresponding to the target color, the plurality of sets being generated by the generating unit; and
    a fifth calculating unit for calculating the estimated intensity value corresponding to the target color at the position of the pixel of interest on a basis of the center of gravity and the slope of the color distribution calculated by the fourth calculating unit and the intensity value corresponding to the known color at the position of the pixel of interest.

4. An image processing apparatus as claimed in claim 3, wherein the fifth calculating unit calculates the estimated intensity value corresponding to the target color at the position of the pixel of interest using a regression operation.

5. An image processing apparatus as claimed in claim 1, wherein the first calculating unit further comprises:
    a first intensity estimating unit for calculating a first estimated value for the first estimated intensity value;
    a second intensity estimating unit for calculating a second estimated value for the first estimated intensity value;
    a determining unit for determining a texture direction in proximity of the pixel of interest; and
    a selecting unit for selecting a suitable estimated value from the first estimated value estimated by the first intensity estimating unit and the second estimated value estimated by the second intensity estimating unit on a basis of a result of determination by the determining unit;
    wherein the first intensity estimating unit includes a first third calculating unit for calculating an estimated intensity value corresponding to a target color at the position of the pixel of interest on a basis of an intensity value corresponding to a known color already obtained at the position of the pixel of interest and a correlation between the known color and the target color desired to be estimated, the correlation being calculated from pixels in proximity to the pixel of interest, such that the first of the third calculating units calculates, when the pixel of interest is not of the first color, the first estimated value for the first estimated intensity value with the color of the filter at the position of the pixel of interest as the known color and the first color as the target color;

wherein the second intensity estimating unit further comprises second and third calculating units, wherein the second of the third calculating units calculates, when the pixel of interest is not of the first color, an intensity value corresponding to the second color at the position of the pixel of interest with the color of the filter at the position of the pixel of interest as the known color and the second color as the target color, and the third of the third calculating units calculates the second estimated value for the first estimated intensity value with the second color as the, known color and the first color as the target color; and wherein the selecting unit selects the suitable estimated value from the first estimated value estimated by the first intensity estimating unit and the second estimated value estimated by the second intensity estimating unit on a basis of a result. of determination by the determining unit and whether filters corresponding to the first color are situated in one of a horizontal direction and a vertical direction with respect to the position of the pixel of interest.

6. An image processing apparatus as claimed in claim 1, wherein the second calculating unit further comprises:
a first intensity estimating unit for calculating a first estimated value for the second estimated intensity value;
a second intensity estimating unit for calculating a second estimated value for the second estimated intensity value;
a determining unit for determining a texture direction in proximity of the pixel of interest; and
a selecting unit for selecting a suitable estimated value from the first estimated value estimated by the first intensity estimating unit and the second estimated value estimated by the second intensity estimating unit on a basis of a result of determination by the determining unit;
wherein the first intensity estimating unit includes a first third calculating unit for calculating an estimated intensity value corresponding to a target color at the position of the pixel of interest on a basis of an intensity value corresponding to a known color already obtained at the position of the pixel of interest and a correlation between the known color and the target color desired to be estimated, the correlation being calculated from pixels in proximity to the pixel of interest, such that the first third calculating unit calculates, when the pixel of interest is not of the second color, the first estimated value for the second estimated intensity value with the color of the filter at the position of the pixel of interest as the known color and the second color as the target color;
wherein the second intensity estimating unit further comprises at least second and third third calculating units, such that the second third calculating unit calculates, when the pixel of interest is not of the second color, an intensity value corresponding to the first color at the position of the pixel of interest with the color of the filter at the position of the pixel of interest as the known color and the first color as the target color, and the third calculating unit calculates the second estimated value for the second estimated intensity value with the first color as the known color and the second color as the target color; and wherein the selecting unit selects a suitable estimated value from the first estimated value estimated by the first intensity estimating unit and the second estimated value estimated by the second intensity estimating unit on a basis of the result of determination by the determining unit and whether filters corresponding to the second color are situated in one of a horizontal direction and a vertical direction with respect to the position of the pixel of interest.

7. An image processing apparatus as claimed in claim 1, wherein the color filter arrangement of the image sensor of the image obtaining unit further comprises:
third filters corresponding to a third color different from the first color and the second color, the third filters being arranged horizontally and vertically in every other line and in horizontal lines different from horizontal lines of the first filter, and
fourth filters corresponding to a fourth color different from the first color, the second color and the third color, the fourth filters being arranged horizontally and vertically in every other line and in horizontal lines different from horizontal lines of the second filter.

8. An image processing apparatus as claimed in claim 1, wherein the color filter arrangement of the image sensor of the image obtaining unit further comprises:
third filters corresponding to a third color which is different from the first color and the second color, the third filters being alternately arranged horizontally and vertically in every other line and in horizontal lines different from horizontal lines of the first filter; and
fifth and sixth filters corresponding, respectively, to fifth and sixth colors which are different from the first color, the second color, the third color and the fourth color, the fifth and sixth filters being alternately arranged horizontally and vertically in every other line and in horizontal lines different from horizontal lines of the second filter.

9. An image processing apparatus as claimed in claim 8, wherein:
wherein the third color and the fourth color have spectral characteristics having a high correlation with each other; and
the fifth color and the sixth color have spectral characteristics having a high correlation with each other.

10. An image processing apparatus as claimed in claim 8, wherein the third color and the fourth color are an identical color.

11. An image processing apparatus as claimed in claim 8, wherein the fifth color and the sixth color are an identical color.

12. An image processing apparatus for picking up and processing an image, comprising:
an image obtaining unit for obtaining a mosaic image by an image sensor having at least four kinds of filters with different spectral sensitivities, one of the at least four kinds of filters being used for each pixel of the mosaic image; and
an image processing unit for generating a color image such that intensity information at a position of each pixel, the intensity information corresponding to a plurality of colors determined by the spectral sensitivities of the filters, is computed for all pixels of the mosaic image obtained by the image obtaining unit;
wherein in a color filter arrangement of the image sensor of the image obtaining unit, filters possessed by pixels arranged in a checkered manner in half of all the pixels have at least one spectral characteristic having a strong correlation with a spectral characteristic of luminance; and wherein the image processing unit calculates estimated intensity values of colors possessed by the pixels arranged in the checkered manner at each pixel and calculates a luminance value of each pixel on a basis of the estimated intensity values; and wherein the first calculating unit includes at least one third calculating unit for calculating an estimated intensity value corresponding to a target color at the position of the pixel of interest on a basis of an intensity value corresponding to a known color already obtained at the position of the pixel of interest and a correlation between the known color and the target color desired to be estimated, the correlation being calculated from pixels in proximity to the pixel of interest; and the at least one third calculating unit calculates, when the pixel of interest is not of the first color, the first estimated intensity value with the color of the filter at the position of the pixel of interest as the known color and the first color as the target color.

13. An image processing apparatus as claimed in claim 12, wherein the third calculating unit further comprises:
a generating unit for generating a plurality of sets of pixel intensities of pixels corresponding to the known color and pixel intensities of the pixels corresponding to the target color in proximity to the pixel of interest;
a fourth calculating unit for calculating a center of gravity and a slope of a color distribution between the known color and the target color from the plurality of sets of the pixel intensities of the pixels corresponding to the known color and the pixel intensities of the pixels corresponding to the target color, the plurality of sets being generated by the generating means; and
a fifth calculating unit for calculating the estimated intensity value corresponding to the target color at the position of the pixel of interest on the basis of a center of gravity and a slope of the color distribution calculated by the fourth calculating unit and the intensity value corresponding to the known color at the position of the pixel of interest.

14. An image processing apparatus as claimed in claim 13, wherein the fifth calculating unit calculates the estimated intensity value corresponding to the target color at the position of the pixel of interest using a regression operation.

15. An image processing apparatus as claimed in claim 12, wherein:
the second calculating unit includes a third second calculating unit for calculating an estimated intensity value corresponding to a target color at the position of the pixel of interest on a basis of an intensity value corresponding to a known color already obtained at the position of the pixel of interest and a correlation between the known color and the target color desired to be estimated, the correlation being calculated from pixels in proximity to the pixel of interest; and
the at least one third second calculating unit calculates, when the pixel of interest if not of the second color, the second estimated intensity value with the color of the filter at the position of the pixel of interest as the known color and the second color as the target color.

16. An image processing apparatus as claimed in claim 15, wherein the at least one third second calculating unit further comprises:

a generating unit for generating a plurality of sets of pixel intensities of pixels corresponding to the known color and pixel intensities of the pixels corresponding to the target color in proximity to the pixel of interest;
a fourth calculating unit for calculating a center of gravity and a slope of a color distribution between the known color and the target color from the plurality of sets of the pixel intensities of the pixel corresponding to the known color and the pixel intensities of the pixels corresponding to the target color, the plurality of sets being generated by the generating unit; and
a fifth calculating unit for calculating the estimated intensity value corresponding to the target color at the position of the pixel of interest on a basis of the center of gravity and the slope of the color distribution calculated by the fourth calculating unit and the intensity value corresponding to the known color at the position of the pixel of interest.

17. An image processing apparatus as claimed in claim 16, wherein the fifth calculating unit calculates the estimated intensity value corresponding to the target color at the position of the pixel of interest using a regression operation.

18. An image processing apparatus as claimed in claim 12, wherein:
the first calculating unit includes at least two third calculating units for calculating an estimated intensity value corresponding to a target color at the position of the pixel of interest on a basis of an intensity value corresponding to a known color already obtained at the position of the pixel of interest and a correlation between the known color and the target color desired to be estimated, the correlation being calculated from pixels in proximity to the pixel of interest;
a first of the at least two third calculating units calculates, when the pixel of interest is not of the first color, an intensity value corresponding to the second color at the position of the pixel of interest with the color of the filter at the position of the pixel of interest as the known color and the second color as the target color; and
a second of the at least two third calculating units calculates the first estimated intensity value with the second color as the known color and the first color as the target color.

19. An image processing apparatus as claimed in claim 18, wherein the at least one of the two third calculating units further comprise:
a generating unit for generating a plurality of sets of pixel intensities of pixels corresponding to the known color and pixel intensities of the pixels corresponding to the target color;
a fourth calculating unit for calculating the center of gravity and the slope of a color distribution between the known color and the target color from the plurality of sets of the pixel intensities of the pixels corresponding to the known color and the pixel intensities of the pixels corresponding to the target color, the plurality of sets being generated by the generating unit; and
a fifth calculating unit for calculating the estimated intensity value corresponding to the target color at the position of the pixel of interest on the basis of the center of gravity and the slope of the color distribution calculated by the fourth calculating unit and the intensity value corresponding to the known color at the position of the pixel of interest.

20. An image processing apparatus as claimed in claim 19, wherein the fifth calculating unit calculates the estimated intensity value corresponding to the target color at the position of the pixel of interest using a regression operation.

21. An image processing apparatus for picking up and processing an image, comprising:

an image obtaining unit for obtaining a mosaic image by an image sensor having at least four kinds of filters with different spectral sensitivities, one of the at least four kinds of filters being used for each pixel of the mosaic image; and an image processing unit for generating a color image such that intensity information at a position of each pixel, the intensity information corresponding to a plurality of colors determined by the spectral sensitivities of the filters, is computed for all pixels of the mosaic image obtained by the image obtaining unit;

wherein in a color filter arrangement of the image sensor of the image obtaining unit, filters possessed by pixels arranged in a checkered manner in half of all the pixels have at least one spectral characteristic having a strong correlation with a spectral characteristic of luminance; and wherein the image processing unit calculates estimated intensity values of colors possessed by the pixels arranged in the checkered manner at each pixel and calculates a luminance value of each pixel on a basis of the estimated intensity values;

wherein the color filter arrangement of the image sensor of the image obtaining unit further comprises first filters corresponding to a first color having a spectral characteristic having a strong correlation with a spectral characteristic of luminance arranged in a checkered manner, the image processing unit includes a first calculating unit for calculating an estimated intensity value corresponding to a target color at a position of a pixel of interest on a basis of an intensity value corresponding to a known color already obtained at the position of the pixel of interest and a correlation between the known color and the target color desired to be estimated, the correlation being calculated from pixels in proximity to the pixel of interest; and the first calculating unit calculates a first estimated intensity value with the color of the filter at the position of the pixel of interest as the known color and the first color as the target color.

22. An image processing apparatus as claimed in claim 21, wherein the first calculating unit further comprises:

a generating unit for generating a plurality of sets of pixel intensities of pixels corresponding to the known color and pixel intensities of the pixels corresponding to the target color;

a second calculating unit for calculating a center of gravity and a slope of a color distribution between the known color and the target color from the plurality of sets of the pixel intensities of the pixels corresponding to the known color and the pixel intensities of the pixels corresponding to the target color, the plurality of sets being generated by the generating unit; and a third calculating unit for calculating an estimated intensity value corresponding to the target color at the position of the pixel of interest on a basis of a center of gravity and a slope of the color distribution calculated by the second calculating unit and the intensity value corresponding to the known color at the position of the pixel of interest.

23. An image processing apparatus as claimed in claim 22, wherein the third calculating unit calculates the estimated intensity value corresponding to the target color at the position of the pixel of interest using a regression operation.

24. An image processing apparatus as claimed in claim 21, wherein the color filter arrangement of the image sensor of the image obtaining unit further comprises:

filters of a second color different from the first color of the filters arranged horizontally and vertically in every other line, and at filter positions where the filters of the first color and the second color are not arranged, filters of a third color and a fourth color different from the first color and the second color so as to form an oblique lattice in every other pixel in an oblique direction.

25. An image processing apparatus as claimed in claim 24, wherein:

the second color is a filter color having a spectral characteristic having sensitivity on a side of a longer wavelength than a wavelength of the first color; and at least one of the third color and the fourth color is a filter color having a spectral characteristic having sensitivity on a side of a shorter wavelength than the wavelength of the first color.

26. An image processing apparatus as claimed in claim 21, wherein the color filter arrangement of the image sensor of the image obtaining unit further comprises:

filters of a second color, filters of a third color, filters of a fourth color, and filters of a fifth color which are different from the first color, arranged horizontally and vertically in every fourth line so as to form an oblique lattice in every other pixel in an oblique direction, and wherein the second color and the third color, and the fourth color and the fifth color, respectively, are positioned on horizontal lines and vertical lines different from each other.

27. An image processing apparatus as claimed in claim 26, wherein:

the second color and the third color have spectral characteristics having a high correlation with each other; and the fourth color and the fifth color have spectral characteristics having a high correlation with each other.

28. An image processing apparatus as claimed in claim 26, wherein the second color and the third color are an identical color.

29. An image processing apparatus as claimed in claim 26, wherein the fourth color and the fifth color are an identical color.

* * * * *